(12) United States Patent
Yamagata et al.

(10) Patent No.: US 9,451,193 B2
(45) Date of Patent: Sep. 20, 2016

(54) ELECTRONIC APPARATUS, CONTROL METHOD, AND IMAGE SENSOR

(71) Applicant: Sony Corporation, Tokyo (JP)

(72) Inventors: Yuuki Yamagata, Kanagawa (JP); Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 14/165,715

(22) Filed: Jan. 28, 2014

(65) Prior Publication Data
US 2014/0240568 A1  Aug. 28, 2014

(30) Foreign Application Priority Data
Feb. 27, 2013  (JP) ................. 2013-037543

(51) Int. Cl.
*H04N 5/378* (2011.01)
*H04N 5/351* (2011.01)
*H04N 5/359* (2011.01)

(52) U.S. Cl.
CPC .............. *H04N 5/378* (2013.01); *H04N 5/351* (2013.01); *H04N 5/3598* (2013.01)

(58) Field of Classification Search
CPC ...... H04N 5/351; H04N 5/355; H04N 5/359; H04N 5/3598; H04N 5/378
See application file for complete search history.

(56) References Cited

U.S. PATENT DOCUMENTS

| | | | |
|---|---|---|---|
| 2008/0169955 A1* | 7/2008 | Inada | 341/156 |
| 2008/0252767 A1* | 10/2008 | Muramatsu et al. | 348/312 |
| 2009/0009635 A1* | 1/2009 | Maeda et al. | 348/241 |
| 2009/0128676 A1* | 5/2009 | Tanaka | 348/300 |
| 2010/0253560 A1* | 10/2010 | Kudo | 341/143 |
| 2012/0008032 A1* | 1/2012 | Kurihara et al. | 348/308 |
| 2013/0107331 A1* | 5/2013 | Mori | 358/482 |
| 2014/0239153 A1* | 8/2014 | Gelfand et al. | 250/208.1 |

FOREIGN PATENT DOCUMENTS

JP    2012-010055 A    1/2012

* cited by examiner

*Primary Examiner* — Daniel M Pasiewicz
(74) *Attorney, Agent, or Firm* — Chip Law Group

(57) ABSTRACT

An electronic apparatus includes: a reference-signal output section that outputs a reference signal; a comparator that compares an electrical signal output from a pixel with the reference signal; a counter that obtains a count value as an AD conversion result of the electrical signal, the count value being obtained by counting time taken for the reference signal to change until the electrical signal and the reference signal match each other; and an auto-zero control section that performs control so that auto zero processing for setting the comparator is completed in a reset period, in which the pixel is reset, so that a comparison result indicating that two input signals supplied to the comparator match each other.

20 Claims, 26 Drawing Sheets

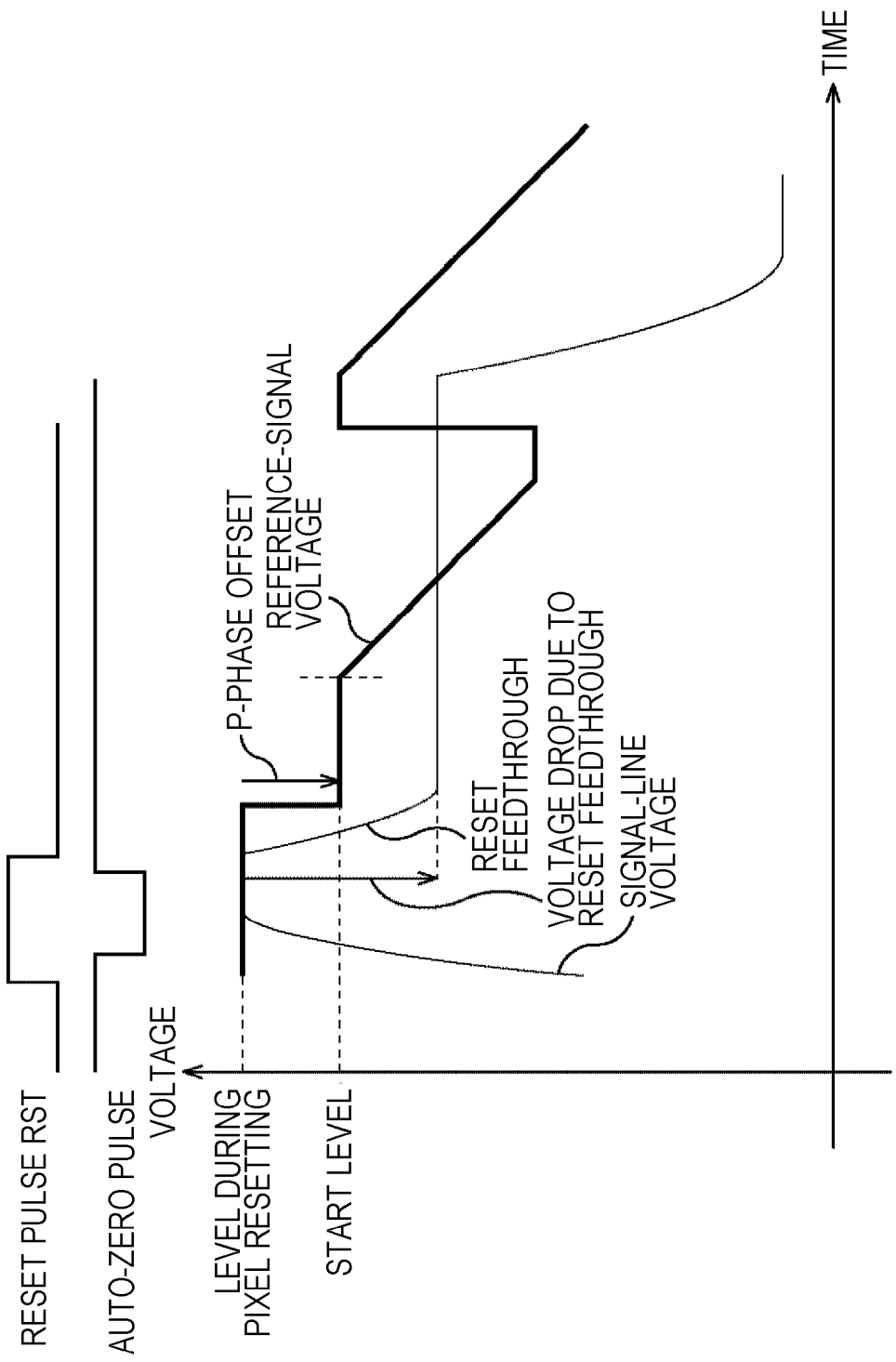

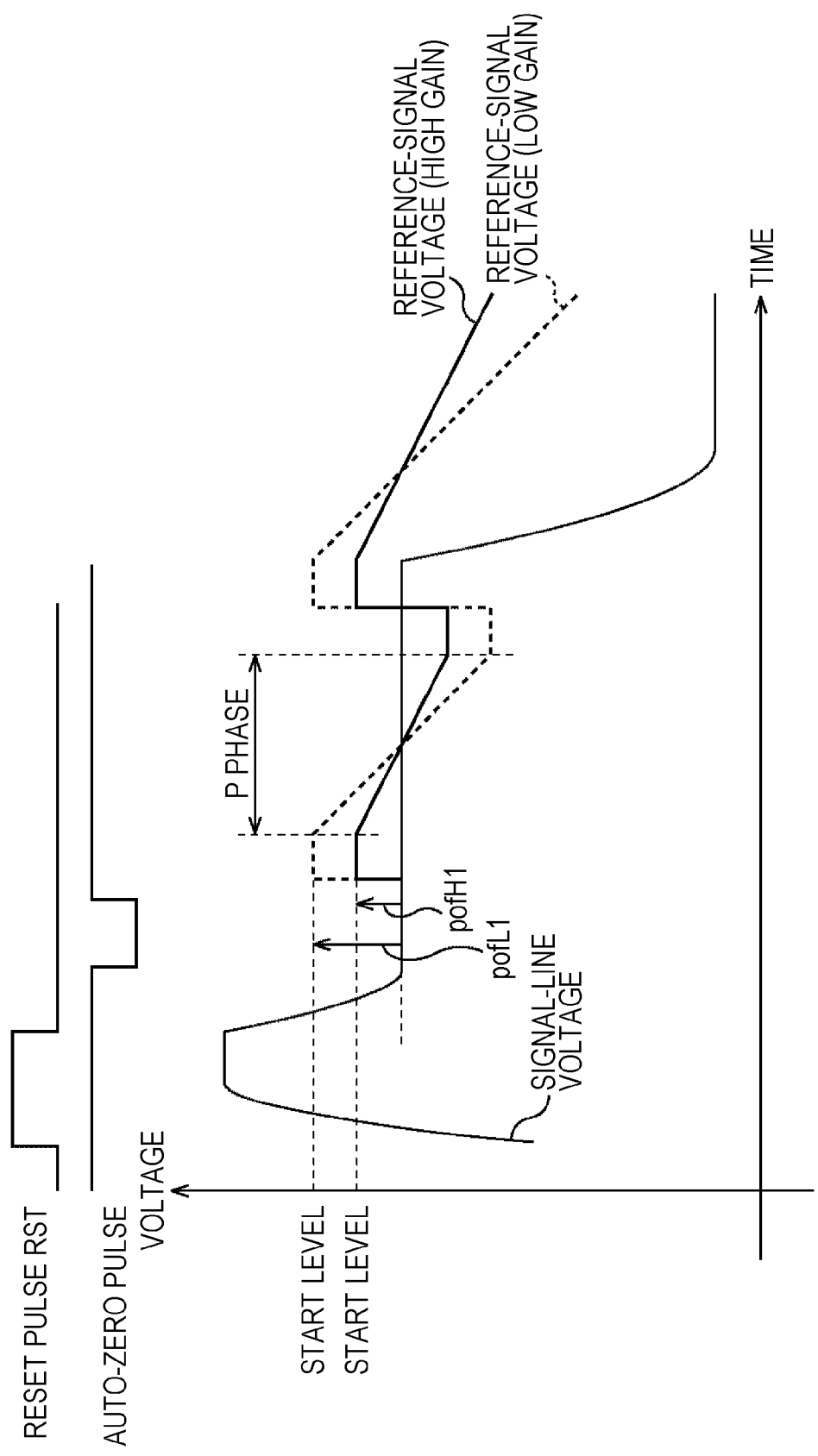

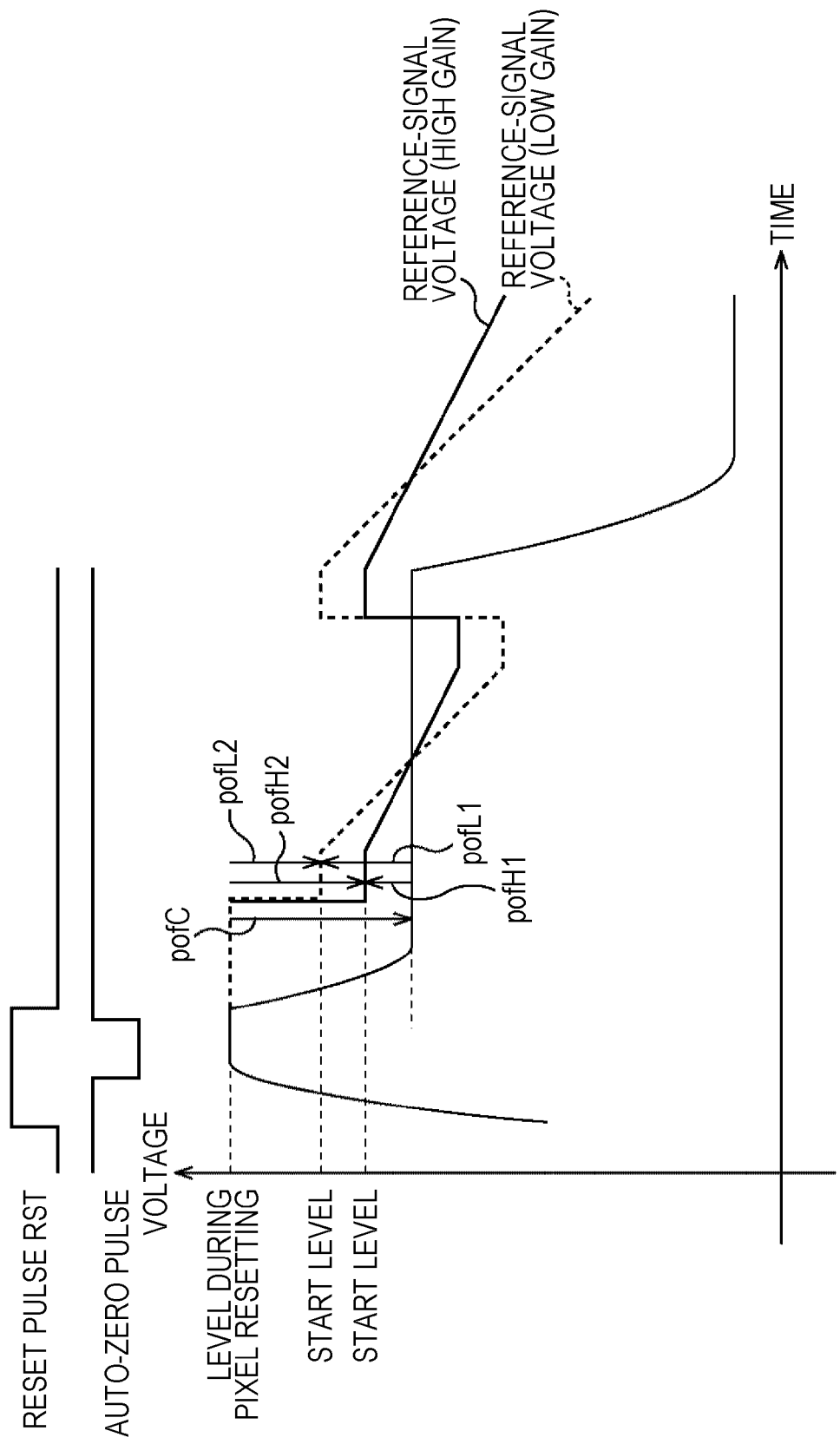

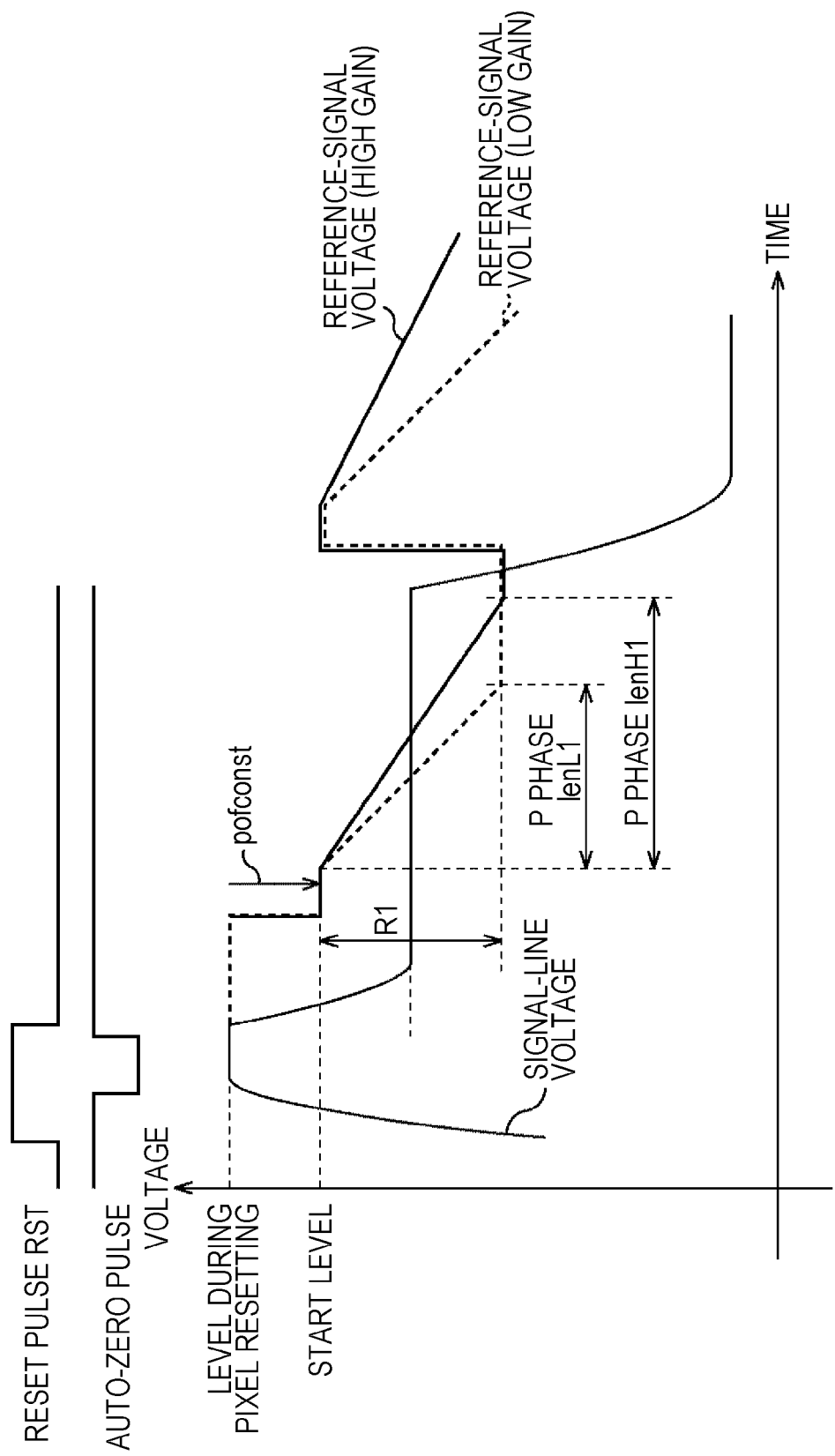

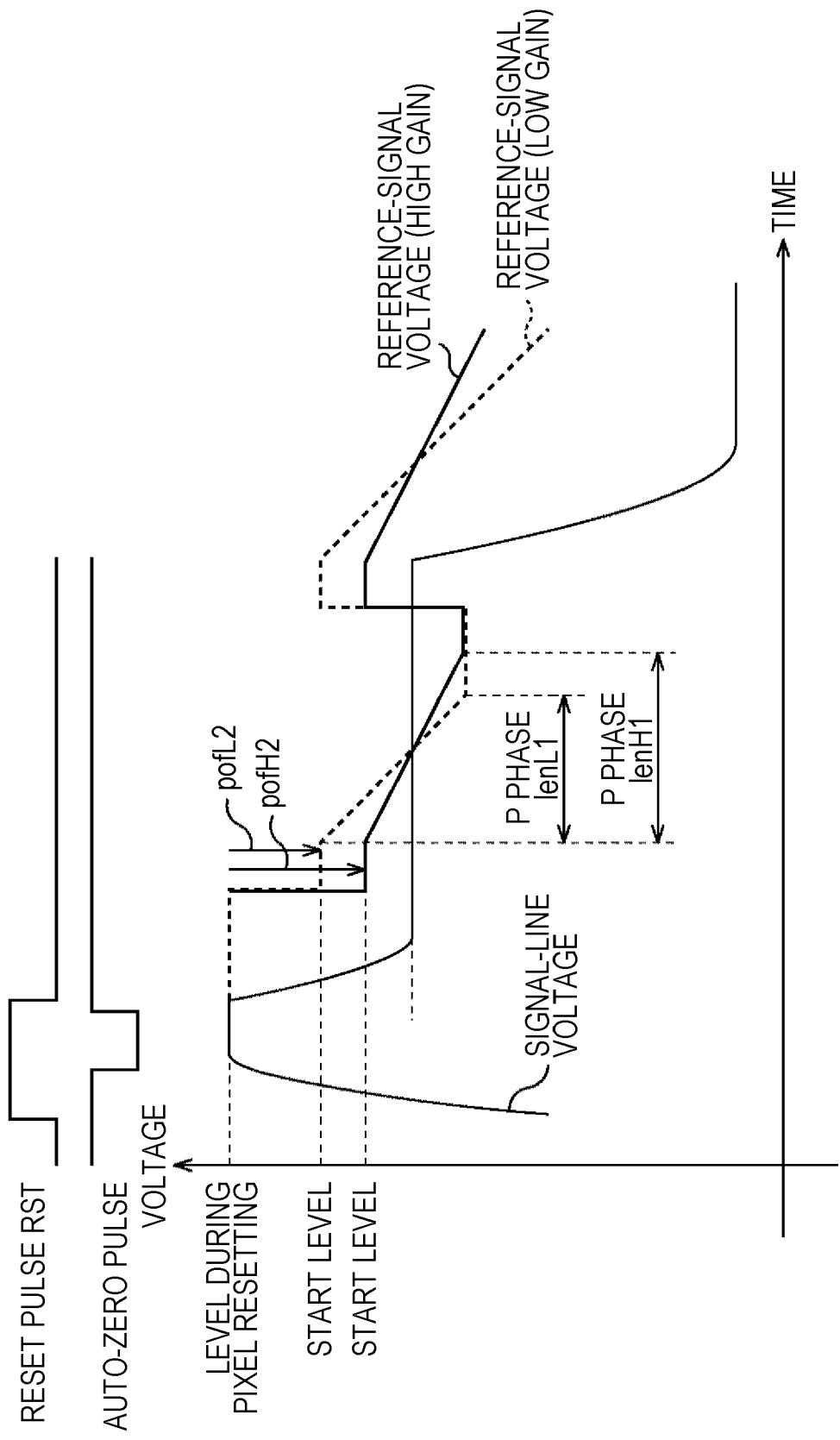

ELECTRONIC APPARATUS, CONTROL METHOD, AND IMAGE SENSOR

CROSS REFERENCE TO RELATED APPLICATIONS

This application claims the benefit of Japanese Priority Patent Application JP 2013-037543 filed Feb. 27, 2013, the entire contents of which are incorporated herein by reference.

BACKGROUND

The present technology relates to electronic apparatuses, control methods, and image sensors. More specifically, the present technology relates to an electronic apparatus, a control method, and an image sensor which make it possible to easily inhibit a decrease in image quality, for example.

For example, charge-coupled device (CCD) image sensors and complementary metal-oxide semiconductor (CMOS) image sensors are available as solid-state image capture devices for capturing images, and in recent years, CMOS image sensors have attracted attention in order to respond to the demands for miniaturization.

CMOS image sensors have analog-to-digital converters (ADCs), which perform analog-to-digital (AD) conversion on analog electrical signals output by pixels having photoelectric conversion elements, such as photodiodes (PD), for performing photoelectric conversion.

One example of the ADCs for the CMOS image sensors is what we call a "reference-signal-comparing-type ADC", which has a comparator and a counter and compares electrical signals output by pixels with a predetermined reference signal to perform AD conversion of the electrical signals.

In the reference-signal-comparing-type ADC, the comparator compares the electrical signal output by each pixel with a reference signal (such as a ramp signal) having a level that changes at a certain gradient, and the counter counts time taken for the level of the reference signal to change until the level of the electrical signal and the level of the reference signal match each other, so that the electrical signal output by the pixel is subjected to AD conversion.

AD conversion involving counting time taken for the level of the reference signal to vary until the level of the electrical signal and the level of the reference signal match each other is also called integrating AD conversion.

Meanwhile, in an image sensor, correlated double sampling (CDS) is performed to determine a difference between an AD-conversion result of a reset level indicated by an electrical signal immediately after resetting each pixel and an AD-conversion result of a signal level indicated by an electrical signal corresponding to charge accumulated in the PD in the pixel after the resetting thereof and outputs a difference resulting from the CDS as a pixel value.

Through the CDS, noise that differs (varies) depending on each pixel or a circuit for each column in the image sensor is reduced, thus making it possible to enhance the image quality.

However, when the image sensor performs the CDS, for example, there are cases in which a so-called black sunspot occurs to degrade the image quality, for example, during image capturing of a high-luminance subject, such as the sun.

That is, when an image of a subject with a high luminance is captured, blooming in which the PD in the pixel is saturated immediately after resetting of the pixel and charge overflows from the PD occurs in the image sensor.

If blooming occurs, then the charge that overflowed from the PD is accumulated in a floating diffusion (FD) in the pixel, the reset level of the pixel becomes significantly lower than the reset level obtained when an image of a subject with an appropriate luminance is captured (this reset level may also be referred to as a "normal reset level" hereinafter), reaches a signal level obtained when the PD is saturated (this signal level may also be referred to as a "saturation level" hereinafter), or reaches a level that is close to the saturation level.

In addition, during image capturing of a subject with a high luminance, the signal level also reaches the saturation level or a level close to the saturation level.

Thus, both of the reset level and the signal level reach (substantially) their saturation levels during image capturing of a subject with a high luminance. Thus, when the CDS for determining a difference between the reset level and the signal level is performed, the difference resulting from the CDS has a significantly small value.

During image capturing of a subject with a high luminance, since pixel values resulting from the CDS have small values, an image in which pixels at a portion where the luminance of the subject is high appear to be "sunken" in black is obtained. The portion of the pixels which appears to be sunken in black is called a black sunspot.

As a technology for inhibiting an image-quality decline due to occurrence of such a black sunspot, for example, Japanese Unexamined Patent Application Publication No. 2012-010055 discloses a technology in which control means for controlling a count operation of a counter is provided between an output of a comparator in an ADC and an input of the counter.

SUMMARY

In recent years, miniaturization of image sensors has advanced in conjunction with an increased number of pixels therein, and there are demands for a technology that is capable of inhibiting an image-quality decline due to a black sunspot, without adding a special circuit to the ADCs.

The present technology has been conceived in view of such a situation, and is aimed to easily inhibit an image-quality decline.

An embodiment of the present technology provides an electronic apparatus. The electronic apparatus includes: a reference-signal output section configured to output a reference signal whose level changes; a comparator configured to compare an electrical signal output from a pixel having a photoelectric conversion element that performs photoelectric conversion with the reference signal output by the reference-signal output section; a counter configured to obtain a count value as an AD conversion result of the electrical signal, the count value being obtained by counting time taken for the reference signal to change until the electrical signal and the reference signal match each other, based on a result of the comparison of the electrical signal with the reference signal; and an auto-zero control section configured to perform control so that auto zero processing for setting the comparator is completed in a reset period so that a comparison result indicating that two input signals supplied to the comparator match each other, the pixel being reset in the reset period.

According to another embodiment of the present technology, there is provided a control method for an electronic apparatus including a reference-signal output section configured to output a reference signal whose level changes; a comparator configured to compare an electrical signal output from a pixel having a photoelectric conversion element that performs photoelectric conversion with the reference signal output by the reference-signal output section; and a counter configured to obtain a count value as an AD conversion result of the electrical signal, the count value being obtained by counting time taken for the reference signal to change until the electrical signal and the reference signal match each other, based on a result of the comparison of the electrical signal with the reference signal. The control method includes performing control so that auto zero processing for setting the comparator is completed in a reset period so that a comparison result indicating that two input signals supplied to the comparator in the electronic apparatus match each other, the pixel being reset in the reset period.

As described above, in the electronic apparatus, the image sensor, and the control method according to the embodiments of the present technology, the comparator has a photoelectric conversion element for performing photoelectric conversion, compares an electrical signal output from a pixel with a reference signal whose level changes, the reference signal being output from the reference-signal output section. On the basis of a result of the comparison of the electrical signal with the reference signal, a count value is obtained by counting time that is taken for the reference signal to change until the electrical signal and the reference signal match each other, and is determined as an AD-conversion result of the electrical signal. In this case, auto zero processing for setting the comparator is performed so as to be completed in a reset period, in which the pixel is reset, so that a comparison result indicating that two input signals supplied to the comparator match each other.

The image sensor may be a discrete device or may be an internal block included in one device.

According to the present technology, it is possible to easily inhibit a decline in image quality.

BRIEF DESCRIPTION OF THE DRAWINGS

FIG. 12 is a diagram illustrating P-phase offset performed in the black-sunspot avoidance mode;

FIG. 13 is a waveform diagram illustrating an example of the signal-line voltage and the reference-signal voltage when the amount of offset in the initiation offset in a normal mode is set based on a sensor gain;

FIG. 14 is a waveform diagram illustrating an example of the signal-line voltage and the reference-signal voltage when the amount of offset in the P-phase offset in the black-sunspot avoidance mode is set based on a sensor gain;

FIG. 15 is a diagram illustrating the length of a P phase set based on the sensor gain;

FIG. 16 is a diagram illustrating an example of the amount of the P-phase offset and the length of the P phase set based on the sensor gain;

DETAILED DESCRIPTION OF EMBODIMENTS

[One Embodiment of Digital Camera to which Present Technology is Applied]

Figure 1:
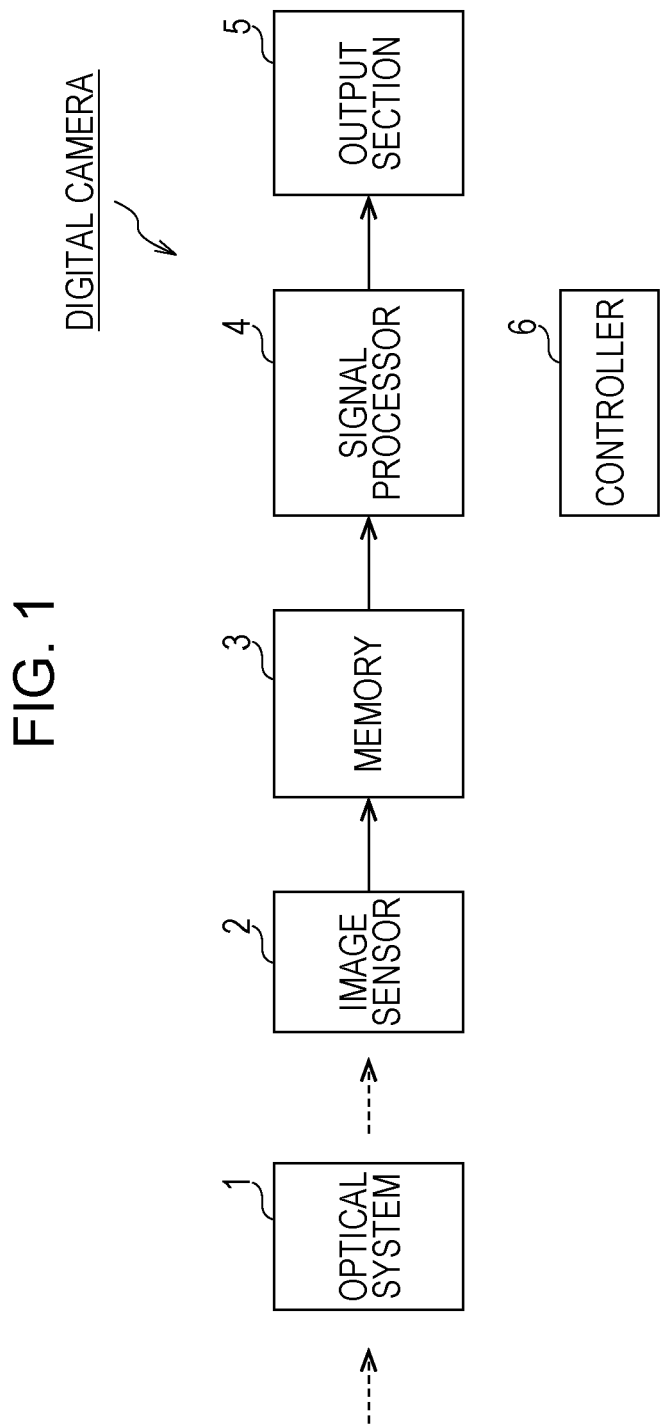
FIG. 1 is a block diagram illustrating an example configuration according to one embodiment of a digital camera to which the present technology is applied.

FIG. 1 is a block diagram illustrating an example configuration according to one embodiment of a digital camera to which the present technology is applied.

The digital camera is capable of capturing both a still image and a moving image.

In FIG. 1, the digital camera includes an optical system 1, an image sensor 2, a memory 3, a signal processor 4, an output section 5, and a controller 6.

The optical system 1 includes, for example, a zoom lens (not illustrated), a focus lens, and a diaphragm and makes external light incident on the image sensor 2.

The image sensor 2 is, for example, a CMOS image sensor. The image sensor 2 receives the incident light from the optical system 1, performs photoelectric conversion on the incident light, and outputs image data corresponding to the incident light from the optical system 1.

The memory 3 temporarily stores therein the image data output by the image sensor 2.

The signal processor 4 performs signal processing using the image data stored in the memory 3 and supplies the resulting image data to the output section 5. Examples of the signal processing include noise elimination, white-balance adjustment, and so on.

The output section 5 outputs the image data received from the signal processor 4.

That is, the output section 5 has, for example, a display (not illustrated), which is implemented by a liquid crystal display or the like. The output section 5 displays, as the so-called live-view image, an image corresponding to the image data from the signal processor 4.

The output section 5 also has, for example, a driver section (not illustrated) for performing driving for a recording medium, such as a semiconductor memory, a magnetic disk, or an optical disk, and records the image data, supplied from the signal processor 4, to the recording medium.

The controller 6 controls the blocks, included in the digital camera, in accordance with a user operation or the like.

In the digital camera configured as described above, the image sensor 2 receives incident light from the optical system 1 and outputs image data in response to the incident light.

The image data output by the image sensor 2 is supplied to the memory 3 and is stored therein. The image data stored in the memory 3 is subjected to signal processing performed by the signal processor 4, and the resulting image data is supplied to the output section 5 and is output therefrom.

[Configuration Example of Image Sensor 2]

Figure 2:
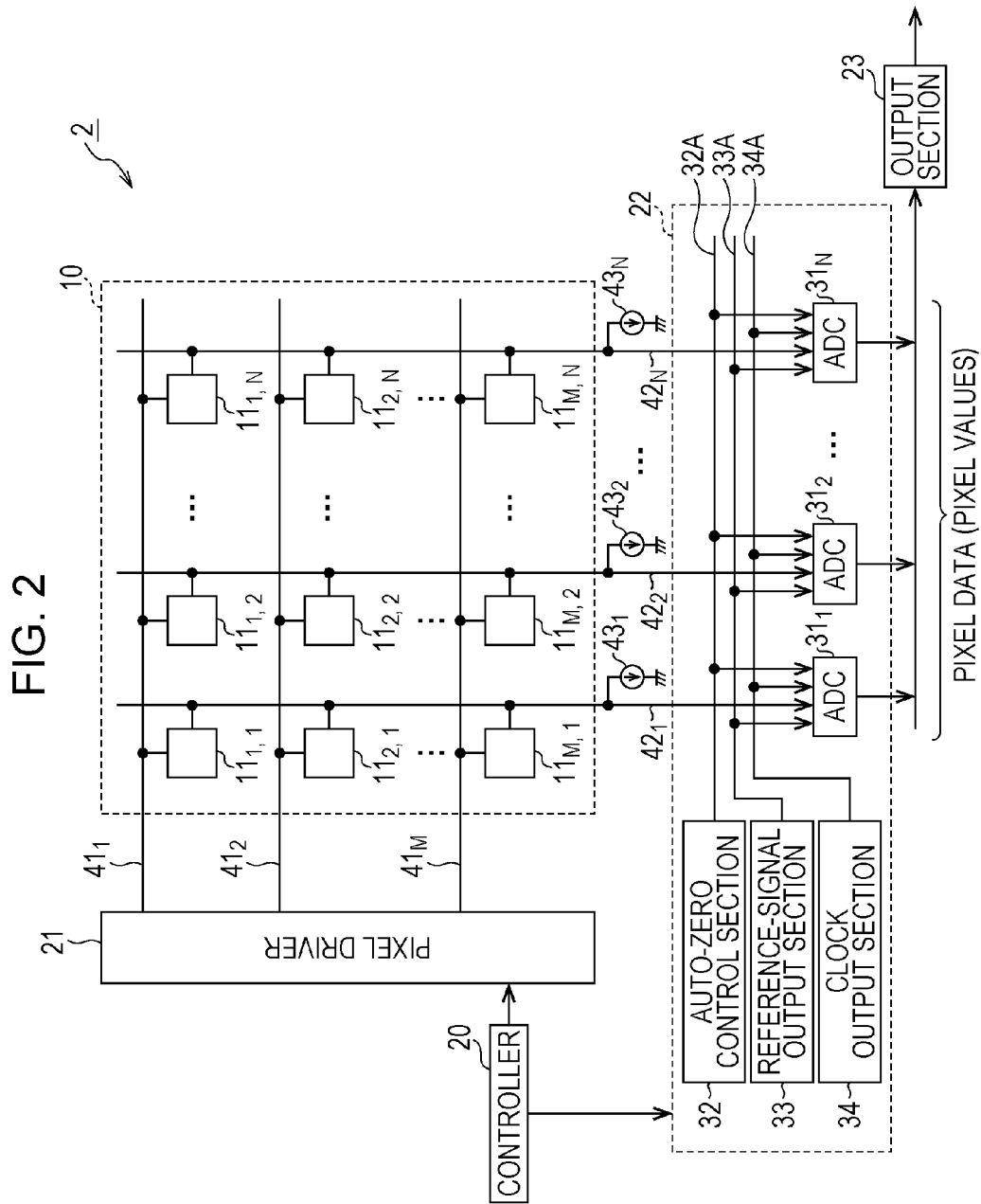
FIG. 2 is a block diagram illustrating a configuration example of an image sensor.

FIG. 2 is a block diagram illustrating a configuration example of the image sensor 2 illustrated in FIG. 1.

In FIG. 2, the image sensor 2 includes a pixel array 10, a controller 20, a pixel driver 21, a column-parallel AD converter 22, and an output section 23.

The pixel array 10 includes M×N pixels $11_{1,1}$, $11_{1,2}$, ..., $11_{1,n}$, $11_{2,1}$, $11_{2,2}$, ..., $11_{2,N}$, ..., $11_{M,1}$, $11_{1,2}$, ..., and $11_{M,N}$ (M and N are integers greater than or equal to 1), which serve as image capture elements.

The M×N pixels $11_{1,1}$ to $11_{M,N}$ are arranged in an M-row× N-column matrix (lattice) in a two-dimensional plane.

Pixel control lines $41_m$ that extend in a row direction (in a lateral direction) are each coupled to the corresponding N pixels $11_{m,1}$ to $11_{m,N}$ arranged in the row direction in the mth row (m=1, 2, . . . , M) (from top) in the pixel array 10.

Vertical signal lines $42_n$ that extend in a column direction (in a vertical direction) are also each coupled to the corresponding M pixels $11_{1,n}$ to $11_{M,n}$ arranged in the column direction in the nth column (n=1, 2, . . . , N) (from left).

The pixels $11_{m,n}$ perform photoelectric conversion on light incident thereon (incident light). The pixels $11_{m,n}$ further output voltages (electrical signals) corresponding to charges resulting from the photoelectric conversion to the vertical signal lines $42_n$ to which current sources $43_n$ are coupled, in accordance with control performed by the pixel driver 21 through the pixel control lines $41_m$.

The pixels $11_{m,n}$ can perform, for example, photoelectric conversion of predetermined-color light that is incident thereon through a color filter (not illustrated), such as a color filter with a Bayer arrangement.

In accordance with a predetermined logic or the like, the controller 20 controls the pixel driver 21, the column-parallel AD converter 22 (including an auto-zero control section 32, a reference-signal output section 33, and so on), and other blocks.

In accordance with control performed by the controller 20, the pixel driver 21 controls (drives) the pixels $11_{m,1}$ to $11_{m,N}$, coupled to the pixel control lines $41_m$, through the corresponding pixel control lines $41_m$.

The column-parallel AD converter 22 is coupled to the pixels $11_{m,1}$ to $11_{m,N}$, arranged in one row, through the corresponding vertical signal lines $42_1$ to $42_N$, so that voltages output from the pixels $11_{m,n}$ to the vertical signal lines $42_n$ (these voltages may also be referred to as "signal-line voltages" hereinafter) are supplied to the column-parallel AD converter 22.

The column-parallel AD converter 22 performs, in parallel, AD conversions of the signal-line voltages supplied from the pixels $11_{m,1}$ to $11_{m,N}$, arranged in one row, through the vertical signal lines $42_1$ to $42_N$, and supplies the resulting digital data to the output section 23 as pixel values (pixel data) of the pixels $11_{m,1}$ to $11_{m,N}$.

In this case, instead of performing, in parallel, all of the AD conversions of the electrical signals of the N pixels $11_{m,1}$ to $11_{m,N}$ arranged in one row, the column-parallel AD converter 22 can also perform AD conversions of the electrical signals of one pixel or less than N pixels of the N pixels $11_{m,1}$ to $11_{m,N}$.

Hereinafter, however, for ease of description, it is assumed that the column-parallel AD converter 22 performs, in parallel, the AD conversions of the signal-line voltages of all of the N pixels $11_{m,1}$ to $11_{m,N}$ arranged in one row.

In order to perform, in parallel, the AD conversions of the signal-line voltages of the N pixels $11_{m,1}$ to $11_{m,N}$ arranged in one row, the column-parallel AD converter 22 has N analog-to-digital converters (ADCs) $31_1$ to $31_N$.

In addition, the column-parallel AD converter 22 includes the aforementioned auto-zero control section 32, the reference-signal output section 33, and a clock output section 34.

The ADCs $31_n$ included in the auto-zero control section 32 have comparators $61_n$ (described below). The auto-zero control section 32 supplies (outputs) auto-zero pulses, which are signals for controlling auto zero processing of the comparators $61_n$, to the ADCs $31_1$ to $31_N$ through an auto-zero control line 32A.

The reference-signal output section 33 supplies (outputs) a reference signal to the ADCs $31_1$ to $31_N$ through a reference-signal line 33A. The reference signal has, for example, a period in which the level thereof changes at a certain gradient like that of a ramp signal from a predetermined initial value to a predetermined final value.

The clock output section 34 supplies (outputs) clocks having a predetermined frequency to the ADCs $31_1$ to $31_N$ through a clock line 34A.

The ADCs $31_n$ are coupled to the vertical signal lines $42_n$, respectively. Thus, the signal-line voltages (electrical signals) output from the pixels $11_{m,n}$ to the vertical signal lines $42_n$ are supplied to the ADCs $31_n$.

The ADCs $31_n$ perform the AD conversions of the signal-line voltages output from the pixels $11_{m,n}$ by using the reference signal from the reference-signal output section 33 and the clocks from the clock output section 34, and further perform CDS to obtain digital data as pixel values.

In this case, each ADC $31_n$ compares the signal-line voltage of the pixel $11_{m,n}$ with the reference signal from the reference-signal output section 33 and counts time taken for the level of the reference signal to vary until the signal-line voltage of the pixel $11_{m,n}$ and the level of the reference signal match each other (i.e., until the magnitude relationship between the signal-line voltage and the reference signal is reversed) to perform AD conversion on the signal-line voltage of the pixel $11_{m,n}$.

The ADC $31_n$ performs the counting of time taken for the level of the reference signal to vary until the signal-line voltage of the pixel $11_{m,n}$ and the level of the reference signal match each other, by counting clocks from the clock output section 34.

The signal-line voltages of the N pixels $11_{m,1}$ to $11_{m,N}$ in each of the first to Mth rows in the pixel array 10 are sequentially supplied, for example, starting from the first row to the N ADCs $31_1$ to $31_N$, so that the AD conversion and CDS on the signal-line voltages are performed for each row.

The output section 23 selects a column n from which the pixel values are to be read; reads the pixel values of the pixels $11_{m,n}$ the pixel values being determined by the ADC $31_n$, from the ADC $31_n$ in the column n; and outputs the pixel values to outside (in the present embodiment, to the memory 3 (FIG. 1)).

Although a case in which the ADC $31_n$ performs the CDS in addition to the AD conversion has been described above, the arrangement may also be such that the ADC $31_n$ performs only the AD conversion and the output section 23 performs the CDS.

[Example Configuration of Pixel $11_{m,n}$]

Figure 3:
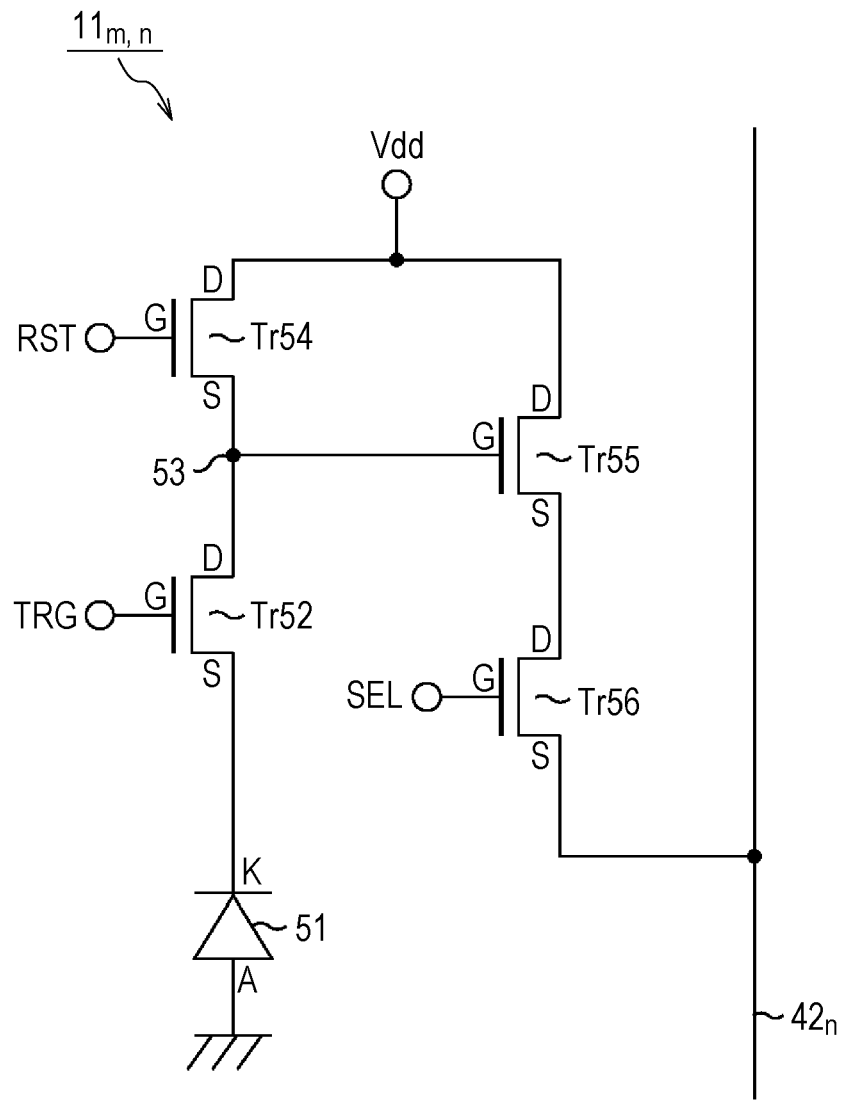
FIG. 3 is a circuit diagram illustrating an example configuration of a pixel.

FIG. 3 is a circuit diagram illustrating an example configuration of the pixel $11_{m,n}$ in FIG. 2.

In FIG. 3, the pixel $11_{m,n}$ has a PD 51 and four negative-channel metal-oxide field-effect transistors (nMOS FETs) 52, 54, 55, and, 56.

In the pixel $11_{m,n}$, a drain of the FET 52, a source of the FET 54, and a gate of the FET 55 are coupled to one another, and at the node thereof, a floating diffusion (FD, a capacitor) 53 for converting charge into a voltage is formed.

The PD 51 is one example of a photoelectric conversion element that performs photoelectric conversion. The PD 51 receives incident light, accumulates charge corresponding to the incident light, and performs photoelectric conversion.

An anode of the PD 51 is connected to ground (is grounded), and a cathode of the PD 51 is coupled to a source of the FET 52.

The FET 52 is an FET for transferring the charge, accumulated in the PD 51, from the PD 51 to the FD 53, and may also be referred to as a "transfer transistor Tr52" hereinafter.

The source of the transfer transistor Tr52 is coupled to the cathode of the PD 51, and the drain of the transfer transistor Tr52 is coupled to the source of the FET 54 via the FD 53.

A gate of the transfer transistor Tr52 is coupled to the pixel control line $41_m$. A transfer pulse TRG is supplied to the gate of the transfer transistor Tr52 through the pixel control line $41_m$.

The pixel driver 21 (FIG. 2) supplies control signals to the pixel control lines $41_m$ in order to drive (control) the pixels $11_{m,n}$ through the pixel control lines $41_m$. The control signals include a reset pulse RST and a selection pulse SEL, in addition to the transfer pulse TRG.

The FD 53 is formed at the node of the drain of the transfer transistor Tr52, the source of the FET 54, and the gate of the FET 55, as described above, and is a region for converting charge into a voltage, like a capacitor.

The FET 54 is an FET for resetting the charge (voltage (potential)) accumulated in the FD 53 and may also be referred to as a "reset transistor Tr54" hereinafter.

A drain of the reset transistor Tr54 is coupled to a power source Vdd.

A gate of the reset transistor Tr54 is coupled to the pixel control line $41_m$. The reset pulse RST is supplied to the gate of the reset transistor Tr54 through the pixel control line $41_m$.

The FET 55 is an FET for amplifying the voltage of the FD 53 and may also be referred to as an "amplification transistor Tr55" hereinafter.

The gate of the amplification transistor Tr55 is coupled to the FD 53, and a drain of the amplification transistor Tr55 is coupled to the power source Vdd. A source of the amplification transistor Tr55 is coupled to a drain of the FET 56.

The FET 56 is an FET for selecting outputting of the electrical signal (voltage) to the vertical signal line $42_n$ and may also be referred to as a "selection transistor Tr56" hereinafter.

A source of the selection transistor Tr56 is coupled to the vertical signal line $42_n$.

A gate of the selection transistor Tr56 is coupled to the pixel control line $41_m$. The selection pulse SEL is supplied to the gate of the selection transistor Tr56 through the pixel control line $41_m$.

The amplification transistor Tr55, the selection transistor Tr56, and the current source $43n$ (FIG. 2), coupled to the vertical signal line $42_n$ coupled to the source of the selection transistor Tr56, constitute a source follower circuit. That is, the FD 53 is coupled to the vertical signal line $42_n$ through the source follower circuit.

The pixel $11_{m,n}$ can also be constituted without the selection transistor Tr56.

The pixel $11_{m,n}$ can also employ a shared-pixel configuration in which the FD 53, the reset transistor Tr54, the amplification transistor Tr55, the selection transistor Tr56 are shared by a plurality of PDs 51 and a plurality of transfer transistors Tr52.

In the pixel $11_{m,n}$ configured as described above, the PD 51 receives light incident thereon and performs photoelectric conversion to thereby start accumulation of charge corresponding to the amount of the received incident light. For ease of description, it is assumed in this case that the selection pulse SEL is at a high (H) level and the selection transistor Tr56 is in an on state.

When a predetermined time (exposure time) passes after the accumulation of charge in the PD 51 is started, the pixel driver 21 (FIG. 2) temporarily changes the transfer pulse TRG from a low (L) level to a high (H) level.

When the transfer pulse TRG is temporarily changed to the H level, the transfer transistor Tr52 is temporarily turned on.

When the transfer transistor Tr52 is turned on, the charge accumulated in the PD 51 is transferred to the FD 53 via the transfer transistor Tr52 and is accumulated in the FD 53.

Before temporarily changing the transfer pulse TRG to the H level, the pixel driver 21 temporarily changes the reset pulse RST to the H level to thereby temporarily turn on the reset transistor Tr54.

When the reset transistor Tr54 is turned on, the FD 53 is connected to the power source Vdd via the reset transistor Tr54, so that the charge in the FD 53 is discharged to the power source Vdd via the reset transistor Tr54 and is reset.

Herein, the operation in which the FD 53 is connected to the power source Vdd to reset the charge in the FD 53, as described above, means resetting the pixel $11_{m,n}$.

After the charge in the FD 53 is reset, the pixel driver 21 temporarily changes the transfer pulse TRG to the H level, so that the transfer transistor Tr52 is temporarily turned on, as described above.

When the transfer transistor Tr52 is turned on, the charge accumulated in the PD 51 is transferred to the post-reset FD 53 via the transfer transistor Tr52 and is accumulated in the FD 53.

The voltage (potential) corresponding to the charge accumulated in the FD 53 is output to the vertical signal line $42_n$ via the amplification transistor Tr55 and the selection transistor Tr56 as a signal-line voltage.

In the ADC $31_n$ (FIG. 2) coupled to the vertical signal line $42_n$, a reset level that is the signal-line voltage immediately after resetting the pixel $11_{m,n}$ is subjected to AD conversion.

In addition, the ADC $31_n$ performs AD conversion on a signal level (including the reset level and a level indicating a pixel value) that is the signal-line voltage after the transfer transistor Tr52 is temporarily turned on (i.e., the voltage corresponding to charge accumulated in the PD 51 and transferred to the FD 53).

The ADC $31_n$ then performs CDS for determining, as a pixel value, a difference between an AD-conversion result of the reset level (this result may also be referred to as a "reset-level AD value" hereinafter) and an AD-conversion result of the signal level (this result may also be referred to as a "signal-level AD value" hereinafter).

[Example Configuration of ADC $31_n$]

Figure 4:
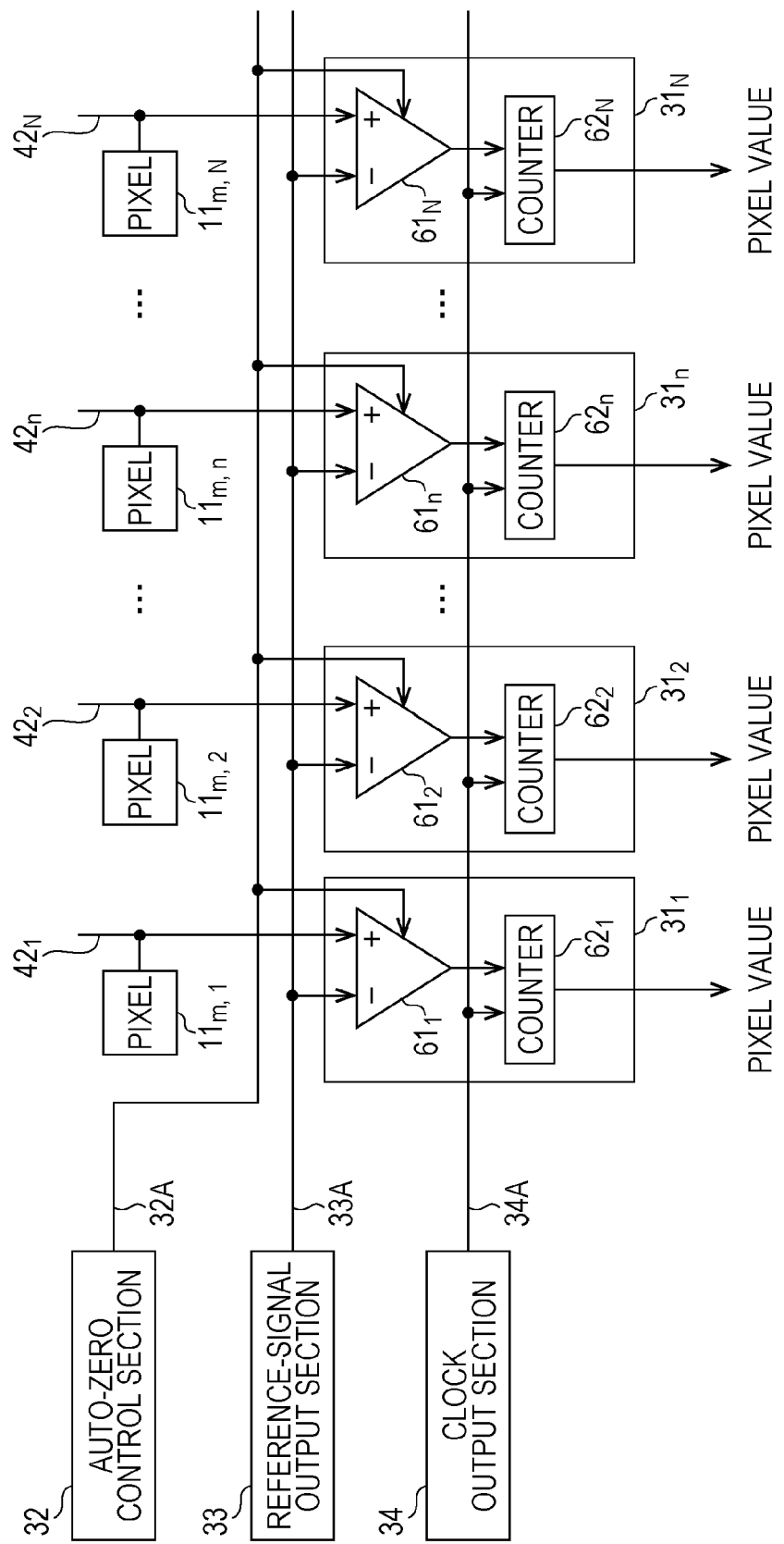
FIG. 4 is a block diagram illustrating an example configuration of ADCs.

FIG. 4 is a block diagram illustrating an example configuration of the ADCs $31_n$ in FIG. 2.

Each ADC $31_n$ has a comparator $61_n$ and a counter $62_n$ and performs reference-signal-comparison-type AD conversion and CDS.

The comparator $61_n$ has two input terminals. One of the input terminals serves as an inverting input terminal (−) to which, for example, the reference signal, which is one of the reference signal from the reference-signal output section 33 and the signal-line voltage (the reset level or the signal level) of the pixel $11_{m,n}$, is supplied. The other input terminal of the two input terminals of the comparator $61_n$ serves as a non-inverting input terminal (+) to which, for example, the signal-line voltage, which is the other one of the reference signal from the reference-signal output section 33 and the signal-line voltage of the pixel $11_{m,n}$ is supplied.

The comparator $61_n$ compares the reference signal supplied to the inverting input terminal with the signal-line voltage supplied to the non-inverting input terminal and outputs the comparison result.

That is, when the reference signal supplied to the inverting input terminal is larger than the signal-line voltage supplied to the non-inverting input terminal, the comparator $61_n$ outputs, for example, the H level, which is one of the H and L levels.

When the signal-line voltage supplied to the non-inverting input terminal is larger than the voltage of the reference signal supplied to the inverting input terminal, the comparator $61_n$ outputs the L level, which is the other one of the H and L levels.

The auto-zero pulse is supplied from the auto-zero control section 32 to the comparator $61_n$ through the auto-zero control line 32A. In accordance with the auto-zero pulse from the auto-zero control section 32, the comparator $61_n$ performs auto zero processing.

In this case, in the auto zero processing, the comparator $61_n$ is set so that the comparator $61_n$ can provide a comparison result indicating that the two input signals presently supplied to the comparator $61_n$, that is, the signal presently supplied to the inverting input terminal of the comparator $61_n$ and the signal presently supplied to the non-inverting input terminal, match each other.

An output of the comparator $61_n$ and clocks from the clock output section 34 are supplied to the counter $62_n$.

The counter $62_n$ starts counting of clocks from the clock output section 34 at the timing when the reference signal (the level thereof) supplied from the reference-signal output section 33 to the comparator $61_n$ starts to change. When the output of the comparator $61_n$ changes, for example, from the H level to the L level, that is, when the reference signal supplied to the inverting input terminal of the comparator $61_n$ and the level of the signal-line voltage supplied to the non-inverting input terminal become equal to each other (to be exact, when the magnitude relationship between the reference signal and the signal-line voltage is reversed), the counter $62_n$ finishes the counting of the clocks from the clock output section 34.

The counter $62_n$ then outputs the count value of the clocks as an AD-conversion result of the signal-line voltage supplied to the non-inverting input terminal of the comparator $61_n$.

The reference-signal output section 33 outputs, as the reference signal, a signal having a slope (a sloped waveform) that decreases at a certain rate, for example, from a predetermined initial value to a predetermined final value.

In this case, the counter $62_n$ counts time from when the slope is started until the voltage of the reference signal changes to the signal-line voltage supplied to the non-inverting input terminal of the comparator $61_n$, and uses the count value resulting from the counting as an AD-conversion result of the signal-line voltage supplied to the non-inverting input terminal of the comparator $61_n$.

The ADC $31_n$ obtains AD-conversion results of the reset level and the signal level that are indicated by the signal-line voltage supplied from the pixel $11_{m,n}$ to the non-inverting input terminal of the comparator $61_n$. The ADC $31_n$ then performs CDS for determining a difference between the AD-conversion result of the signal level (i.e., the signal-level AD value) and the AD-conversion result of the reset level (i.e., the reset-level AD value) and outputs the determined difference as the pixel value of the pixel $11m.n$.

The ADC $31_n$ can perform the CDS by controlling, for example, the clock counting at the counter $62_n$, as well as actually performing an arithmetic operation for determining the difference between the signal-level AD value and the reset-level AD value.

That is, with respect to the reset level, the counter $62_n$ counts clocks, for example, while decrementing the count value by 1, and with respect to the signal level, the counter $62_n$ counts clocks while incrementing the count value by 1, in a manner opposite to the case of the reset level, by using the clock count value for the reset level as an initial value. By doing so, while performing AD conversion of the reset level and the signal level, it is possible to perform CDS for determining a difference between the signal level (the AD-conversion result thereof) and the reset level (the AD-conversion result thereof).

In the present embodiment, although the reference signal is implemented by a ramp signal having a slope that decreases at a certain rate, the reference signal may also be implemented by, for example, a ramp signal having a slope that increases at a certain rate.

[Example Configuration of Comparator $61_n$]

Figure 5:
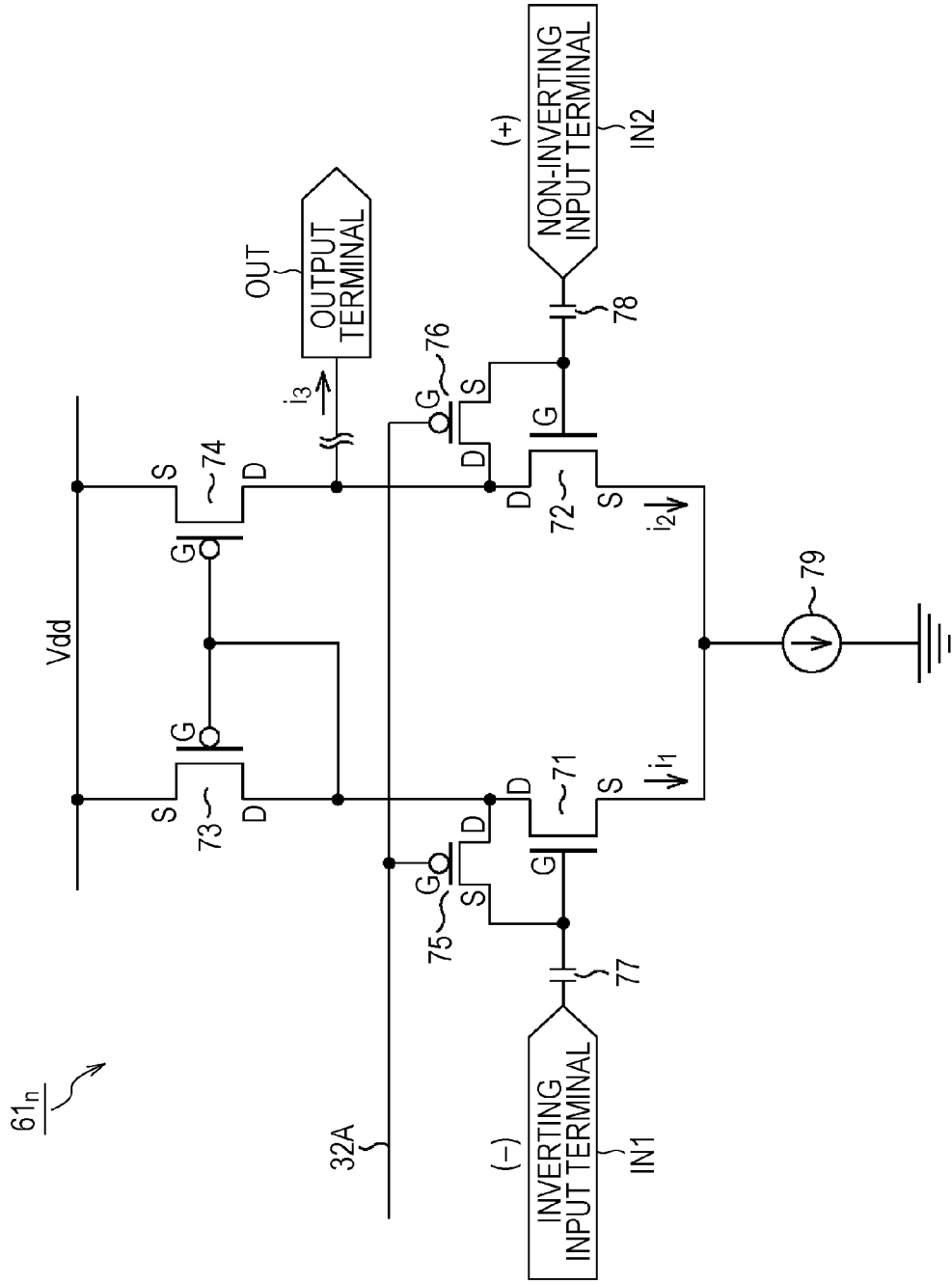
FIG. 5 is a circuit diagram illustrating an example configuration of a comparator.

FIG. 5 is a circuit diagram illustrating an example configuration of the comparator $61_n$ in FIG. 4.

In FIG. 5, the comparator $61_n$ has FETs 71, 72, 73, 74, 75, and 76, capacitors 77 and 78, and a current source 79.

The FETs 71 and 72 are nMOS FETs, and sources thereof are coupled to each other. In addition, the node of the sources of the FETs 71 and 72 is coupled to one end of the current source 79 whose another end is connected to ground. The FETs 71 and 72 constitute the so-called differential pair.

A gate of the FET 71 is coupled to an inverting input terminal IN1 of the comparator $61_n$ via the capacitor 77, and a gate of the FET 72 is coupled to a non-inverting input terminal IN2 of the comparator $61_n$ via the capacitor 78.

The comparator $61_n$ has, at its input stage, the differential pair constituted by the FETs 71 and 72, as described above.

The FETs 73 and 74 are positive-channel metal-oxide field-effect transistors (pMOS FETs), and gates thereof are coupled to each other.

Sources of the FETs 73 and 74 are coupled to the power source Vdd, and the node of the gates of the FETs 73 and 74 is coupled to a drain of the FET 73, so that the FETs 73 and 74 constitute a current mirror.

The drain of the FET 73 of the FETs 73 and 74, which constitute the current mirror, is coupled to a drain of the FET 71, and a drain of the FET 74 is coupled to a drain of the FET 72.

The node of the drains of the FETs 72 and 74 is coupled to an output terminal $OUT_n$ of the comparator $61_n$.

A circuit (not illustrated), such as an amplifier (buffer) for performing desired output from the comparator $61_n$, is provided between the node of the drains of the FETs 72 and 74 and the output terminal $OUT_n$.

The FETs 75 and 76 are pMOS FETs, a drain of the FET 75 is coupled to the drain of the FET 71, and a source of the FET 75 is coupled to the gate of the FET 71. A gate of the FET 75 is coupled to the auto-zero control line 32A, so that the auto-zero pulse is supplied to the gate of the FET 75.

A drain of the FET 76 is coupled to the drain of the FET 72, and a source of the FET 76 is coupled to the gate of the FET 72. A gate of the FET 76 is coupled to the auto-zero control line 32A, so that the auto-zero pulse is supplied to the gate of the FET 76.

One end of the capacitor 77 is coupled to the node of the gate of the FET 71 and the source of the FET 75, and another end of the capacitor 77 is coupled to the inverting input terminal IN1.

One end of the capacitor 78 is coupled to the node of the gate of the FET 72 and the source of the FET 76, and another end of the capacitor 78 is coupled to the non-inverting input terminal IN2.

In the comparator $61_n$ configured as described above, current $i_1$ corresponding to the gate voltage of the FET 71 flows to the FET 71 (from the drain thereof to the source), and current i2 corresponding to the gate voltage of the FET 72 flows to the FET 72 (from the drain thereof to the source).

The same current flows to the FETs 73 and 74 (from the drains to the sources), which constitute the current mirror (i.e., the same current as the current that flows to the FET 73 flows to the FET 74).

Thus, when the voltage applied to the gate of the FET 71 from the inverting input terminal IN1 via the capacitor (i.e., the gate voltage of the FET 71) is larger than the voltage applied from the non-inverting input terminal IN2 to the gate of the FET 72 via the capacitor 78 (i.e., the gate voltage of the FET 72), the current $i_1$ flowing to the FET 71 becomes larger than the current i2 flowing to the FET 72.

In this case, current $i_3$ ($=i_1-i_2$), which is part of current flowing from the power source Vdd via the FET 74, flows to the output terminal OUT, so that the output terminal OUT becomes a H level.

On the other hand, when the voltage applied to the gate of the FET 72 from the non-inverting input terminal IN2 via the capacitor 78 (i.e., the gate voltage of the FET 72) is larger than the voltage applied to the gate of the FET 71 from the inverting input terminal IN1 via the capacitor 77 (i.e., the gate voltage of the FET 71), the current $i_2$ flowing to the FET 72 is larger than the current $i_1$ flowing to the FET 71.

In this case, since the current $i_3$ flows from the output terminal OUT to the FET 72 (or is drawn thereinto), the output terminal OUT becomes a L level.

The auto-zero pulse is supplied to the gates of the FETs 75 and 76.

The auto-zero pulse is a pulse that temporarily changes from the H level to the L level. Thus, in response to the auto-zero pulse, the FETs 75 and 76 are temporarily turned on.

When the FETs 75 and 76 are turned on, the gate and the drain of the FET 71 are connected to each other, the gate and the drain of the FET 72 are connected to each other, and thus the gate voltages of the FETs 71 and 72 become the same.

Thus, when the auto-zero pulse changes to the L level, charges are accumulated in the capacitors 77 and 78 so that the voltage applied to the gate of the FET 71 from the inverting input terminal IN1 via the capacitor 77 (the gate voltage of the FET 71) and the voltage applied to the gate of the FET 72 from the non-inverting input terminal IN2 via the capacitor 78 (the gate voltage of the FET 72) match each other.

When the auto-zero pulse changes to the H level, the connection between the gate and the drain of the FET 71 is disconnected and the connection between the gate and the drain of the FET 72 is also disconnected. When the auto-zero pulse changes to the L level, the charges accumulated in the capacitor 77 and 78 are maintained.

As a result, the comparator $61_n$ is set so as to obtain a comparison result indicating that the two input signals that have been applied to the comparator $61_n$, that is, the signal supplied to the inverting input terminal of the comparator $61_n$ and the signal supplied to the non-inverting input terminal thereof, when the auto-zero pulse becomes the L level (when the auto-zero pulse rises), match each other.

In the auto zero processing, the setting of the comparator $61_n$ is performed as described above.

According to the auto zero processing, the comparator $61_n$ can determine the magnitude relationship between the voltage applied to the inverting input terminal and the voltage applied to the non-inverting input terminal by using, as a reference, the state in which the voltage that has been applied to the inverting input terminal of the comparator $61_n$ and the voltage that has been applied to the non-inverting input terminal thereof match each other during the auto zero processing.

[Normal Mode]

Figure 6:
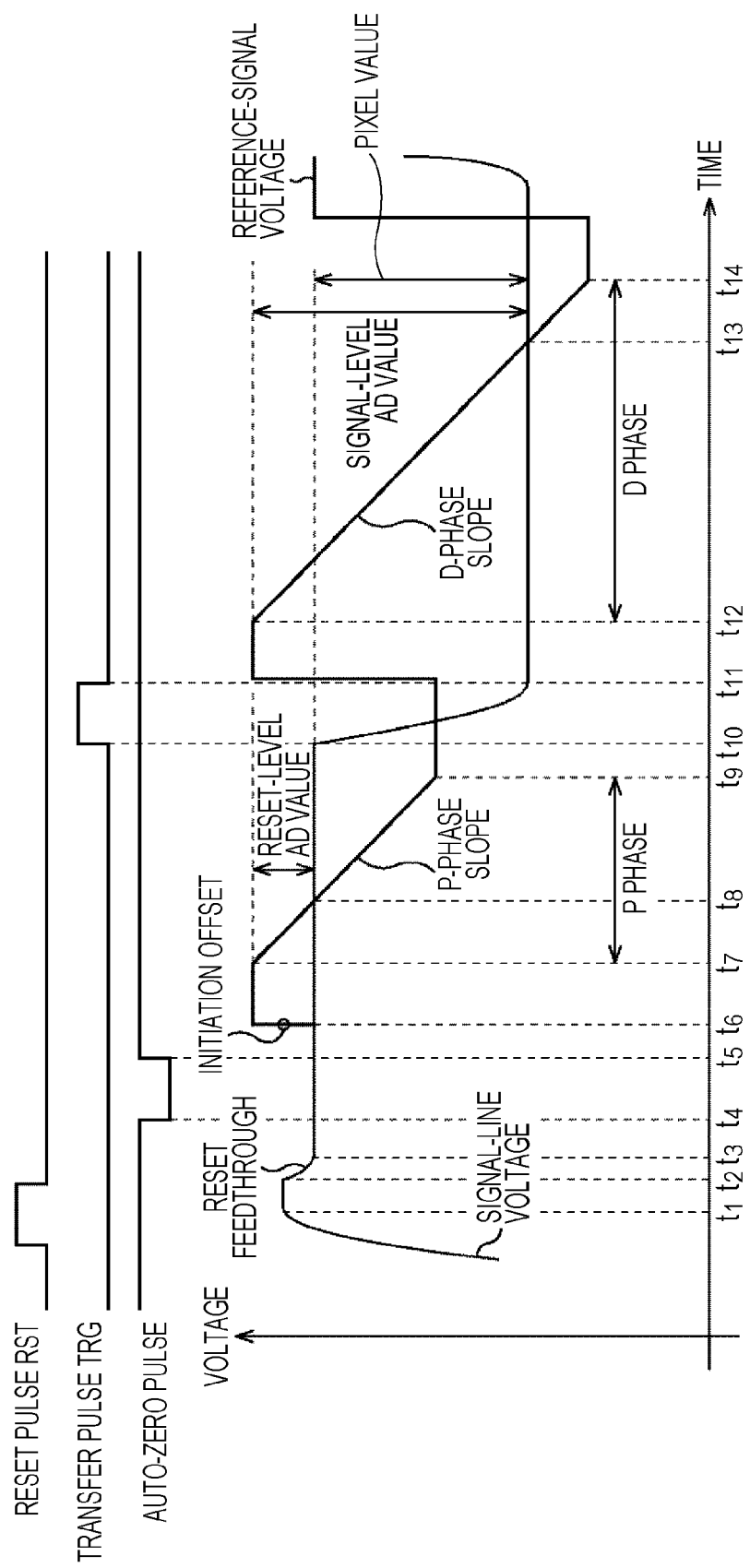
FIG. 6 is a waveform diagram illustrating a signal-line voltage and a reference signal.

FIG. 6 illustrates an operation of the image sensor 2 (FIG. 2) when an auto-zero mode is a normal mode.

In this case, the image sensor 2 illustrated in FIG. 2 has a normal mode and a black-sunspot avoidance mode as a mode (auto-zero mode) for performing auto zero processing of the comparators $61_n$ (FIG. 5) included in the ADCs $31_n$.

First, a description will be given of an operation of the image sensor 2 when the auto-zero mode is the normal mode.

FIG. 6 is a waveform diagram illustrating an example of the signal-line voltage that is a voltage of the electrical signal supplied from the pixel $11_{m,n}$ in the image sensor 2 to the non-inverting input terminal (+) of the comparator $61_n$ in the ADC $31_n$ via the vertical signal line $42_n$ and the voltage (the reference-signal voltage) of the reference signal supplied from the reference-signal output section 33 to the inverting input terminal (−) of the comparator $61_n$ in the ADC $31_n$ via the reference-signal line 33A.

FIG. 6 illustrates the transfer pulse TRG supplied to the transfer transistor Tr52 (the gate thereof) (FIG. 3), the reset pulse RST supplied to the reset transistor Tr54, and the auto-zero pulse supplied from the auto-zero control section 32 to the FETs 75 and 76 in the comparator $61_n$ (FIG. 5), in conjunction with the signal-line voltage and the reference-signal voltage.

The signal-line voltage illustrated in FIG. 6 is a voltage applied to the gate of the FET 71 in the comparator $61_n$ (FIG. 5) (not a voltage itself in the vertical signal line $42_n$), and the reference-signal voltage is a voltage applied to the gate of the FET 72 in the comparator $61_n$ (not a voltage itself in the reference-signal line 33A). The same also applies to the figures described below.

In the image sensor 2, the reset pulse RST is temporarily changed to the H level, so that the pixel $11_{m,n}$ is reset.

During the resetting of the pixel $11_{m,n}$, the FD 53 is connected to the power source Vdd via the reset transistor Tr54, so that the charge in the FD 53 is reset, as described above in FIG. 3. Thus, the signal-line voltage output by the pixel $11_{m,n}$, that is, the voltage output from the FD 53 in the pixel $11_{m,n}$ to the vertical signal line $42_n$ via the amplification transistor Tr55 and the selection transistor Tr56, increases to become a voltage corresponding to the power source Vdd at time $t_1$.

While the FD 53 is connected to the power source Vdd, the signal-line voltage is maintained relative to the power source Vdd, and then, when the reset pulse RST is changed to the L level at time $t_2$, a certain amount of charge moves in the pixel $11_{m,n}$ and thus a small amount of charge enters the FD 53. As a result, the signal-line voltage drops slightly.

In FIG. 6, from time $t_2$ at which the reset pulse RST reaches the L level to subsequent time $t_3$, the charge movement in the pixel $11_{m,n}$ causes the signal-line voltage to drop slightly.

The signal-line voltage drop that occurs after resetting of the pixel $11_{m,n}$, as described above, is hereinafter referred to as "reset feedthrough".

In the normal mode, after the pixel $11_{m,n}$ is reset (or while the pixel $11_{m,n}$ is being reset), the auto-zero control section 32 changes the auto-zero pulse to the L level to thereby start the auto zero processing of the comparator $61_n$ (FIG. 4).

In FIG. 6, at time $t_4$ after the reset feedthrough occurs, the auto-zero pulse is changed from the H level to the L level to thereby start the auto zero processing of the comparator $61_n$. Thereafter, at time $t_5$, the auto-zero pulse is changed from the L level to the H level, so that the auto zero processing of the comparator $61_n$ is finished (completed).

In the auto zero processing, the comparator $61_n$ is set so as to be able to determine (compare) the magnitude relationship between the signal-line voltage and the reference signal by using, as a reference, the state in which the signal-line voltage applied to the comparator $61_n$ and the reference signal supplied thereto match each other at time $t_5$ that is the timing of the rising edge of the auto-zero pulse.

In the normal mode, the auto zero processing is performed so that it is completed after the resetting of the pixel $11_{m,n}$, as illustrated in FIG. 6.

Thus, in the normal mode, the comparator $61_n$ is (generally) set so as to be able to determine the magnitude relationship between the signal-line voltage and the reference signal by using, as a reference, the state in which the voltage that has dropped from the signal-line voltage during resetting of the pixel $11_{m,n}$ by an amount corresponding to the reset feedthrough matches the reference signal.

As a result, in the normal mode, the reference signal (the waveform thereof) is (generally) arranged at a position where the voltage that has dropped from the signal-line voltage during resetting of the pixel $11_{m,n}$ by an amount corresponding to the reset feedthrough is a "reference".

The reference-signal output section 33 (FIG. 4) increases the reference signal by a predetermined voltage, at time $t_6$ after the auto zero processing is completed (finished).

Herein, in the normal mode, increasing the reference signal by a predetermined voltage at time $t_6$ after the auto zero processing is finished is referred to as "initiation offset".

Also, the reference-signal output section 33 reduces the reference-signal voltage at a certain rate in order to perform AD conversion of the signal-line voltage, and a portion of the reference signal, the reference-signal voltage of the portion being reduced at the certain rate, is also referred to as a "slope".

In the normal mode, at time $t_6$, the reference-signal output section 33 performs the initiation offset for offsetting the reference-signal voltage by the predetermined voltage in a direction opposite to the direction of the slope (the direction in which the reference signal changes).

Thereafter, in the period of time $t_7$ to time $t_9$, the reference-signal output section 33 reduces (lowers) the reference-signal voltage at a certain rate.

Thus, the reference signal in the period of time $t_7$ to time $t_9$ forms a slope.

The slope of the reference signal in the period of time $t_7$ to time $t_9$ is a slope for performing AD conversion on the reset level of the signal-line voltage (i.e., the signal-line voltage immediately after the resetting of the pixel $11_{m,n}$ (more specifically, the signal-line voltage after the pixel $11_{m,n}$ is reset and the voltage drop due to the reset feedthrough occurs)). Hereinafter, the period of this slope (the period from time $t_7$ to time $t_9$) is also referred to as a preset (P) phase. The slope in the P phase is also referred to as a "P-phase slope".

In this case, since the comparator $61_n$ is set in the auto zero processing after resetting of the pixel $11_{m,n}$ so that the signal-line voltage during the auto zero processing and the reference signal match each other, the reference signal is increased by the predetermined voltage at time $t_6$ after the auto zero processing is finished. As a result, the reference-signal voltage becomes larger than the signal-line voltage (the reset level). Thus, at the start time $t_7$ of the P phase, the comparator $61_n$ outputs a comparison result indicating that the reference signal is larger than the signal-line voltage.

At the start time $t_7$ of the P-phase slope, the counter $62_n$ in the ADC $31_n$ (FIG. 4) starts counting of clocks.

In the P phase, the reference-signal voltage decreases. In FIG. 6, at time $t_8$ in the P phase, the reference signal and the signal-line voltage indicating the reset level match each other, and the magnitude relationship between the reference signal and the reset level is reversed relative to the magnitude relationship at the start of the P phase.

As a result, the comparison result output by the comparator $61_n$ is reversed relative to the comparison result output at the start of the P phase, so that the comparator $61_n$ starts to output a comparison result indicating that the signal-line voltage indicating the reset level is larger than the reference signal.

When the comparison result output by the comparator $61_n$ is reversed, the counter $62_n$ in the ADC $31_n$ (FIG. 4) finishes the clock counting, and the count value of the counter $62_n$ at this point in time serves as the AD-conversion result of the reset level (the reset-level AD value).

In this case, when the comparison result output by the comparator $61_n$ is reversed in the P phase, the signal-line voltage indicating the reset level and the reference signal (voltage) cross each other, as illustrated in FIG. 6.

Thus, when the signal-line voltage indicating the reset level and the reference signal (the P-phase slope) cross each other in the P phase, the comparison result output by the comparator $61_n$ is reversed, so that the AD-conversion result of the reset level (i.e., the reset-level AD value) can be obtained.

On the other hand, if the signal-line voltage indicating the reset level and the reference signal (the P-phase slope) do no cross each other in the P phase, the comparison result output by the comparator $61_n$ is not reversed, so that AD-conversion result of the reset level (i.e., the reset-level AD value) is not obtained.

After the P phase is finished, the transfer pulse TRG in the image sensor 2 is changed from the L level to the H level between time $t_{10}$ and $t_{11}$. As a result, in the pixel $11_{m,n}$ (FIG. 3), the charge accumulated in the PD 51 by photoelectric conversion is transferred to the FD 53 via the transfer transistor Tr52.

As a result of the charge transfer from the PD 51 to the FD 53, the signal-line voltage, which is a voltage corresponding to the charge accumulated in the FD 53, drops. At time $t_{11}$, when the transfer pulse TRG changes from the H level to the L level, the charge transfer from the PD 51 to the FD 53 is finished, so that the signal-line voltage reaches a signal level corresponding to the charge accumulated in the FD 53.

After the P phase is finished, the reference-signal output section 33 (FIG. 4) increases the reference-signal voltage to, for example, a voltage that is the same as that when the P phase was started. Thereafter, in the period of time $t_{12}$ to time $t_{14}$, the reference-signal output section 33 reduces (lowers) the reference-signal voltage at the same rate of change as that in the case of the P phase.

Thus, the reference signal in the period of time $t_{12}$ to time $t_{14}$ forms a slope, similarly to the reference signal in the period of time $t_7$ to time $t_9$.

The slope of the reference signal in the period of time $t_{12}$ to time $t_{14}$ is a slope for performing AD conversion on the signal level of the signal-line voltage (i.e., the signal-line voltage immediately after the charge transfer from the PD 51 to the FD 53 is performed in the pixel $11_{m,n}$ (FIG. 3)). Hereinafter, the period of this slope (the period of time $t_{12}$ to time $t_{14}$) may also be referred to as a "data (D) phase". The slope in the D phase is also referred to as a "D-phase slope".

In this case, at the start time $t_{12}$ of the D phase, the reference-signal voltage is larger than the signal-line voltage (the signal level), as in the case at the start time $t_7$ of the P phase. Thus, at the start time $t_{12}$ of the D phase, the comparator $61_n$ outputs a comparison result indicating that the reference signal is larger than the signal-line voltage.

At the start time $t_{12}$ of the D-phase slope, the counter $62_n$ in the ADC $31_n$ (FIG. 4) starts to count clocks.

In the D phase, the reference-signal voltage decreases. In FIG. 6, at time $t_{13}$ of the D phase, the reference signal and the signal-line voltage indicating the signal level match each other, and the magnitude relationship between the reference signal and the signal level is reversed relative to the magnitude relationship at the start time of the D phase.

As a result, the comparison result output by the comparator $61_n$ is also reversed relative to the comparison result output at the time of the D phase, so that the comparator $61_n$ outputs a comparison result indicating that the signal-line voltage indicating the signal level is larger than the reference signal.

When the comparison result output by the comparator $61_n$ is reversed, the counter $62_n$ in the ADC $31_n$ (FIG. 4) finishes the clock counting. The count value of the counter $62_n$ at this point in time serves as the AD-conversion result of the signal level (the signal-level AD value).

When the comparison result output by the comparator $61_n$ is reversed in the D phase, the signal-line voltage indicating the signal level and the reference signal (voltage) cross each other, as illustrated in FIG. 6.

That is, when the signal-line voltage indicating the signal level and the reference signal (the D-phase slope) cross each other in the D phase, the comparison result output by the comparator $61_n$ is reversed, so that the AD-conversion result of the signal level (the signal-level AD value) can be output.

On the other hand, if the signal-line voltage indicating the signal level and the reference signal (the D-phase slope) do not cross each other in the D phase, the comparison result output by the comparator $61_n$ is not reversed, so that the AD-conversion result of the signal level (the signal-level AD value) is not obtained.

When the reset-level AD value is determined in the P phase and the signal-level AD value is determined in the D phase, as described above, the image sensor 2 performs CDS for determining a difference between the reset-level AD value and the signal-level AD value and outputs the difference resulting from the CDS as a pixel value.

As described above with reference to FIG. 6, the image sensor 2 obtains pixel values in a column parallel manner (i.e., for each row). For example, in the normal mode, when an image of a subject with a high luminance, such as the sun, is captured, there are cases in which a black sunspot occurs to thereby degrade the image quality, as described above.

Figure 7:
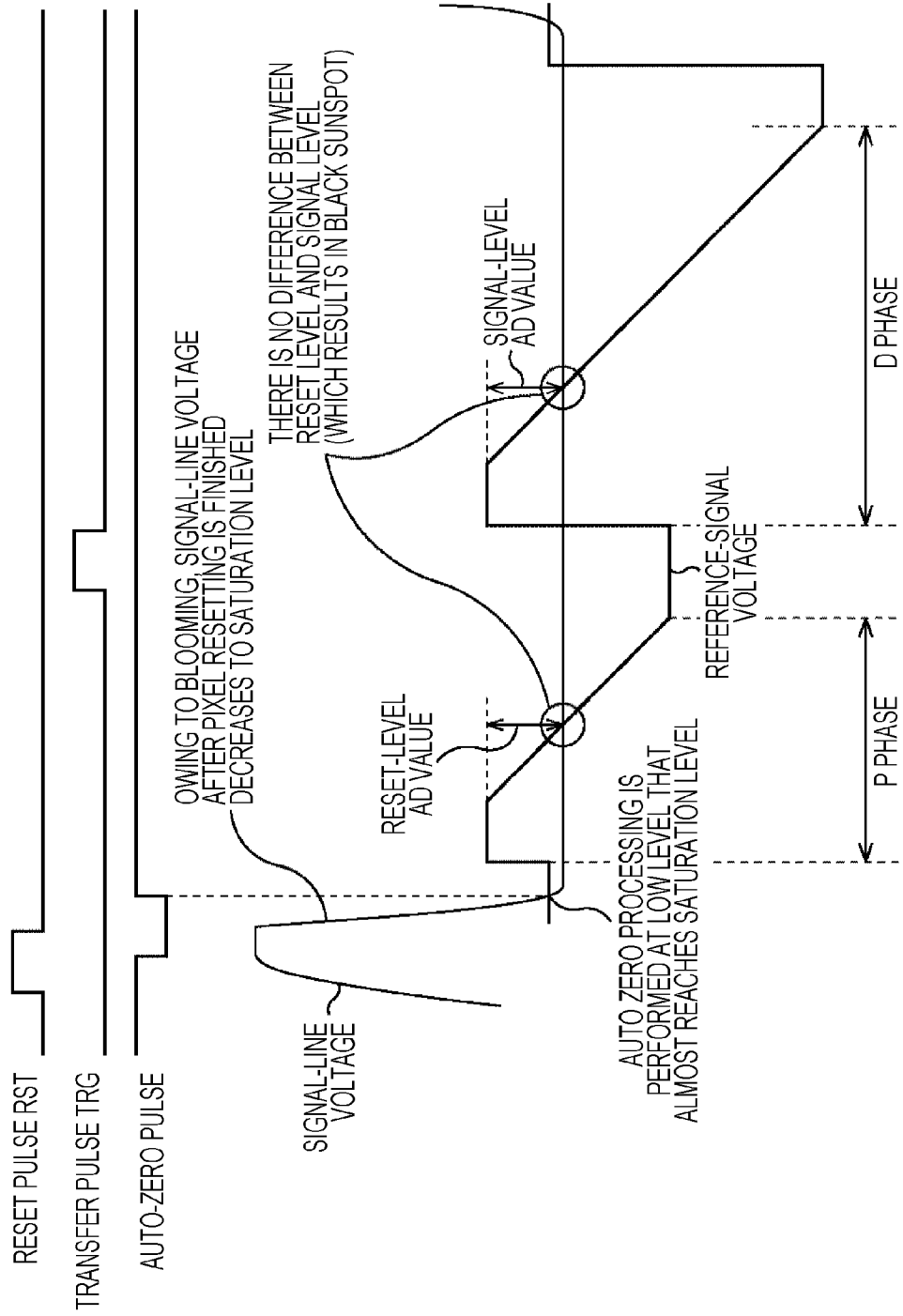
FIG. 7 is a waveform diagram illustrating an example of a signal-line voltage and a reference-signal voltage when an image of a subject with a significantly high luminance is captured.

FIG. 7 is a waveform diagram illustrating an example of the signal-line voltage and the reference-signal voltage in the image sensor 2 in the normal mode when an image of a subject with a significantly high luminance is captured.

As in FIG. 6, FIG. 7 illustrates the transfer pulse TRG, the reset pulse RST, and the auto-zero pulse, in conjunction with the signal-line voltage and the reference-signal voltage.

When an image of a subject with a significantly high luminance is captured, blooming, in which immediately after resetting the pixels $11_{m,n}$ (FIG. 3), the PDs 51 in the pixels $11_{m,n}$ are saturated and the charges overflow from the PDs 51, occurs in the image sensor 2.

When blooming occurs, the charge that overflows from the PD 51 is accumulated in the FD 53 in the pixel $11_{m,n}$ (FIG. 3) and the signal-line voltage of the pixel $11_{m,n}$ drops much more greatly than the voltage drop due to the reset feedthrough (described in FIG. 6) that occurs when an image of a subject with an appropriate luminance is captured. As a result, after the resetting of the pixel $11_{m,n}$ is completed, the signal-line voltage of the pixel $11_{m,n}$ drops sharply to a level that is equal or close to a signal level when the PD 51 is saturated (i.e., saturation level), as illustrated in FIG. 7.

Also, during image capturing of a significantly high-luminance subject, the signal-line voltage indicating the signal level reaches the saturation level.

In the normal mode, the auto zero processing is performed so that it is completed after the resetting of the pixel $11_{m,n}$, as described above with reference to FIG. 6. Thus, when a significantly high-luminance subject is captured, the comparator $61_n$ is set in the auto zero processing in the normal mode so that the signal-line voltage that has dropped to a level that is equal or close to the saturation level and the reference signal match each other (i.e., so as to allow the comparator $61_n$ to determine the magnitude relationship between the signal-line voltage and the reference signal by using, as a reference, the state in which the signal-line voltage that has dropped to a level that is equal to or close to the saturation level and the reference signal output by the reference-signal output section 33 match each other).

As described above, the comparator $61_n$ is set so that the signal-line voltage that has dropped to a level that is equal to close to the saturation level and the reference signal match each other. That is, the reference signal (the waveform thereof) is arranged at a position where the voltage has decreased to a level that is equal or close to the saturation level, similarly the signal-line voltage. Thus, in the P phase, the signal-line voltage indicating the reset level at (substantially) the saturation level and the reference signal (the P-phase slope) cross each other. Thus, it is possible to obtain the AD-conversion result of the reset level (the reset-level AD value).

In the D phase, the signal-line voltage indicating the signal level at the saturation level and the reference signal (the P-phase slope) at a position where the voltage thereof has decreased to a level that is equal or close to the saturation level also cross each other, so that the AD-conversion result of the signal level (the signal-level AD value) can be obtained.

Both of the reset level and the signal level are equal or close to the saturation level, and the reset-level AD value and the signal-level AD value that are the respective AD-conversion results of the reset level and the signal level have about the same values.

As a result, when the CDS for obtaining the difference between the reset-level AD value and the signal-level AD value is performed, the pixel value obtained by the CDS has a significantly small value.

As described above, the pixel value obtained by the CDS has a significantly small value, which appears as a black sunspot.

As a method for inhibiting occurrence of a black sunspot as described above, there is a method that is based on the premise that the maximum value of the pixel value (this maximum value may also be referred to as a "pixel maximum value" hereinafter) is used (output) as the pixel value without performing CDS (or instead of the difference resulting from the CDS), when P-phase non-crossing occurs. In this method, in a predetermined period including the period in which the auto zero processing is performed (the period in which the auto-zero pulse is at the L level), the signal-line voltage in the vertical signal line $42_n$ is clamped to a predetermined voltage so that the signal-line voltage does not become extremely small (low).

The term "P-phase non-crossing" as used herein means that the signal-line voltage indicating the reset level and the reference signal (the P-phase slope) do not cross each other in the P phase.

Figure 8:
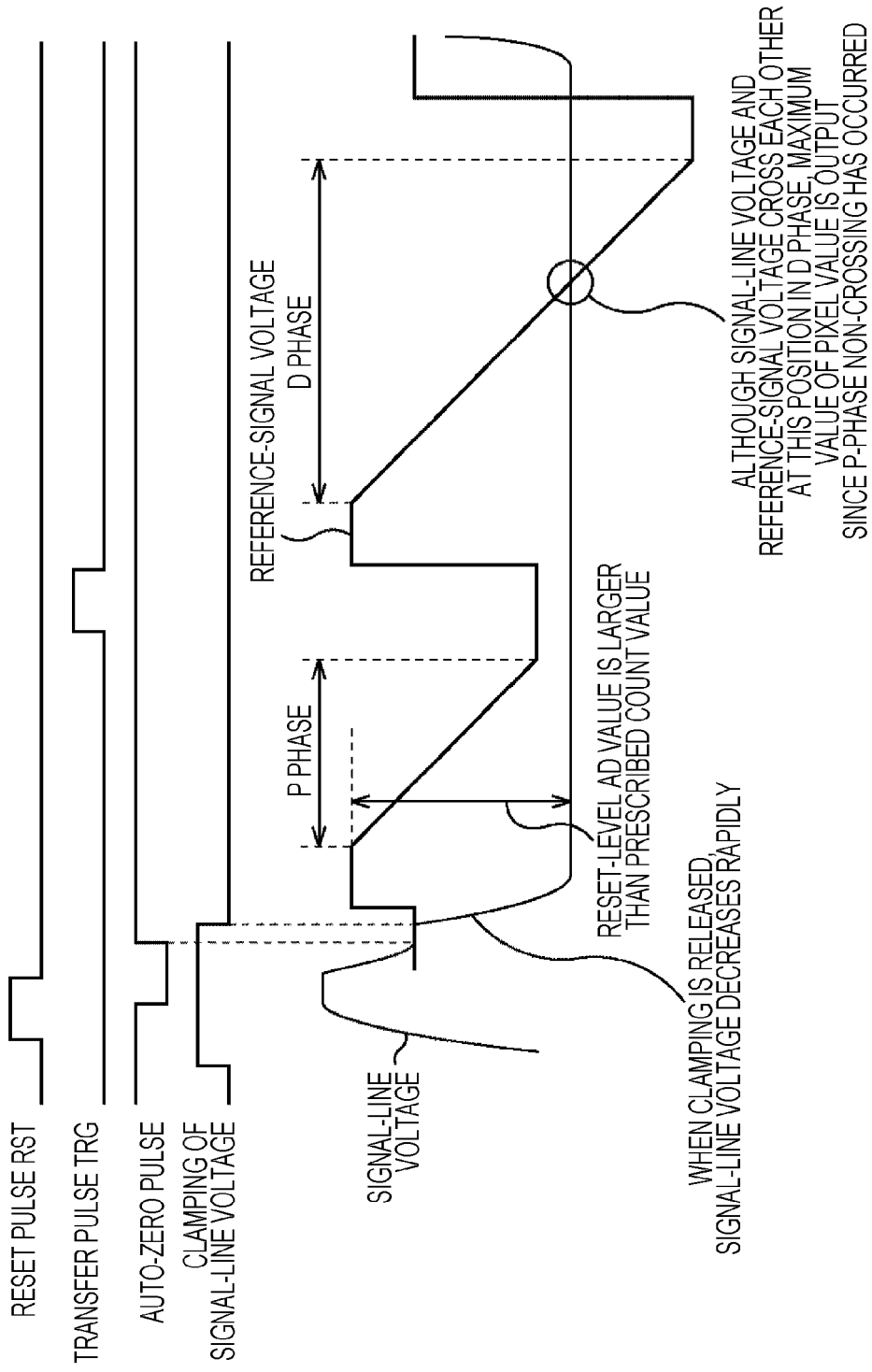
FIG. 8 is a waveform diagram illustrating an example of the signal-line voltage and the reference-signal voltage when the signal-line voltage is clamped.

FIG. 8 is a diagram illustrating a method for inhibiting occurrence of a black sunspot by clamping the signal-line voltage (the vertical signal line $42_n$) so that the signal-line voltage does not become extremely small based on the premise that the pixel maximum value is used as the pixel value when the P-phase non-crossing occurs.

That is, FIG. 8 is a waveform diagram illustrating an example of the signal-line voltage and the reference-signal voltage when an image of a significantly high-luminance subject is captured with the image sensor 2 in the normal mode in the case in which the signal-line voltage is clamped.

FIG. 8 illustrates the transfer pulse TRG, the reset pulse RST, the auto-zero pulse, and the timing at which the signal-line voltage is clamped, in conjunction with the signal-line voltage and the reference-signal voltage.

In FIG. 8, in a predetermined period including the period in which the auto zero processing is performed, the signal-line voltage is clamped to a predetermined voltage so as not to drop below a predetermined voltage. A circuit that performs the clamping has a circuit configuration that operates when the signal-line voltage is about to drop to a voltage lower than the predetermined voltage, like in the case in which a high-light-intensity black sunspot occurs. Thus, when the signal-line voltage does not drop to a voltage lower than the predetermined voltage, that is, for example, when an image of a subject with an appropriate light intensity is captured, the signal-line voltage is not clamped, since the signal-line voltage does not drop to a voltage lower than the predetermined voltage, unlike the case in which a high-light-intensity black sunspot occurs.

When an image of a significantly high-luminance subject is captured with the image sensor 2, blooming occurs, as described above with reference to FIG. 7. Thus, after the resetting of the pixel $11_{m,n}$ is completed, the signal-line voltage of the pixel $11_{m,n}$ drops sharply to approach a voltage lower than the predetermined voltage. Thus, the signal-line voltage is clamped to the predetermined voltage, as illustrated in FIG. 8.

Since the signal-line voltage is clamped in a predetermined period including the period in which the auto zero processing is performed, the signal-line voltage has been clamped to the predetermined voltage at the timing when the auto zero processing is completed. As a result, in the auto zero processing, the comparator $61_n$ is set so that the reference signal that has been clamped to the predetermined voltage and the signal-line voltage match each other.

Subsequently, the clamping of the signal-line voltage is stopped. When the clamping of the signal-line voltage is stopped, the signal-line voltage drops owing to blooming and reaches a level that is equal or close to the signal level (the saturation level) obtained when the PD 51 is saturated, as described with reference to FIG. 7.

As described above, the signal-line voltage is clamped, and in the auto zero processing, the comparator $61_n$ is set so that the signal-line voltage clamped to the predetermined voltage and the reference signal match each other. Thus, the reference-signal voltage (the waveform thereof) is arranged so as to be positioned at a considerably higher position (a position where the voltage is higher) than the signal-line voltage having the saturation level (i.e., the reference-signal voltage (the waveform thereof) becomes sufficiently larger than the signal-line voltage having the saturation level).

As a result, the P-phase non-crossing, in which the signal-line voltage and the reference signal (P-phase slope) do not cross each other, occurs, and in this case, the ADC $31_n$ outputs the pixel maximum value as the pixel value. This makes it possible to inhibit an event in which the pixel value becomes a small value and appears as a black sunspot, as described above with reference to FIG. 7.

In this case, whether or not the P-phase non-crossing has occurred in the image sensor 2 can be recognized based on the count value of the counter $62_n$ included in the ADC $31_n$ (FIG. 4).

That is, the count value when the counter $62_n$ counts clocks from the start point of the P-phase slope to the end point thereof (i.e., the P phase) is assumed to be referred to as a "prescribed count value", and when the count value of the counter $62_n$ which serves as the AD-conversion result of the reset level (i.e., the reset-level AD value) is larger than the prescribed count value, it can be recognized that the P-phase non-crossing has occurred.

In addition, it is also possible to recognize whether or not the P-phase non-crossing has occurred, by referring to the output of the comparator $61_n$ after the P phase (or after the D phase) and based on whether or not the output of the comparator $61_n$ has been reversed relative to the output at the start of the P phase.

Even when the count value of the counter $62_n$ is within the prescribed count value, for example, when the count value is a value that is sufficiently larger than the reset-level AD value obtained during image capturing of a subject with an appropriate luminance, it can be regarded that the P-phase non-crossing has occurred and the ADC $31_n$ can output the pixel maximum value as the pixel value.

The clamping of the signal-line voltage can also be performed, for example, by connecting the vertical signal line $42_n$ (FIG. 2) as a load of the source follower circuit.

Herein, the state in which the signal-line voltage indicating the signal level and the reference signal (the D-phase slope) do not cross each other in the D phase is referred to as "D-phase non-crossing". In this case, when the D-phase non-crossing occurs, the ADC $31_n$ in the image sensor 2 can output the pixel maximum value as the pixel value, as in the case in which the P-phase non-crossing occurs.

Black sunspots can be classified into two types of black sunspot, depending on the degree of the luminance (light intensity) of a subject.

A first type of black sunspot is a black sunspot that occurs owing to a sharp decrease in the signal-line voltage after resetting the pixel $11_{m,n}$, when an image of a subject with a significantly high luminance (a subject with a significantly high light-intensity) is captured, as described above with reference to FIG. 7. The first type of black sunspot is hereinafter referred to as a "high-light-intensity black sunspot".

A second type of black sunspot is a black sunspot that occurs when a subject whose luminance is not as high as a luminance that causes a high-light-intensity black sunspot but is still high (a subject with a high light intensity) is captured, and is hereinafter referred to as a "low-light-intensity black sunspot".

Figure 9:
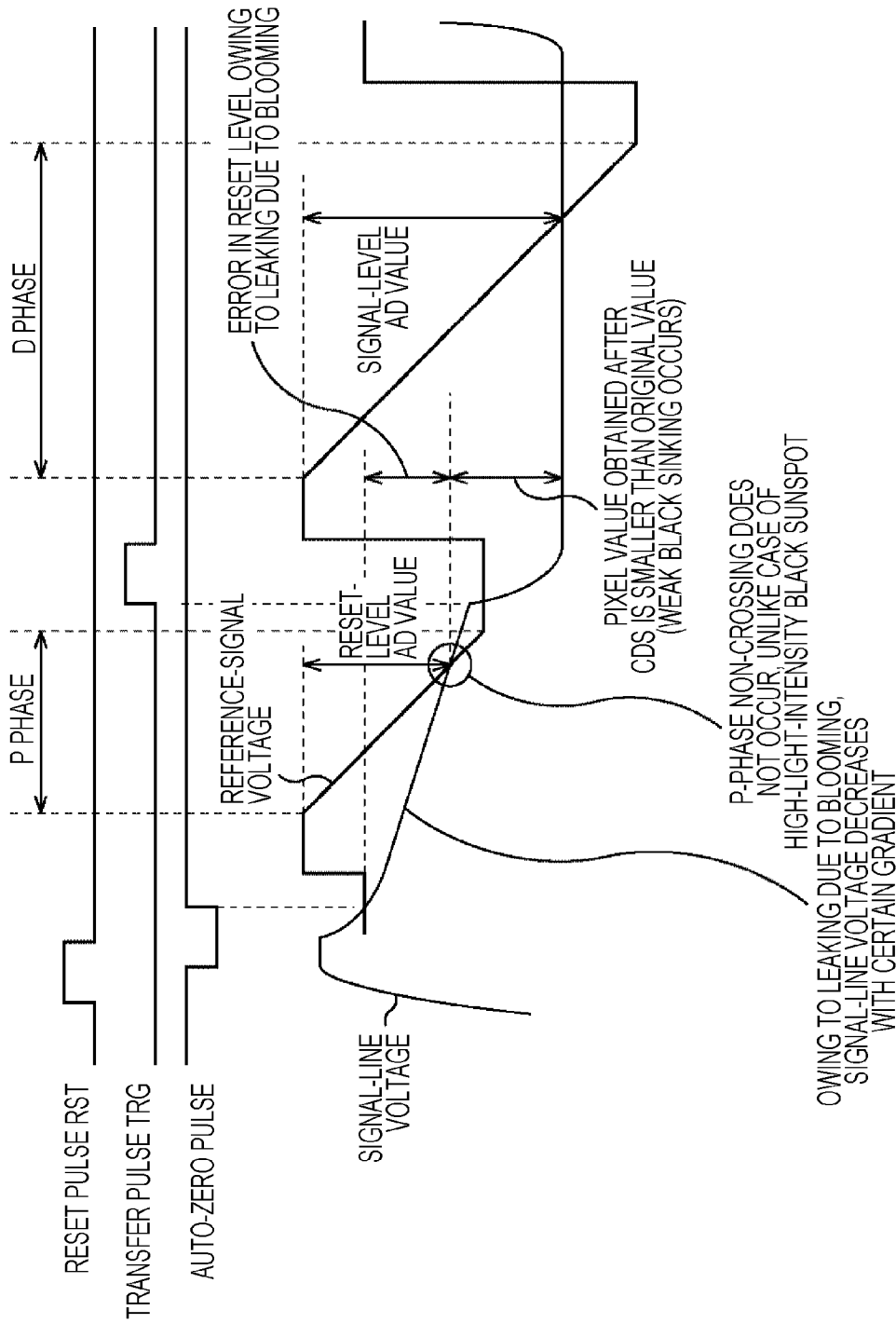
FIG. 9 is a waveform diagram illustrates an example of the signal-line voltage and the reference-signal voltage when a low-light-intensity black sunspot occurs.

FIG. 9 is a waveform diagram illustrating an example of the signal-line voltage and the reference-signal voltage when a low-light-intensity black sunspot occurs in the image sensor 2 in the normal mode.

FIG. 9 illustrates the transfer pulse TRG, the reset pulse RST, and the auto-zero pulse, in conjunction with the signal-line voltage and the reference-signal voltage, as in FIG. 6.

When an image of a subject with a high luminance that is not as high as a luminance that causes a high-light-intensity black sunspot but that still exceeds an appropriate-luminance range is captured with the image sensor 2, the PD 51 in the pixel $11_{m,n}$ (FIG. 3) is saturaged, and blooming in which the charge overflows from the PD 51 occurs.

In this case, as in the case in which a high-light-intensity black sunspot occurs, charge that has overflowed from the PD 51 owing to blooming is accumulated in the FD 53, so that the signal-line voltage in the pixel $11_{m,n}$ decreases.

However, when the luminance of the high-luminance subject is not as high as the luminance that causes a high-light-intensity black sunspot, charge overflows "gently" from the PD 51 and thus flows into the FD 53 gradually.

Thus, after the pixel $11_{m,n}$ is reset, the signal-line voltage decreases gently, rather than decreasing sharply like in the case in which a high-light-intensity black sunspot occurs.

After the pixel $11_{m,n}$ is reset, the signal-line voltage decreases gently, as described above. Thus, in the auto zero processing performed so that it is completed after the resetting of the pixel $11_{m,n}$, the comparator $61_n$ is set so that the signal-line voltage having a voltage level that has decreased from the signal-line voltage after resetting of the pixel $11_{m,n}$ by an amount corresponding to the voltage drop due to the reset feedthrough matches the reference signal.

In this case, when the signal-line voltage on which the resetting of the pixel $11_{m,n}$ (which may be referred to simply as "pixel resetting" hereinafter) has been performed and on which the auto zero processing has been completed decreases sharply like in a case in which a high-light-intensity black sunspot illustrated in FIG. 7 or 8 occurs, the P-phase non-crossing occurs to thereby make it possible to inhibit occurrence of a black sunspot.

However, when a low-light-intensity black sunspot occurs, the signal-line voltage decreases gently. In this case, while the signal-line voltage decreases gently in the P phase, the signal-line voltage and the reference signal (the P-phase slope) may cross each other, as illustrated in FIG. 9.

When the signal-line voltage and the reference signal cross each other in the P phase, the ADC $31_n$ (FIG. 4) determines, as the AD-conversion result of the signal-line voltage indicating the reset level (i.e., the reset-level AD value), the count value of the counter $62_n$ from when the P phase is started until the signal-line voltage and the reference signal cross each other.

In this case, when the signal-line voltage after the pixel resetting decreases gently (as illustrated in FIG. 9) as a result of image capturing of a subject with a high luminance, the original reset level is supposed to be equal or close to the voltage level that has decreased from the signal-line voltage during resetting of the pixel $11_{m,n}$ by an amount corresponding to the voltage drop due to the reset feedthrough.

However, the reset level to be subjected to the AD conversion in the P phase decreases by an amount corresponding to the charge that has flowed into the FD 53 in the pixel $11_{m,n}$ owing to the blooming. Thus, the AD-conversion result of the reset level has a value including an error corresponding to the charge that has flowed into the FD 53 in the pixel $11_{m,n}$ owing to the blooming, and thus becomes larger than that of the original reset-level AD-conversion result by an amount corresponding to the error.

As described above, when an image of a subject with a high luminance is captured, the AD-conversion result of the reset level (the reset-level AD value) indicates a value that is increased by an amount corresponding to the error due to the blooming, the pixel value resulting from the CDS performed using the reset-level AD value including such an error becomes smaller by an amount corresponding to the error due to the blooming and appears as a low-light-intensity black sunspot, which is a black sunspot in which the degree of black sinking is weaker than that in a high-light-intensity black sunspot.

When an image of a subject with a high luminance is captured, the signal-line voltage indicating the signal level that is substantially the saturation level and the reference signal (the D-phase slope) cross each other in the D phase, so that the AD-conversion result of the signal level (the signal-level AD value) can be obtained.

When an image of a subject with a high luminance is captured, the signal-line voltage after the pixel resetting decreases gently, rather than decreasing sharply like in the case in which a high-light-intensity black sunspot occurs. Thus, the signal-line voltage (the signal-line voltage indicating the reset level) when it crosses the reference signal (the P-phase slope) does not decrease to the saturation level, and thus, the difference between the reset level and the signal level at the saturation level becomes larger than the difference that occurs when a high-light-intensity black sunspot occurs.

That is, when an image of a subject with a high luminance is captured, a difference resulting from the CDS has a value that is large to a certain extent, compared with the case in which a high-light-intensity black sunspot occurs. As a result, a low-light-intensity black sunspot that occurs when an image of a subject with a high luminance is captured is a black sunspot in which the degree of black sinking is lower than that in a high-light-intensity black sunspot.

With respect to a low-light-intensity black sunspot, the signal-line voltage after the pixel resetting decreases gently, rather than decreasing sharply like in the case in which a high-light-intensity black sunspot occurs. Thus, as described above with reference to FIG. 8, even when the signal-line voltage is temporarily clamped, the reference-signal voltage (the waveform thereof) does not reach a considerably higher position than the signal-line voltage having the saturation level (i.e., the positional relationship between the signal-line voltage (the waveform thereof) and the reference signal (the waveform thereof) do not become a relationship such that the reference-signal voltage and the signal-line voltage do not cross each other in the P phase).

As a result, there are cases in which the signal-line voltage and the reference signal (the P-phase slope) cross each other and the P-phase non-crossing does not occur. Thus, even when the signal-line voltage is clamped as described above with reference to FIG. 8, there are cases in which it is difficult to inhibit appearance of a low-light-intensity black sunspot.

One possible method for inhibiting appearance of a low-light-intensity black sunspot in the normal mode is, for example, a method for making the positional relationship between the signal-line voltage and the reference signal become a relationship such that the reference-signal voltage and the signal-line voltage do not cross each other in the P phase, by adjusting the length of the P-phase slope (the length of the P phase) and the magnitude of the initiation offset (the amount of offset) described above with reference to FIG. 3, on the basis of the extent of the gradient of the signal-line voltage after the pixel resetting and the extent of the gradient of the P-phase slope of the reference signal when a low-light-intensity black sunspot occurs.

In this case, since the P-phase non-crossing occurs, the ADC $31_n$ outputs the pixel maximum value as the pixel value. Thus, it is possible to inhibit appearance of a low-light-intensity black sunspot.

In recent years, the number of pixels in the image sensor 2 has been increasing, and there are demands for a higher speed of AD conversion of the signal-line voltages output by the pixels $11_{m,n}$ in order to maintain the frame rate of images output from the image sensor 2.

The ADCs $31_n$ in the image sensor 2 are reference-signal-comparing-type ADCs, and the speed of the AD conversion can be increased by reducing the P-phase slope (and the D-phase slope) of the reference signal, that is, the length of the P phase (and the D phase).

One method for reducing the length of the P phase is, for example, to make the P-phase slope steep.

However, in a case in which the gradient of the P-phase slope is made steep, when a low-light-intensity black sunspot occurs, the signal-line voltage that decreases gently after the pixel resetting and the P-phase slope whose gradient has been made steep are more likely to cross each other to thereby inhibit the P-phase non-crossing. This makes it difficult to inhibit appearance of a low-light-intensity black sunspot.

Accordingly, a conceivable method is, for example, a method for causing the P-phase non-crossing by selectively reducing the length of the P-phase slope whose gradient is made steep or increasing the amount of the initiation offset (described above with reference to FIG. 6) so that the reference-signal voltage and the signal-line voltage do not cross each other in the P phase.

However, in this case, when an image of a subject with an appropriate luminance at which no black sunspot occurs is captured, the risk of occurrence of the P-phase non-crossing increases.

When the P-phase non-crossing occurs during image capturing of a subject with an appropriate luminance, the pixel maximum value of the pixel $11_{m,n}$ in which the P-phase non-crossing has occurred is output as the pixel value, so that the image quality deteriorates. Thus, it is important to minimize the risk of occurrence of the P-phase non-crossing. Hence, the degree to which the length of the P-phase slope in which the gradient is made steep is selectively reduced and the degree to which the magnitude of the initiation offset described above with reference to FIG. 6 is increased are limited.

In the normal mode, as the gradient of the P-phase slope is made steeper, it is more difficult to set the waveform of the reference signal that causes the P-phase non-crossing when a black sunspot occurs and that does not cause the P-phase non-crossing when an image of a subject with an appropriate luminance is captured.

Accordingly, in the image sensor 2 in FIG. 2, the black-sunspot avoidance mode is prepared as the auto-zero mode in which the auto zero processing of the comparators $61_n$ (FIG. 5) in the ADCs $31_n$ is performed. In the black-sunspot avoidance mode, occurrence of a black sunspot can be easily avoided, regardless of whether a black sunspot is a high-light-intensity black sunspot or a low-light-intensity black sunspot.

[Black-Sunspot Avoidance Mode]

Figure 10:
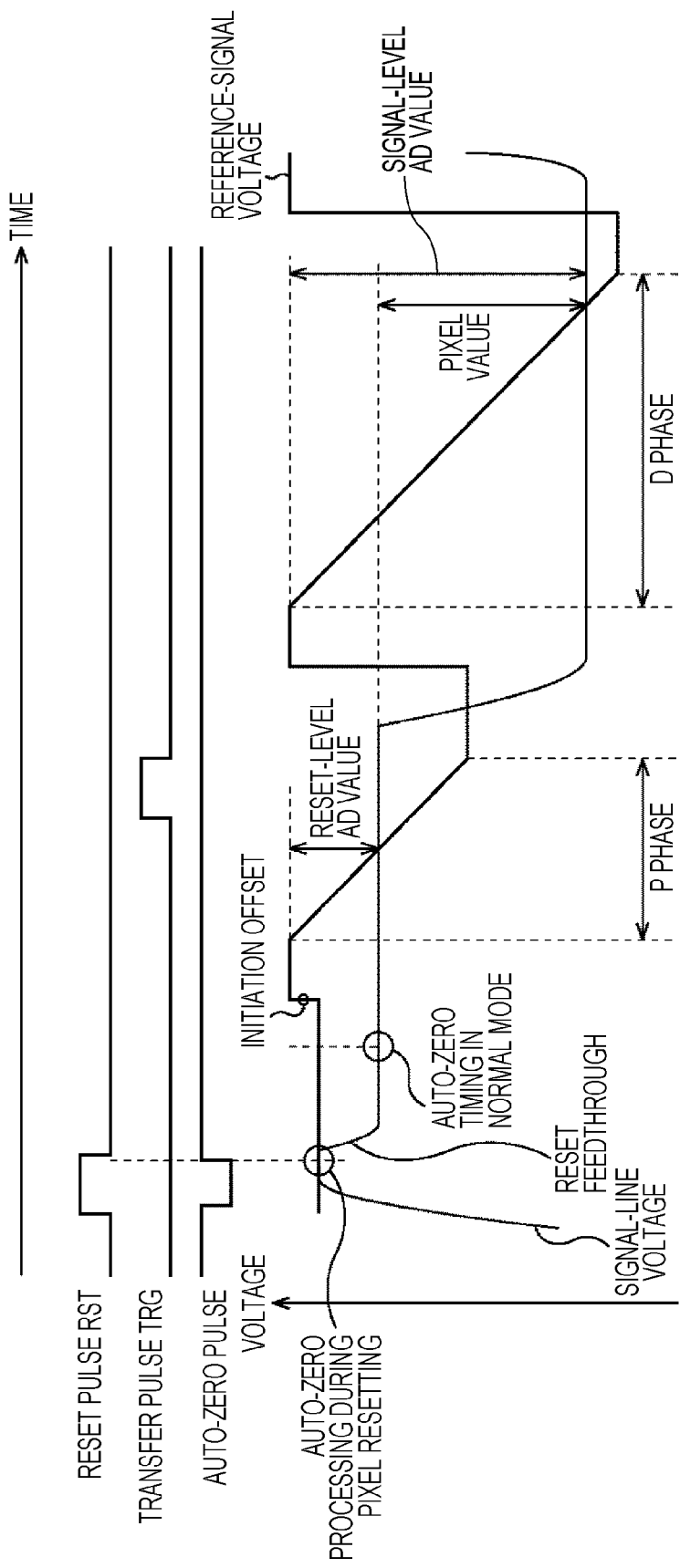
FIG. 10 is a waveform diagram illustrating an example of the signal-line voltage and the reference-signal voltage in the image sensor in a black-sunspot avoidance mode.

FIG. 10 is a diagram illustrating an operation of the image sensor 2 (FIG. 2) when the auto-zero mode is the black-sunspot avoidance mode.

FIG. 10 is a waveform diagram illustrating an example of the signal-line voltage and the reference-signal voltage in the image sensor 2 in the black-sunspot avoidance mode.

FIG. 10 illustrates the transfer pulse TRG, the reset pulse RST, and the auto-zero pulse, in conjunction with the signal-line voltage and the reference-signal voltage, as in FIG. 6.

In the normal mode, the auto zero processing is performed so that it is completed after the pixel resetting, as described above with reference to FIG. 6. The black-sunspot avoidance mode, however, is different from the normal mode in that, in the black-sunspot avoidance mode, the auto zero processing is performed so that it is completed during the pixel resetting.

That is, in the black-sunspot avoidance mode, the reset pulse RST is temporarily changed to the H level, and the auto zero processing is started and finished while the pixel $11_{m,n}$ is being reset.

Thus, in the black-sunspot avoidance mode, while the reset pulse RST is at the H level, the auto-zero control section 32 changes the auto-zero pulse from the H level to the L level and also changes the auto-zero pulse from the L level to the H level.

As described above, according to the auto zero processing, the comparator $61_n$ is set so as to be able to determine (compare) the magnitude relationship between the signal-line voltage and the reference signal which are applied to the comparator $61_n$ by using, as a reference, the state in which the signal-line voltage and the reference signal match each other, when the auto-zero pulse rises.

In the black-sunspot avoidance mode, the auto zero processing is performed so that it is completed during the period of the pixel resetting.

In the period of the pixel resetting, the FD 53 is connected to the power source Vdd via the reset transistor Tr54, and the charge in the FD 53 is reset, as described above with reference to FIG. 3. Thus, the signal-line voltage output by the pixel $11_{m,n}$, that is, the voltage output from the FD 53 in the pixel $11_{m,n}$ to the vertical signal line $42_n$ via the amplification transistor Tr55 and the selection transistor Tr56, increases to become a voltage corresponding to the power source Vdd.

It is now assumed that the signal-line voltage in the period of the pixel resetting is referred to as a "level during the pixel resetting". In this case, in the black-sunspot avoidance mode, the auto zero processing is performed so that it is completed during the period of the pixel resetting. Thus, the comparator $61_n$ is set so as to be able to determine the magnitude relationship between the signal-line voltage and the reference signal by using, as a reference, the state in which the level during the pixel resetting (i.e., the signal-line voltage during the resetting of the pixel $11_{m,n}$) and the reference signal match each other.

Thereafter, in the black-sunspot avoidance mode, for example, the reference-signal output section 33 (FIG. 4) performs initiation offset for increasing the reference signal by a predetermined voltage at time after the auto zero processing is finished, as in the case in the normal mode, and then the image sensor 2 performs AD conversion of the reset level and the signal level and performs CDS to obtain a pixel value, as in the case in the normal mode.

As described above, in the black-sunspot avoidance mode, the auto zero processing is performed so that it is finished (completed) during the period of the pixel resetting. Thus, compared with the case in the normal mode (FIG. 6) in which the auto zero processing is finished after the pixel resetting, the reference signal (the waveform thereof) is arranged at a position where the level during the pixel resetting serves as a reference, regardless of whether a subject with such a high luminance as to cause a black sunspot is photographed or a subject with an appropriate luminance is photographed.

Thus, when an image of a subject with such a high luminance as to cause a high-light-intensity black sunspot is captured, the reference signal is not arranged at a lower position that is equal or close to the saturation level, unlike the case described above with reference to FIG. 7. Thus, the P-phase non-crossing and the D-phase non-crossing occur, thus making it possible to inhibit appearance of a high-light-intensity black sunspot.

In the normal mode, as described above with reference to FIG. 6, the reference signal (the waveform thereof) is arranged at a position where the voltage has dropped from the level during the pixel resetting by an amount corresponding to the reset feedthrough serves as a reference. In the black-sunspot avoidance mode, however, the reference signal is arranged at a position where the level during the pixel resetting serves as a reference.

Thus, in the black-sunspot avoidance mode, the reference signal is positioned at a higher portion than that in the normal mode by an amount corresponding to the reset feedthrough. Hence, when an image of a subject with such a high luminance as to cause a low-light-intensity black sunspot is captured, that is, when the signal-line voltage decreases gradually after the pixel resetting, the P-phase non-crossing and the D-phase non-crossing are more likely to occur, thus making it possible to inhibit occurrence of a low-light-intensity black sunspot.

In the black-sunspot avoidance mode in FIG. 10, the auto zero processing is started and finished during the period of the pixel resetting. However, since it is sufficient that, in the black-sunspot avoidance mode, the auto zero processing be completed during the period of the pixel resetting, the auto zero processing may or may not be started during the period of the pixel resetting.

That is, it is sufficient that, in the black-sunspot avoidance mode, the auto zero processing be started before the pixel resetting or during the period of the pixel resetting and be finished during the period of the pixel resetting.

Thus, in the black-sunspot avoidance mode, the auto-zero control section 32 changes the auto-zero pulse from the H level to the L level before the reset pulse RST becomes the H level or when the reset pulse RST is at the H level, and changes the auto-zero pulse from the L level to the H level when the reset pulse RST is at the H level.

Figure 11A:
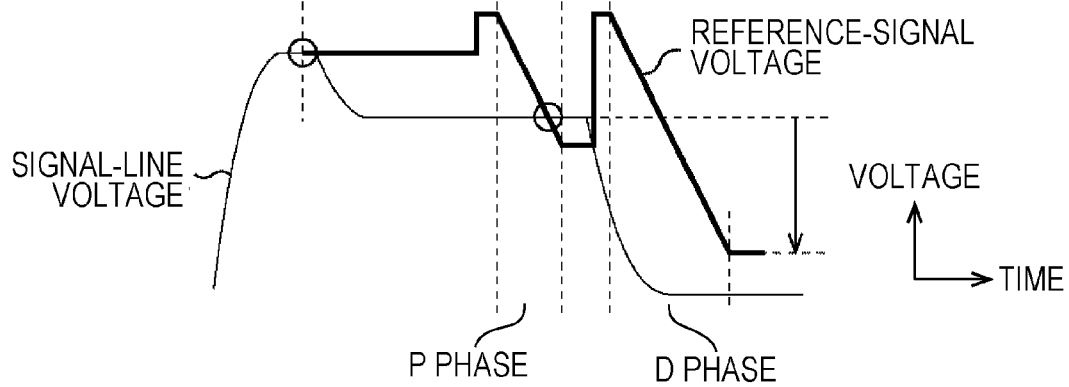
FIGS. 11A to 11C are waveform diagrams illustrating examples of a positional relationship between the signal-line voltage and the reference signal when the auto-zero mode is the black-sunspot avoidance mode.
Figure 11B:
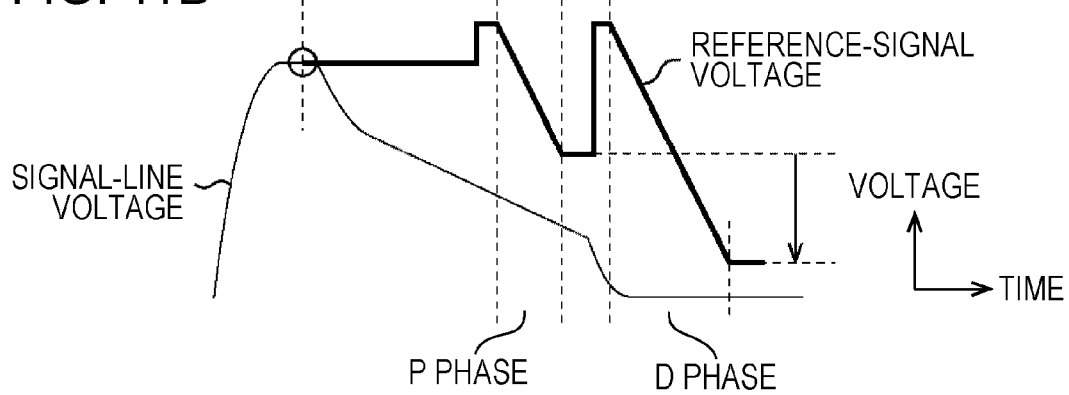
Figure 11C:
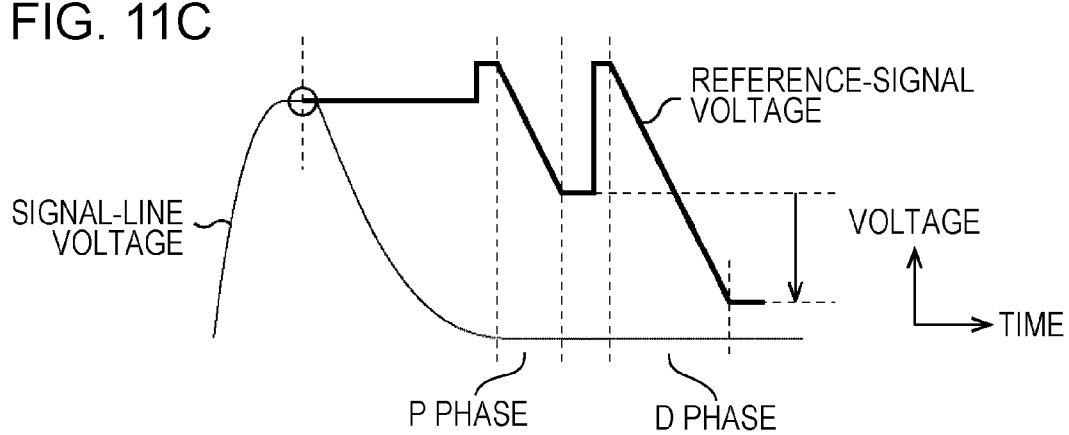

FIGS. 11A to 11C are waveform diagrams illustrating examples of a positional relationship between the signal-line voltage (the waveform thereof) and the reference signal (the waveform thereof) when the auto-zero mode is the black-sunspot avoidance mode.

FIG. 11A illustrates the signal-line voltage and the reference signal when an image of a subject with a luminance at which the signal level becomes the saturation level is captured in the black-sunspot avoidance mode.

In FIG. 11A, in the P phase, the signal-line voltage indicating the reset level and the reference signal (the P-phase slope) cross each other. In the D phase, since the signal level is large (high), the signal-line voltage indicating the signal level and the reference signal (the D-phase slope) do not cross each, that is, the D phase non-crossing occurs.

That is, in the D phase, the counter $62_n$ having the ADC $31_n$ (FIG. 4) performs counting up to the maximum value of the count value and outputs the count value that is larger than or equal to the maximum value of the pixel value (the pixel maximum value). In this case, for example, the ADC $31_n$ clips the count value to the pixel maximum value and outputs the pixel maximum value as the pixel value.

FIG. 11B illustrates the signal-line voltage and the reference signal when an image of a subject with a high luminance to a degree that a low-light-intensity black sunspot occurs is captured in the black-sunspot avoidance mode.

In the normal mode, when a subject with a high luminance to a degree that a low-light-intensity black sunspot occurs is captured, the reference signal (the waveform thereof) is arranged at a position where the voltage that has decreased from the level during the pixel reset by an amount corresponding to the feedthrough voltage serves as a reference. Thus, there are cases in which the signal-line voltage that decreases gently and the reference signal (the P-phase slope) cross each other in the P phase, in which case, the P-phase non-crossing does not occur, and a low-light-intensity black sunspot may appear.

On the other hand, in the black-sunspot avoidance mode, the reference signal (the waveform thereof) is arranged at a higher position where the level during the pixel resetting serves as a reference than that in the normal mode. Thus, when an image of a subject with such a high luminance as to cause a low-light-intensity black sunspot, that is, with a high luminance at which the signal-line voltage decreases gradually in the P phase and the signal-line voltage reaches the saturation level in the D phase, is captured, the P-phase non-crossing and the D-phase non-crossing occur, thereby making it possible to inhibit appearance of a low-light-intensity black sunspot.

FIG. 11C illustrates the signal-line voltage and the reference signal when an image of a subject with a high luminance to a degree that a high-light-intensity black sunspot occurs is captured in the black-sunspot avoidance mode.

In the normal mode, when an image of a subject with a high luminance to a degree that a high-light-intensity black sunspot occurs is captured, the reference signal is arranged at a lower position where the voltage has decreased to the saturation level (a position where the voltage is low), as described above with reference to FIG. 7. Thus, the P-phase non-crossing and the D-phase non-crossing do not occur, so that a high-light-intensity black sunspot appears.

On the other hand, in the black-sunspot avoidance mode, the reference signal (the waveform thereof) is arranged at a position where the level during the pixel resetting serves as a reference.

The level during the pixel resetting is substantially constant, regardless of the luminance of a subject whose image is captured with the image sensor 2 (the amount of light that is incident on the image sensor 2), and thus, no displacement occurs in the reference signal (the waveform thereof) between when an image of a subject with an appropriate luminance is captured and when an image of a subject with a high luminance to a degree that a black sunspot occurs is captured.

That is, even when an image of a subject with a high luminance to a degree that a black sunspot occurs is captured, the reference signal is arranged at the same position as that when an image of a subject with an appropriate luminance is captured, and is not arranged at a lower position, unlike the case in the normal mode.

Thus, in the black-sunspot avoidance mode, during image capturing of a subject with a high luminance to a degree that a high-light-intensity black sunspot occurs, the P-phase non-crossing and the D-phase non-crossing occur, thus making it possible to inhibit appearance of a high-light-intensity black sunspot.

As described above, in the black-sunspot avoidance mode, through merely finishing (completing) the auto zero processing during the period of the pixel resetting, the reference signal (the waveform thereof) is arranged at a position where the level during the pixel resetting serves as a reference. This makes it possible to easily inhibit appearance (occurrence) of a high-light-intensity black sunspot and a low-light-intensity black sunspot and makes it possible to inhibit a decline in the image quality.

[P-Phase Offset]

FIG. 12 is a diagram illustrating P-phase offset performed in the black-sunspot avoidance mode.

In the normal mode, as described above with reference to FIG. 6, the reference signal (the waveform thereof) is generally arranged at a position where the voltage that has decreased from the level during the pixel resetting (the signal-line voltage during the period of the pixel resetting) by an amount corresponding to the reset feedthrough serves as a reference.

In general, the voltage that has decreased from the level during the pixel resetting by an amount corresponding to the reset feedthrough is at (substantially) the reset level. Thus, when this voltage is assumed to be a start level when the P-phase slope of the reference signal is started (i.e., the level of the reference signal when comparison with the signal-line voltage indicating the reset level is started), there is a possibility that the signal-line voltage indicating the reset level and the reference signal (the P-phase slope) do not cross each other.

Accordingly, in the normal mode, after the auto zero processing is finished, the reference-signal output section 33 (FIG. 4) performs the initiation offset for increasing the reference signal by a predetermined voltage, as described above with reference to FIG. 6.

Since the start level of the P-phase slope is increased (the P-phase slope is arranged at an upper portion) as a result of the initiation offset, the signal-line voltage indicating the reset level and the right-downward P-phase slope (the reference signal) that decreases at a certain rate are more likely to cross each other.

Meanwhile, in the black-sunspot avoidance mode, the reference signal (the waveform thereof) is arranged at a position where the level during the pixel resetting serves as a reference. Thus, the reference signal is arranged at a higher portion, by an amount corresponding to the voltage drop due to the pixel feedthrough, than the reference signal in the normal mode which is arranged at a position where the voltage that has decreased from the level during the pixel resetting by an amount corresponding to the reset feedthrough serves as a reference.

That is, the reference signal in the black-sunspot avoidance mode is positioned at a higher portion than the reference signal in the normal mode. Hence, in the black-sunspot avoidance mode, when the initiation offset for increasing the reference signal by a predetermined voltage is performed after the auto zero processing is finished, as in the case in the normal mode, the P-phase slope is arranged at a higher portion than that in the case in the normal mode by an amount corresponding to the voltage drop due to the pixel feedthrough.

When the P-phase slope is arranged at an upper portion, the P-phase non-crossing is more likely to occur during image capturing of a subject with an appropriate luminance, and when the P-phase non-crossing occurs in a case in which the signal level is not the saturation level, the pixel maximum value is output as the pixel value, and thus the image quality deteriorates.

It is assumed that the ease of crossing of the signal-line voltage and the reference signal (the P-phase slope) in the P phase, in other words, the difficulty of occurrence of the P-phase non-crossing, is referred to as a "P-phase margin". In the black-sunspot avoidance mode, it is important to ensure a sufficient amount of the P-phase margin when an image of a subject with an appropriate luminance is captured.

One method for ensuring a sufficient amount of the P-phase margin when the P-phase slope is arranged at an upper portion is, for example, to delay the end point of the P-phase slope to arrange the P-phase slope at a relatively low position (a position where the voltage is low).

However, when the end point of the P-phase slope is delayed to increase the length of the P-phase slope, the length of the P phase also increases. When the length of the P phase increases, the time taken for the AD conversion of the signal-line voltage increases, which goes against the demands for higher-speed AD conversion.

Accordingly, in the black-sunspot avoidance mode, the reference-signal output section 33 (FIG. 4) can perform P-phase offset, without performing the initiation offset for increasing the start level.

The term "P-phase offset" as used herein is processing for offsetting the start level in the P phase in which the level of the reference signal decreases, from the level during the auto zero processing, that is, the level during the pixel resetting.

In the P-phase offset, regardless of the direction in which the reference signal changes (i.e., regardless of whether the slope is decreasing rightward or increasing rightward), the start level of the P-phase slope is offset to a lower portion, as illustrated in FIG. 12. In the present embodiment, the P-phase slope goes down rightward; however, in the P-phase offset, the start level of such a right-downward P-phase slope is offset in the direction opposite to that in the initiation offset in the normal mode.

FIG. 12 illustrates an example of the signal-line voltage (the waveform thereof) and the reference signal (the waveform thereof) when the auto-zero mode is the black-sunspot avoidance mode and the P-phase offset is performed.

As described above, in the P-phase offset, the start level of the P-phase slope is offset to a lower portion, as illustrated in FIG. 12.

Even when the reference signal changes toward an upper portion (i.e., toward a higher voltage), that is, when the slope increases rightward, the start level in the P phase is offset to a lower portion in the P-phase offset. However, when the slope increases rightward, the start level in the P phase is offset toward a lower portion by a larger amount of offset, compared with the case in which the slope is decreasing rightward.

In the P-phase offset, the amount of offset of the start level in the P phase (this amount of offset may also be referred to as an "amount of the P-phase offset" hereinafter) may be, for example, a difference between the level during the pixel resetting (the signal-line voltage when the pixel $11_{m,n}$ is reset) and the signal-line voltage after the pixel resetting (the signal-line voltage immediately after the pixel $11_{m,n}$ is reset), that is, the voltage corresponding to the voltage drop due to the reset feedthrough (e.g., a voltage that is proportional to a representative value (an average value or the like) of the voltage drop due to the reset feedthrough). With such an arrangement, in the black-sunspot avoidance mode, the P-phase slope can be arranged at a position similar to that in the case in which an image of a subject with an appropriate luminance is captured in the normal mode.

As described above, in the black-sunspot avoidance mode, the P-phase offset is performed to thereby arrange the P-phase slope at a position similar to that in the case in which a subject with an appropriate luminance is captured in the normal mode. As a result, in the black-sunspot avoidance mode, a sufficient amount of the P-phase margin can be ensured during image capturing of a subject with an appropriate luminance, without increasing the length of the P phase, and the AD conversion of the signal-line voltage can be performed in a period of time that is substantially the same as that in the case in the normal mode.

Accordingly, it is possible to inhibit occurrence of black sunspots (a high-light-intensity black sunspot and a low-light-intensity black sunspot) and it is also possible to ensure a sufficient amount of the P-phase margin, without increasing the time taken for the AD conversion.

[Setting of Amount of Offset in Initiation Offset in Normal Mode and Amount of Offset in P-Phase Offset in Black-Sunspot Avoidance Mode]

The amount of offset in the initiation offset in the normal mode and the amount of offset in the P-phase offset in the black-sunspot avoidance mode can be set to fixed values. In addition, the amount of offset in the initiation offset in the normal mode and the amount of offset in the P-phase offset in the black-sunspot avoidance mode can be set based on, for example, a sensor gain.

FIGS. 13 and 14 are diagrams illustrating the amount of offset in the initiation offset in the normal mode and the amount of offset in the P-phase offset in the black-sunspot avoidance mode, the amounts of offset being set based on sensor gain.

The term "sensor gain" as used herein refers to, in the image sensor 2, the amount of change in the pixel value relative to a change in the amount of light that is incident on the image sensor 2 (the degree to which a change in the amount of light affects the pixel value) and also corresponds to the gradient of the slopes of the reference signal (the P-phase slope and the D-phase slope).

As the gradient of the slope of the reference signal becomes steeper, the time taken for the counter $62_n$ in the ADC $31_n$ to perform counting for the potential difference decreases, so that the sensor gain, that is, the degree to which a change in the amount of incident light affects the pixel value, decreases.

On the other hand, as the gradient of the slope of the reference signal becomes gentler, the sensor gain increases.

The controller 20 (FIG. 2) sets the sensor gain, for example, in accordance with a user operation, the luminance of a subject, or the like.

When the sensor gain is set based on the luminance of a subject or the like, the sensor gain is set to a large value during image capturing of a dark subject, and the reference-signal output section 33 (FIG. 4) sets the gradient of the P-phase slope (and the D-phase slope) to a gentle gradient and outputs a reference signal having such a gentle gradient. During image capturing of a bright subject, the sensor gain is set to a small value, and the reference-signal output section 33 (FIG. 4) sets the gradient of the P-phase slope to a rapid gradient and outputs a reference signal having such a rapid gradient.

In addition, the sensor gain can also be set, for example, based on the contrast of a subject.

When the sensor gain is set based on the contrast of a subject, the sensor gain is set to a large value for a low contrast (i.e., when the difference between a brightest portion of the subject and a darkest portion thereof is small). For a high contrast (when the difference between the brightest portion of the subject and the darkest portion of the subject is large), the sensor gain is set to a small value.

FIG. 13 is a waveform diagram illustrating an example of the signal-line voltage and the reference-signal voltage when the amount of offset in the initiation offset in the normal mode is set based on the sensor gain.

When the sensor gain is high, the gradient of the P-phase slope (and the D-phase slope) is set to a gentle gradient.

It is now assumed that the signal-line voltage (the waveform thereof) and the length of the P phase before the P-phase slope is set from a rapid gradient to a gentle gradient and the signal-line voltage and the length of the P phase after the P-phase slope is set from the rapid gradient to the gentle gradient are the same. In this case, after the P-phase slope is set to the gentle gradient, the point at which the P-phase slope and the signal-line voltage (the reset level) cross each other (this point may be referred to as a "P-phase crossing point" hereinafter) is moved to a later point (in time), compared with those before the setting was performed (i.e., with those in the case in which the gradient of the P-phase slope is rapid).

When the P-phase crossing point is moved to a later point in time, the P-phase margin during image capturing of a subject with an appropriate luminance decreases. In order to ensure a sufficient amount of the P-phase margin during image capturing of a subject with an appropriate luminance, it is desirable that the P-phase crossing point be positioned, for example, in the vicinity of the center of the P phase (the position of the P-phase slope at the middle point in the P-phase).

Accordingly, in the normal mode, on the basis of the sensor gain, the reference-signal output section 33 (FIG. 4) sets the amount of offset in the initiation offset so that the P-phase crossing point is positioned in the vicinity of the center of the P-phase slope.

That is, when the sensor gain is a high gain and the gradient of the P-phase slope of the reference signal is gentle, as indicated by a solid line in FIG. 13, the reference-signal output section 33 sets, on the basis of the high sensor gain, a small amount of offset pofH1 as the amount of offset in the initiation offset so that the P-phase crossing point is positioned in the vicinity of the center of the P-phase slope and then performs the initiation offset.

When the sensor gain is a low gain and the gradient of the P-phase slope of the reference signal is rapid, as indicated by a dotted line in FIG. 13, the reference-signal output section 33 sets, on the basis of the low sensor gain, a large amount of offset pofL1 as the amount of offset in the initiation offset so that the P-phase crossing point is positioned in the vicinity of the center of the P-phase slope and then performs the initiation offset.

With respect to each sensor gain, the amount of offset in the initiation offset (e.g., the above-mentioned amounts of offset pofL1 and pofH1) by which the P-phase crossing point is positioned in the vicinity of the center of the P-phase slope can be determined in advance through simulation or the like and can be set for the image sensor 2 in advance.

Since offsetting for increasing the start level of the P-phase slope is performed in the initiation offset, the amount of offset in the initiation offset is increased so that the P-phase crossing point is positioned closer to the vicinity of the P-phase slope, as the sensor gain becomes lower, that is, the gradient of the P-phase slope becomes steeper.

FIG. 14 is a waveform diagram illustrating an example of the signal-line voltage and the reference-signal voltage when the amount of offset in the P-phase offset in the black-sunspot avoidance mode (the amount of the P-phase offset) is set based on the sensor gain.

In the black-sunspot avoidance mode, the reference-signal output section 33 (FIG. 4) also sets the amount of offset in the P-phase offset so that the P-phase crossing point is positioned in the vicinity of the center of the P-phase slope, on the basis of the sensor gain, as in the case in the normal mode in FIG. 13.

In the present embodiment, a reference signal having a right downward P-phase slope is used. With respect to the reference signal having a right downward P-phase slope, in the P-phase offset, offsetting for reducing the start level of the P-phase slope is performed, in a manner opposite to the case in the initiation offset. Thus, the amount of offset in the P-phase offset is reduced in a manner opposite to the case in the initiation offset so that the P-phase crossing point is positioned closer to the vicinity of the center of the P-phase slope, as the sensor gain becomes smaller, that is, the gradient of the P-phase slope becomes steeper.

The amount of offset in the P-phase offset (the amount of the P-phase offset) can be determined using, for example, the amount of offset in the initiation offset in the normal mode.

By way of example, it is now assumed that the amount of offset in the initiation offset, the amount being set for a low sensor gain gL, is the large amount of offset pofL1 illustrated in FIG. 13, and the amount of offset in the initiation offset, the amount being set for a high sensor gain gH, is the small amount of offset pofH1 illustrated in FIG. 13.

It is also assumed that a typical value (e.g., average value) of the voltage drop due to the reset feedthrough when a subject with an appropriate luminance is photographed is a voltage pofC. The voltage pofC in this case is a fixed value that does not depend on the sensor gain.

In this case, when the sensor gain is a high gain gH and the gradient of the P-phase slope of the reference signal is gentle as indicated by a solid line in FIG. 14, the reference-signal output section 33 can determine an amount of offset pofH2=pofC−pofH1 as the amount of the P-phase offset for the high sensor gain gH by using the small amount of offset pofH1 (FIG. 13) set as the amount of offset in the initiation offset in the normal mode, to perform the P-phase offset.

Since the amount of offset pofH1 is a small amount of offset, the amount of offset pofH2=pofC−pofH1 used as the amount of the P-phase offset becomes larger than an amount of offset pofL2 described below.

On the other hand, when the sensor gain is a low gain gL and the gradient of the P-phase slope of the reference signal is steep as indicated by a dotted line in FIG. 14, the reference-signal output section 33 can determine the amount of offset pofL2=pofC−pofL1 as the amount of the P-phase offset for the low sensor gL by using the large amount of offset pofL1 (FIG. 13) set as the amount of offset in the initiation offset in the normal mode, to perform the P-phase offset.

Since the amount of offset pofL1 is a large amount of offset, the amount of offset pofL2=pofC−pofL1 used as the P-phase offset becomes smaller than the above-described amount of offset pofH2.

As described above, in the black-sunspot avoidance mode, the amount of the P-phase offset is set based on the sensor gain, so that the P-phase crossing point is positioned in the vicinity of the center of the P-phase slope, regardless of the sensor gain. As a result, it is possible to ensure a sufficient amount of the P-phase margin during image capturing of a subject with an appropriate luminance (it is possible to inhibit occurrence of the P-phase non-crossing during image capturing of a subject with an appropriate luminance, regardless of the sensor gain.

[Setting of Length of P Phase in Black-Sunspot Avoidance Mode]

In the black-sunspot avoidance mode, the length of the P phase can be set to a fixed length. In addition, in the black-sunspot avoidance mode, the length of the P phase can be set based on, for example, the sensor gain.

FIG. 15 is a waveform diagram illustrating an example of the signal-line voltage and the reference-signal voltage when the length of the P phase in the black-sunspot avoidance mode is set based on the sensor gain.

In FIG. 15, the amount of the P-phase offset is fixed to an amount of offset pofconst, regardless of the value of the sensor gain, for ease of description.

When the sensor gain is a high gain, the gradient of the P-phase slope becomes gentle, and when the sensor gain is a low gain, the gradient of the P-phase slope becomes steep.

Thus, when the length of the P phase is fixed, the difference between the voltage at the start point of the P-phase slope and the voltage at the end point thereof becomes smaller, as the sensor gain becomes a higher gain and the gradient of the P-phase slope becomes gentler.

In particular, as illustrated in FIG. 15, in a case in which the amount of the P-phase offset is fixed, when the sensor gain is set to a high gain and the gradient of the P-phase slope is made to be gentle, a fixed length of the P phase causes the end time (the end point) of the P-phase slope to move to an earlier point in time. Thus, during image capturing of a subject with an appropriate luminance, the P-phase non-crossing is more likely to occur.

Accordingly, the reference-signal output section 33 can set the length of the P phase (which is also the length of the P-phase slope) on the basis of the sensor gain.

That is, for example, when the amount of the P-phase offset is fixed to the amount of offset pofconst, a potential difference from the start point of the P-phase slope to the end point thereof, the potential difference being given to ensure a sufficient amount of the P-phase margin, during image capturing of a subject with an appropriate luminance is assumed to be a voltage R1. In this case, with respect to the sensor gain, the reference-signal output section 33 can set the length of the P phase so that the potential difference from the start point of the P-phase slope to the end point thereof becomes the voltage R1.

In this case, when the sensor gain is high and the gradient of the P-phase slope is gentle, as indicated by a solid line in FIG. 15, the length of the P phase is set to a large value lenH1 (i.e., is set to a large length).

When the sensor gain is low and the gradient of the P-phase slope is steep, as indicated by a dotted line in FIG. 15, the length of the P phase is set to a small value lenL1 (i.e., is set to a small length).

By setting the length of the P phase on the basis of the sensor gain (the gradient of the P-phase slope), as described above, it is possible to ensure a sufficient amount of the P-phase margin during image capturing of a subject with an appropriate luminance.

When the length of the P phase is set to a short length (i.e., is set to the small value lenL1), the time taken for the AD conversion can be reduced, and further the power consumption can be reduced, compared with a case in which the length of the P phase is set to a large length (i.e., a case in which the length of the P phase is set to the large value lenH1).

[Setting of Amount in P-Phase Offset and Length of P Phase in Black-Sunspot Avoidance Mode]

In FIG. 14, the amount of the P-phase offset in the black-sunspot avoidance mode has been described as being set based on the sensor gain, and in FIG. 15, the length of the P phase in the black-sunspot avoidance mode has been described as being set based on the sensor gain. However, in the black-sunspot avoidance mode, both of the amount of the P-phase offset and the length of the P phase can be set based on the sensor gain.

FIG. 16 is a waveform diagram illustrating an example of the signal-line voltage and the reference-signal voltage when the amount of the P-phase offset and the length of the P phase are set based on the sensor gain in the black-sunspot avoidance mode.

In FIG. 16, the amount of the P-phase offset is set to a small amount of offset pofL2 or a large amount of offset pofH2, on the basis of the sensor gain (the gradient of the P-phase slope), as in the case described above with reference to FIG. 14.

In addition, in FIG. 16, the length of the P phase is set to a small value lenL1 or a large value lenH1, on the basis of the sensor gain, as in the case described above with reference to FIG. 15.

In FIG. 16, the amounts of offset pofL2 and pofH2 and the lengths of the P phase lenL1 and lenH1 may or may not match those in FIG. 14 and FIG. 15. With respect to the amounts of offset pofL2 and pofH2 and the lengths of the P phase lenL1 and lenH1 used in FIG. 16, for example, a value at which the P-phase crossing point is positioned in the vicinity of the center of the P-phase slope is determined through simulation or the like.

In FIG. 16, the potential difference from the start point of the P-phase slope to the end point thereof varies between when the length of the P phase has the value lenL1 and when the length of the P phase has the value lenH1. That is, the potential difference from the start point of the P-phase slope to the end point thereof when the length of the P phase has the value lenH1 (when the sensor gain is a high gain) is smaller than the potential difference from the start point of the P-phase slope to the end point thereof when the length of the P phase has the value lenL1 (when the sensor gain is a low gain). However, even in a case in which the potential difference from the start point of the P-phase slope to the end point thereof is small, when the P-phase crossing point is positioned in the vicinity of the center of the P-phase slope, it is possible to ensure the P-phase margin during photography of a subject with an appropriate luminance.

[Adjustment of Amount of P-Phase Offset]

In FIG. 14, the amount of the P-phase offset by which the P-phase crossing point can be positioned in the vicinity of the center of the P-phase slope is determined in advance for each sensor gain, and based on the sensor gain, the amount of the P-phase offset is set, as described above. The amount of the P-phase offset may also be set to a predetermined amount of offset (e.g., the amount of offset pofL2 or pofH2 in FIG. 14), depending on variations in an individual IC chip serving as the image sensor 2, a temperature, another drive condition, or the like. Even in such a case, however, there is a possibility that the P-phase crossing point is displaced from a position in the vicinity of the P-phase slope.

When the P-phase crossing point is displaced from a position in the vicinity of the P-phase slope, the P-phase margin decreases.

Accordingly, in the black-sunspot avoidance mode, the amount of the P-phase offset can be adaptively adjusted so that the P-phase crossing point is positioned in the vicinity of the P-phase slope.

Figure 17:
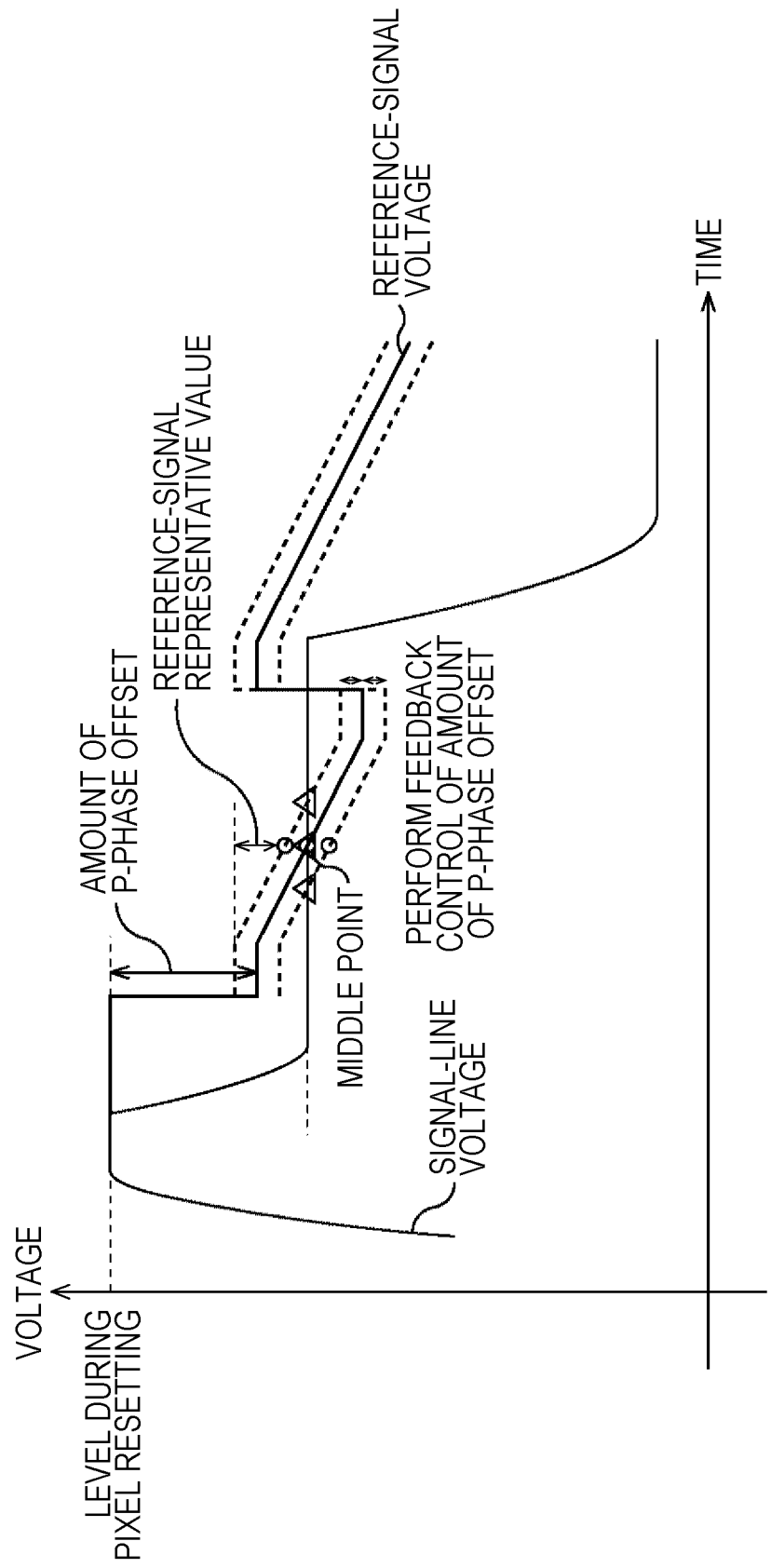
FIG. 17 is a waveform diagram illustrating an example of the signal-line voltage and the reference-signal voltage when the amount of the P-phase offset is adjusted so that a P-phase crossing point is positioned in the vicinity of the center of a P-phase slope.

FIG. 17 is a waveform diagram illustrating an example of the signal-line voltage and the reference-signal voltage when the amount of the P-phase offset is adjusted so that the P-phase crossing point is positioned in the vicinity of the center of the P-phase slope.

The reference-signal output section 33 (FIG. 4) determines a reset-level representative value, which is a representative value of the reset-level AD values obtained by the ADCs $31_n$, and also determines a reference-signal representative value (a predetermined value), which is a representative value of the reference signals.

The reset-level representative value used in this case may be, for example, the average value of the reset-level AD values of the pixels $11_{m,n}$ in one row or multiple rows, the average value of the reset-level AD values of the pixels $11_{m,n}$ in one frame or multiple frames, or the average value of the reset-level AD values of the pixels $11_{m,n}$ at the same position in multiple past frames.

The average value of the reset-level AD values of the pixels $11_{m,n}$ in one row or multiple rows can be determined for each row or for each group of multiple rows. The average value of the reset-level AD values of the pixels $11_{m,n}$ in one frame or multiple frames can be determined for each frame or each group of multiple frames. The average value of the reset-level AD values of the pixels $11_{m,n}$ at the same position in multiple past frames can be determined for each pixel or each group of multiple pixels, for each row or each group of multiple rows, or each frame or each group of multiple frames.

That is, the period in which the reset-level representative value is determined is not particularly limited.

The reference-signal representative value may be, for example, an AD value for a predetermined point on the P-phase slope of the most-recent reference signal (an AD-conversion result (the count value of the counter $62_n$) obtained when the predetermined point is the P-phase crossing point). The predetermined point may be, for example, the middle point of the P-phase slope (a point that lies on the P-phase slope and that corresponds to the middle point in the P phase).

In this case, the AD value (the count value of the counter $62_n$) for the middle point of the P-phase slope serves as the reference-signal representative value.

Upon determining the reset-level representative value and the reference-signal representative value (the predetermined value), the reference-signal output section 33 adjusts the amount of the P-phase offset so that a deviation of the reset-level representative value relative to the reference-signal representative value becomes small and offsets, in the subsequent P-phase offset, the start level of the P-phase slope by an amount corresponding to the adjusted amount of the P-phase offset.

Thus, the reference-signal output section 33 performs feedback control for adjusting, in the P phase, the amount of the P-phase offset so that the P-phase crossing point (indicated by a triangle mark in FIG. 17) at which the signal-line voltage indicating the reset level and the reference signal cross each other matches the middle point (indicated by a circle mark in FIG. 17) of the P-phase slope.

According to the adjustment of the amount of the P-phase offset, since the P-phase offset is performed so that the P-phase crossing point is positioned in the vicinity of the middle point of the P-phase slope, a sufficient amount of the P-phase margin can be ensured regardless of variations in an individual IC chip used as the image sensor 2.

The amount of the P-phase offset can be "directly" adjusted by changing the amount of offset pofL2 or pofH2 that serves as the amount of the P-phase offset illustrated in FIG. 14, or can be "indirectly" adjusted by changing the voltage pofC (FIG. 14) used for determining the amount of offset pofL2 or pofH2.

Figure 18:
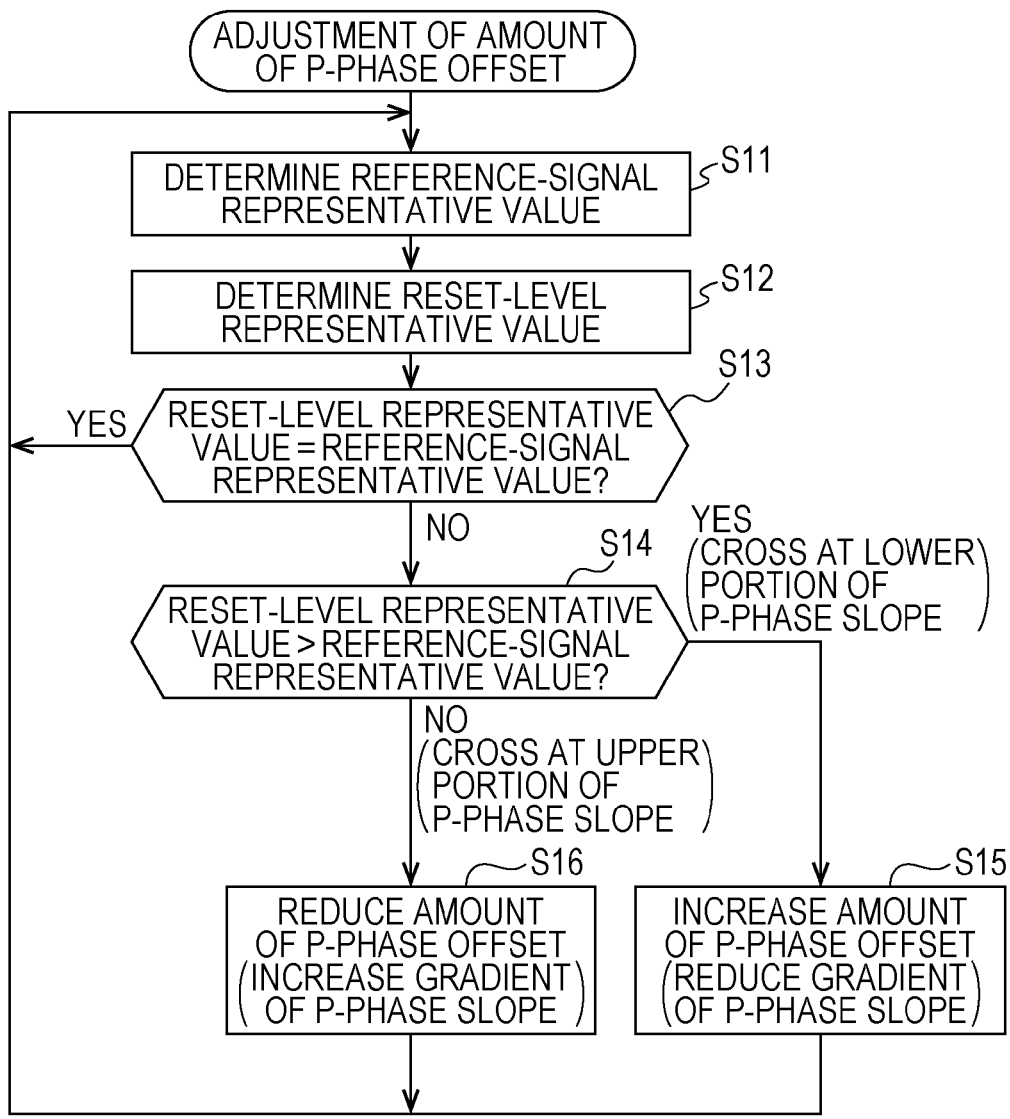
FIG. 18 is a flowchart illustrating processing for adjusting the amount of the P-phase offset.

FIG. 18 is a flowchart illustrating processing, performed by the reference-signal output section 33, for adjusting the amount of the P-phase offset, as described above.

In step S11, the reference-signal output section 33 determines a reference-signal representative value on the basis of a most-recent reference signal. The process then proceeds to step S12.

In step S12, the reference-signal output section 33 determines a reset-level representative value. The process then proceeds to step S13.

In step S13, the reference-signal output section 33 decides whether or not the reset-level representative value matches the reference-signal representative value (whether or not they can be regarded as matching each other).

When it is decided in step S13 that the reset-level representative value matches the reference-signal representative value (they can be regarded as matching each other), that is, when the P-phase crossing point at which the reset-level representative value and the P-phase slope of the most-recent reference signal cross each other is positioned in the vicinity of the middle point of the P-phase slope, the process returns to step S11.

That is, when the P-phase crossing point is positioned in the vicinity of the middle point of the P-phase slope, the amount of the P-phase offset is not adjusted (is not to be adjusted), and the present value is maintained.

When it is decided in step S13 that the reset-level representative value does not match the reference-signal representative value, that is, when the P-phase crossing point at which the reset-level representative value and the P-phase slope of the most-recent reference signal cross each other is not positioned in the vicinity of the middle point of the P-phase slope, the process proceeds to step S14. In step S14, the reference-signal output section 33 decides whether or not the reset-level representative value is larger than the reference-signal representative value.

When it is decided in step S14 that the reset-level representative value is larger than the reference-signal representative value, that is, when the P-phase crossing point is a point lower than the vicinity of the middle point of the P-phase slope (i.e., is a point close to the end point of the P-phase slope), the process proceeds to step S15. In step S15, the reference-signal output section 33 adjusts the amount of the P-phase offset during output of a next reference signal so that the amount of the P-phase offset is increased by a predetermined voltage. The process then returns to step S11.

In this case, since the amount of the P-phase offset during output of the next reference signal increases, the P-phase slope of the reference signal (i.e., the next reference signal) is arranged at a lower position than the position before the amount of the P-phase offset is increased.

On the other hand, when it is decided in step S14 that the reset-level representative value is not larger than the reference-signal representative value, that is, when the P-phase crossing point is a point higher than the vicinity of the middle point of the P-phase slope (a point closer to the start point of the P-phase slope), the process proceeds to step S16. In step S16, the reference-signal output section 33 adjusts the amount of the P-phase offset during output of a next reference signal so that the amount of the P-phase offset is reduced by a predetermined voltage. The process then returns to step S11.

In this case, since the amount of the P-phase offset during output of the next the reference signal decreases, the P-phase slope of the reference signal (i.e., the next reference signal) is arranged at a position higher than the position before the amount of the P-phase offset is reduced.

In FIG. 18, the magnitude relationship between the reset-level representative value and the reference-signal representative value is determined in step S14, and based on the magnitude relationship, the amount of the P-phase offset is adjusted so that the amount of the P-phase offset is increased or reduced by a predetermined voltage. Alternatively, for example, based on the difference between the reset-level representative value and the reference-signal representative value, the amount of the P-phase offset can be adjusted by a voltage corresponding to the difference.

[Reduction in Length of P Phase]

Figure 19:
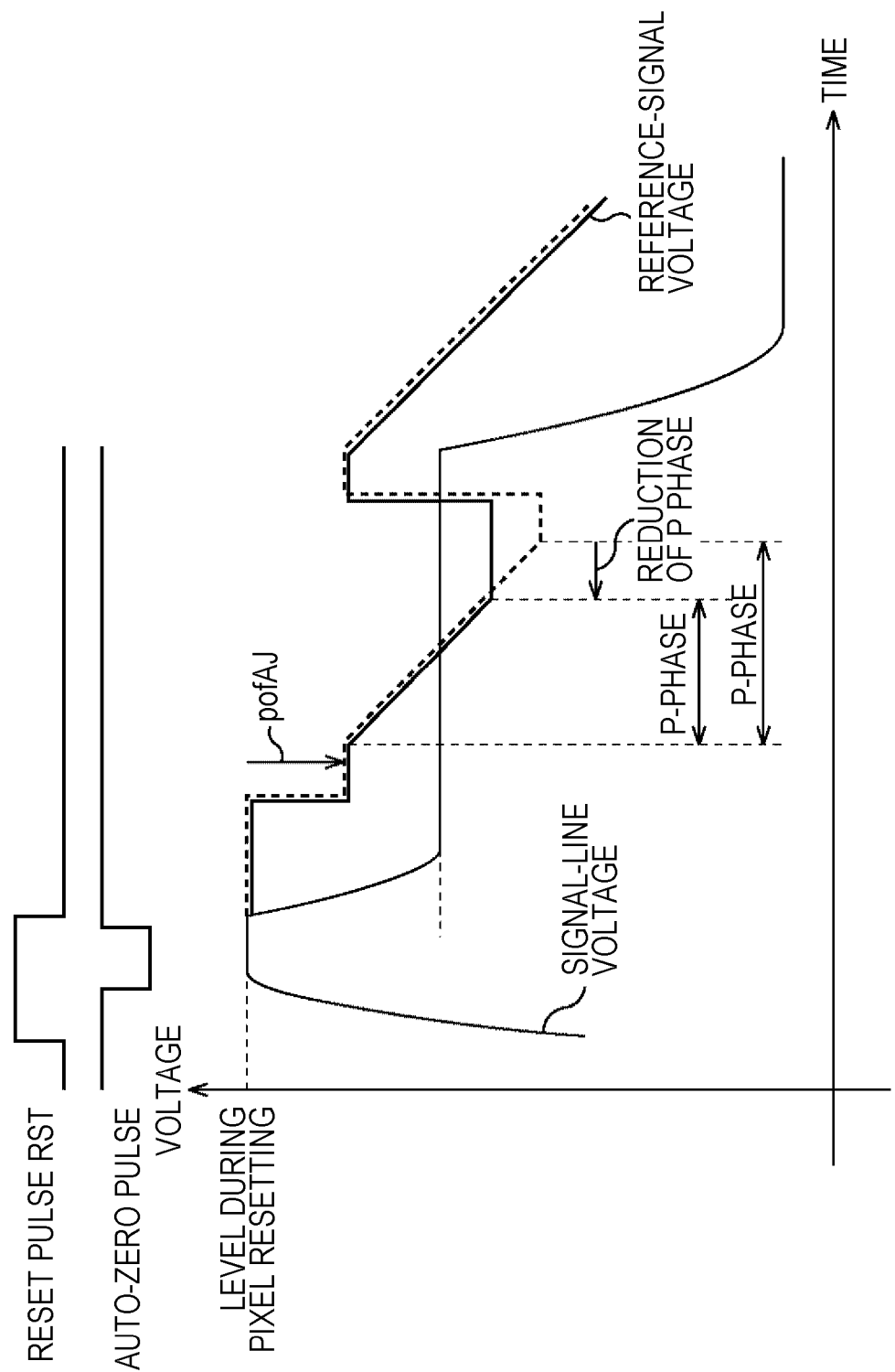
FIG. 19 is a waveform diagram illustrating an example of the signal-line voltage and the reference-signal voltage when adjustment for reducing the length of the P phase is performed in the black-sunspot avoidance mode.

FIG. 19 is a waveform diagram illustrating an example of the signal-line voltage and the reference-signal voltage when the adjustment for reducing the length of the P phase is performed in the black-sunspot avoidance mode.

According to the adjustment of the amount of the P-phase offset, the adjustment being described above with reference to FIGS. 17 and 18, the P-phase crossing point is positioned in the vicinity of the middle point of the P-phase slope, so that it is possible to ensure a sufficient amount of the P-phase margin.

As described above, since a sufficient amount of the P-phase margin is ensured when the amount of the P-phase offset is adjusted and the P-phase crossing point is positioned in the vicinity of the middle point of the P-phase slope, the P-phase non-crossing does not occur during image capturing of a subject with an appropriate luminance, even when the adjustment for reducing the length of the P phase to some extent is performed by moving the end point of the P-phase slope to an earlier point (in time).

Accordingly, when the amount of the P-phase offset is adjusted to an appropriate amount of offset pofAJ so that the P-phase crossing point is positioned in the vicinity of the middle point of the P-phase slope, as illustrated in FIG. 19, the reference-signal output section 33 can perform the adjustment for reducing the length of the P phase by moving, to an earlier point in time, the end point of the P-phase slope of the reference signal (indicated by a dotted line in FIG. 19) immediately after the amount of the P-phase offset is adjusted to the appropriate amount of offset pofAJ and can output a reference signal whose length of the P phase (indicated by a solid line in FIG. 19) is reduced.

By performing the adjustment for reducing the length of the P phase after the amount of the P-phase offset is adjusted, as described above, it is possible to reduce the time taken for the AD conversion and it is further possible to reduce the power consumption, while inhibiting occurrence of the P-phase non-crossing during image capturing of a subject with an appropriate luminance.

Figure 20:
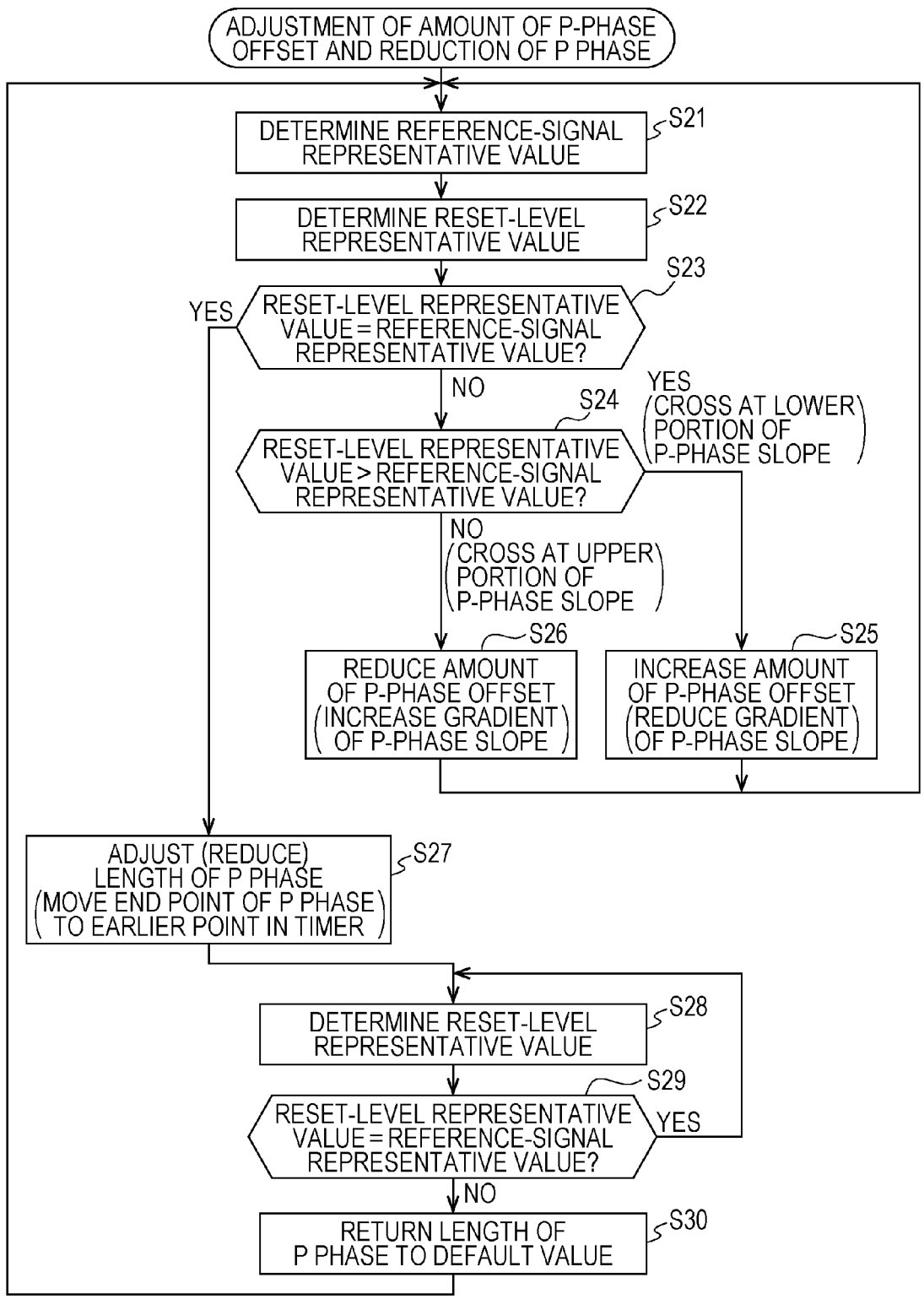
FIG. 20 is a flowchart illustrating processing for adjusting the amount of the P-phase offset and reducing the length of the P phase.

FIG. 20 is a flowchart illustrating processing, performed by the reference-signal output section 33, for adjusting the amount of the P-phase offset and reducing the length of the P phase, as described above.

In steps S21 to S26 in FIG. 20, processes that are analogous to those in steps S11 to S16 in FIG. 18 are performed, respectively. As a result, the amount of the P-phase offset is adjusted to the appropriate amount of offset pofAJ so that the P-phase crossing point is positioned in the vicinity of the middle point of the P-phase slope.

When it is decided in step S23 that the reset-level representative value matches the reference-signal representative value, that is, when the P-phase crossing point matches the middle point of the P-phase slope (i.e., when they can be regarded as matching each other), the process proceeds to step S27. In step S27, the reference-signal output section 33 performs adjustment for reducing the length of the P phase by moving, to an earlier point in time, the end point of the P-phase slope of the reference signal immediately after the amount of the P-phase offset is adjusted to the appropriate amount of offset pofAJ. The process then proceeds to step S28.

In this case, after performing the adjustment for reducing the length of the P phase, the reference-signal output section 33 outputs a reference signal whose length of the P phase is reduced.

In step S27, for example, the length of the P phase can be reduced by a predetermined fixed length (of time). Also, the amount by which the length of the P phase is reduced can be pre-defined for each sensor gain, so that, in step S27, the length of the P phase can be reduced by the amount pre-defined for the sensor gain when the length of the P phase is reduced.

In step S28, the reference-signal output section 33 determines a reset-level representative value. The process then proceeds to step S29.

In step S29, the reference-signal output section 33 decides whether or not the reset-level representative value matches the reference-signal representative value (whether they can be regarded as matching each other).

In step S29, the decision is made as to whether or not the reset-level representative value matches the reference-signal representative value of the reference signal immediately before the adjustment for reducing the length of the P phase (the reference signal immediately after the amount of the P-phase offset is adjusted to the appropriate amount of offset pofAJ), not the reference-signal representative value of the most-recent the reference signal.

When it is decided in step S29 that the reset-level representative value matches (can be regarded as matching) the reference-signal representative value, the process returns to step S28.

In this case, the outputting of the reference signal whose length of the P phase is reduced is continued.

On the other hand, when it is decided in step S29 that the reset-level representative value does not match the reference-signal representative value, the process proceeds to step S30 in which the reference-signal output section 33 returns the length of the P phase of the reference signal to its default value, that is, sets the length of the P phase to, for example, a predetermined fixed value or a length based on the sensor gain, as described in FIG. 15. The process then returns to step S21.

In FIGS. 19 and 20, the amount of the P-phase offset is adjusted so that the P-phase crossing point is positioned in the vicinity of the middle point of the P-phase slope, and then, the length of the P phase is adjusted. However, the adjustment of the amount of the P-phase offset and the reduction of the length of the P phase can be alternately repeated, as appropriate.

Figure 21:
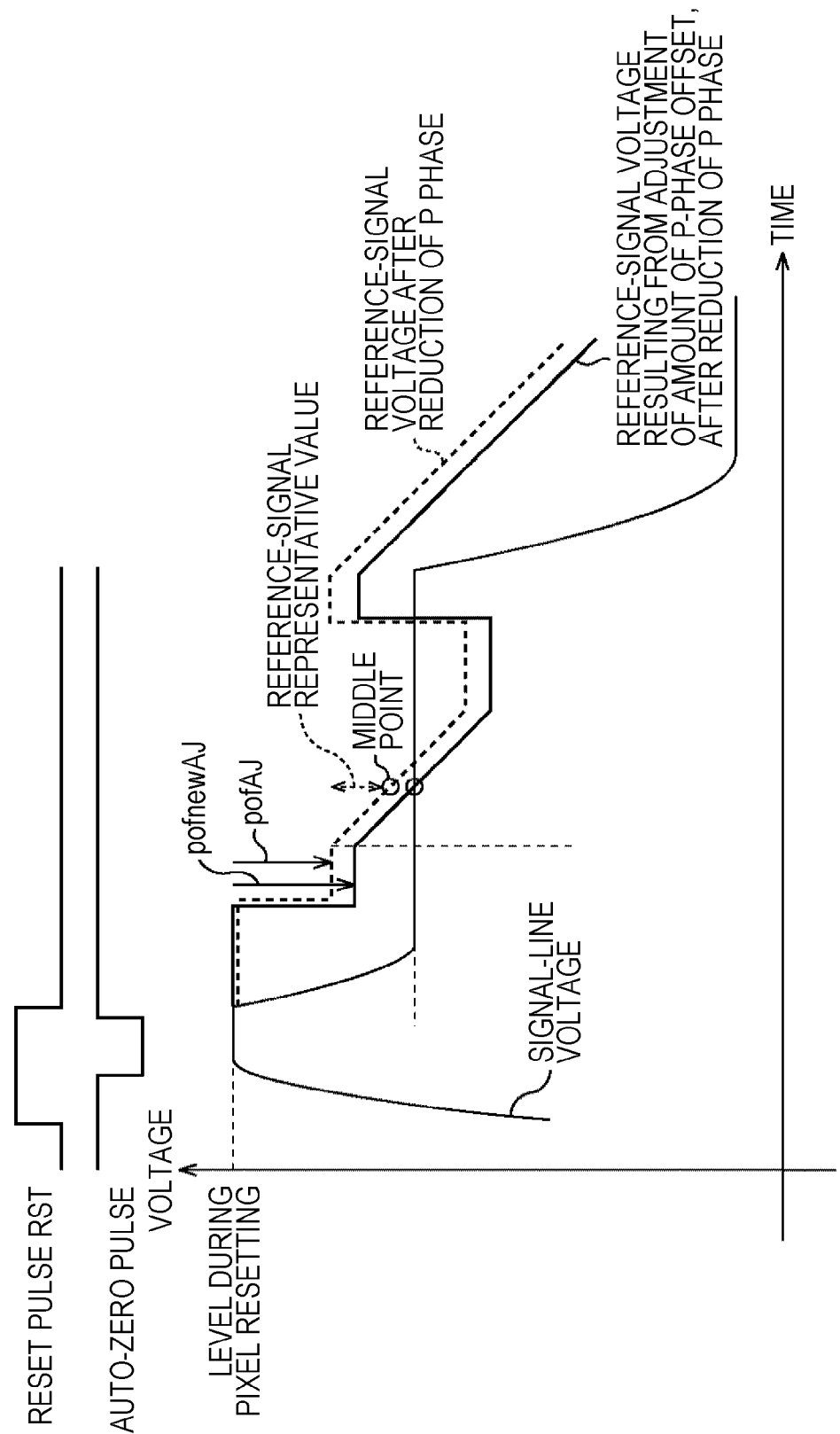
FIG. 21 is a waveform diagram illustrating an example of the signal-line voltage and the reference-signal voltage when the adjustment of the amount of the P-phase offset and the reduction of the length of the P phase are alternately repeated.

FIG. 21 is a waveform diagram illustrating an example of the signal-line voltage and the reference-signal voltage when the adjustment of the amount of the P-phase offset and the reduction of the length of the P phase are alternately repeated.

In FIGS. 19 and 20, as described above, the adjustment for reducing the length of the P phase is performed by moving, to an earlier point in time, the end point of the P-phase slope of the reference signal after the amount of the P-phase offset is adjusted to the appropriate amount of offset pofAJ so that the P-phase crossing point is positioned in the vicinity of the middle point of the P-phase slope.

In FIG. 21, with respect to the reference signal (FIG. 21 dotted line) subject to the adjustment for reducing the length of the P phase, the amount of the P-phase offset is further adjusted so that the P-phase crossing point is positioned in the vicinity of the middle point of the P-phase slope, and then the adjustment for reducing the length of the P phase is further repeated.

A solid line illustrated in FIG. 21 represents a reference signal (the waveform thereof) that is obtained by adjusting the amount of the P-phase offset to the appropriate amount of offset pofAJ and further re-adjusting the amount of the P-phase offset to a predetermined amount of offset pofnewAJ with respect to the reference signal (indicated by the dotted line in FIG. 21), obtained from the adjustment for reducing the length of the P phase, so that the P-phase crossing point is positioned in the vicinity of the middle point of the P-phase slope.

As a result of repeating the adjustment of the amount of offset in the P phase and the reduction of the length of the P phase, it is possible to further reduce the time taken for the AD conversion and it is also possible to further reduce the power consumption, while inhibiting occurrence of the P-phase non-crossing during image capturing of a subject with an appropriate luminance.

Figure 22:
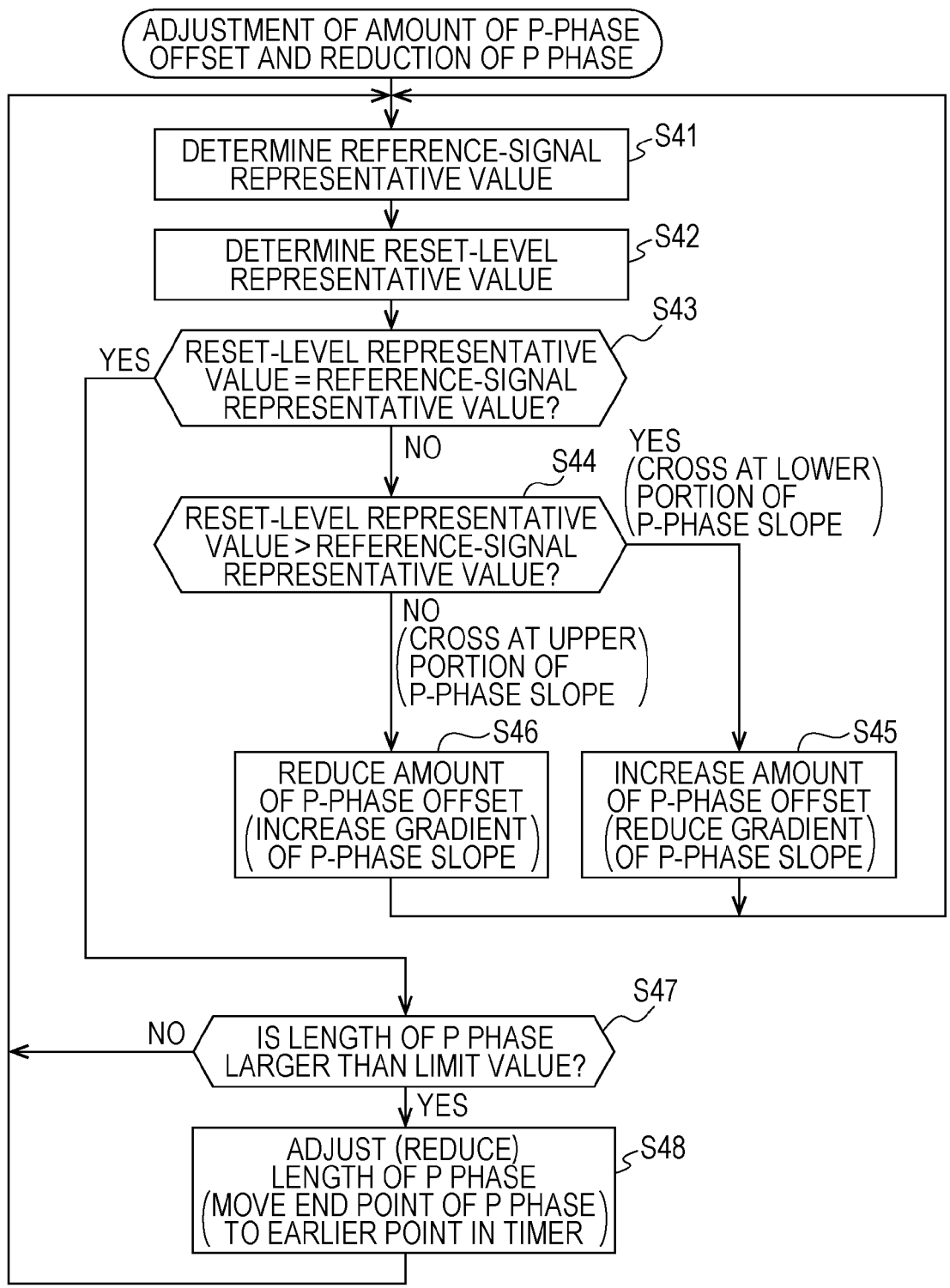
FIG. 22 is a flowchart illustrating processing in which the adjustment of the amount of the P-phase offset and the reduction of the length of the P phase are repeatedly performed.

FIG. 22 is a flowchart illustrating processing in which the adjustment of the amount of the P-phase offset and the reduction of the length of the P phase, as described above, are repeatedly performed.

In steps S41 to S46 in FIG. 22, processes that are analogous to those in steps S11 to S16 in FIG. 18 are performed, respectively. As a result, the amount of the P-phase offset is adjusted to the appropriate amount of offset pofAJ so that the P-phase crossing point is positioned in the vicinity of the middle point of the P-phase slope.

In step S43, when it is decided that the reset-level representative value matches the reference-signal representative value, that is, the P-phase crossing point matches (can be regarded as matching) the middle point of the P-phase slope, the process proceeds to step S47. In step S47, the reference-signal output section 33 decides whether or not the length of the P phase is larger than a predetermined limit value of the length of the P phase.

The "limit value of the length of the P phase" as used herein refers to a minimum value of the length of the P phase with which the P-phase non-crossing does not occur (or is significantly unlikely to occur) during image capturing of a subject with an appropriate luminance, when the P-phase crossing point matches the middle point of the P-phase slope (i.e., when the P-phase crossing point is positioned in the vicinity of the middle point of the P-phase slope).

The limit value of the length of the P phase is determined in advance, for example, through simulation or the like, and is set for the image sensor 2. The limit value of the length of the P phase can be determined, for example, for each sensor gain (the gradient of the P-phase slope), in which case, the limit value of the length of the P phase with respect to the present sensor gain is used in the determination process in step S47.

In step S47, when it is decided that the length of the P phase is not larger than the limit value, that is, when the length of the P phase is sufficiently reduced, the process skips step S48 to return to step S41.

When it is decided in step S47 that the length of the P phase is larger than the limit value, that is, when the P-phase non-crossing does not occur (or is significantly less likely to occur) during image capturing of an appropriate-luminance subject even when the length of the P phase is reduced, the process proceeds to step S48. In step S48, the reference-signal output section 33 performs adjustment for reducing the length of the P phase by moving, to an earlier point in time, the end point of the P-phase slope of the reference signal immediately after the amount of the P-phase offset is adjusted to the appropriate amount of offset pofAJ, as in step S27 illustrated in FIG. 20. The process then returns to step S41.

[Selection of Auto-Zero Mode]

Figure 23:
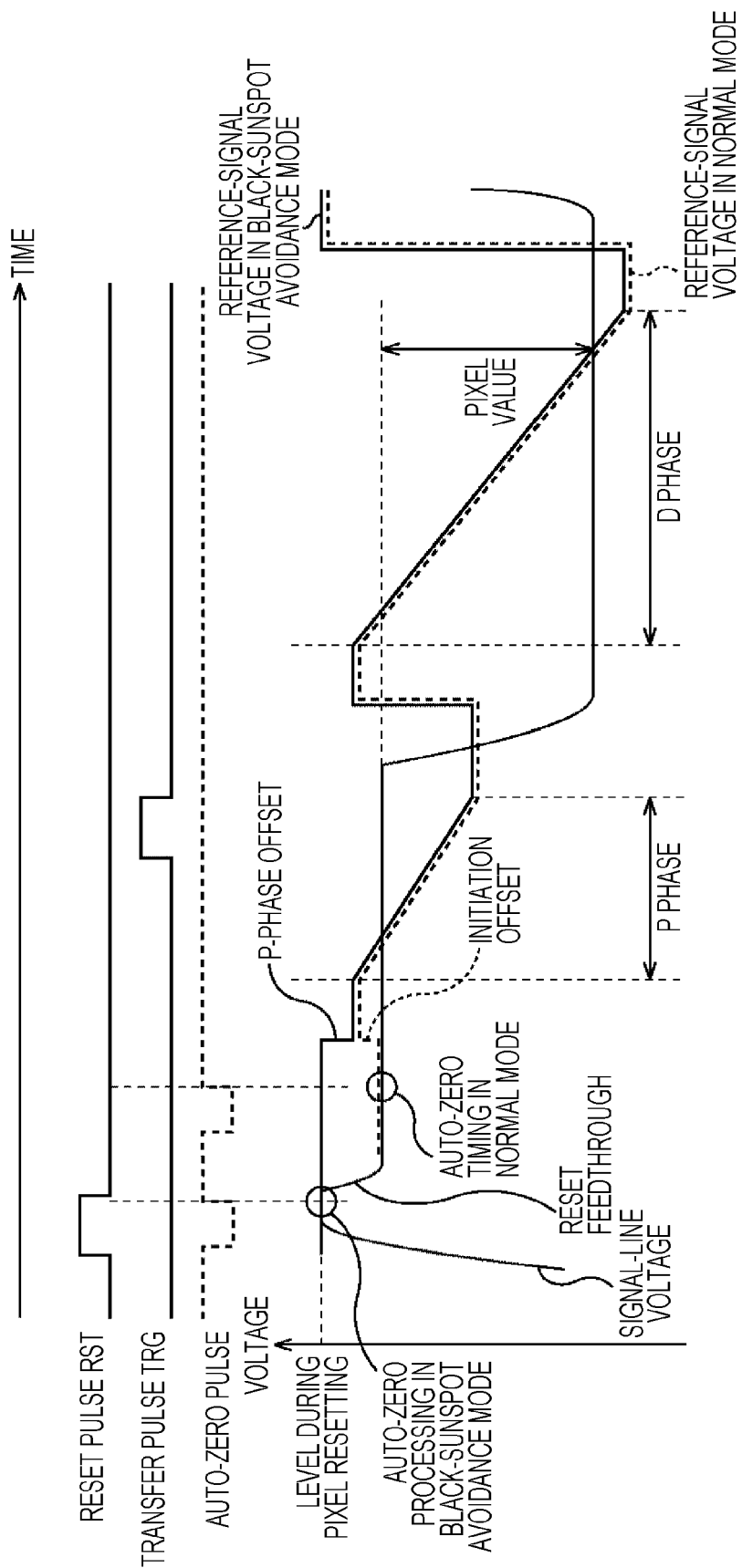
FIG. 23 is a waveform diagram illustrating an example of the reference signal when the auto-zero mode is the normal mode and an example of the reference signal when the auto-zero mode is the black-sunspot avoidance mode.

FIG. 23 is a waveform diagram illustrating an example of the reference signal when the auto-zero mode is the normal mode and an example of the reference signal when the auto-zero mode is the black-sunspot avoidance mode.

In the normal mode, the auto zero processing is performed so that it is completed before the pixel resetting, as described above with reference to FIG. 6.

Thus, in the normal mode, the reference signal (the waveform thereof) is arranged at a position where the voltage that has dropped from the level during the pixel resetting (the signal-line voltage during the pixel resetting) by an amount corresponding to the voltage drop due to the reset feedthrough that occurs after the pixel resetting serves as a reference, as indicated by a dotted line in FIG. 23.

On the other hand, in the black-sunspot avoidance mode, the auto zero processing is performed so that it is completed during the period of the pixel resetting, as described above with reference to FIG. 10.

Thus, in the black-sunspot avoidance mode, as indicated by a solid line in FIG. 23, the reference signal (the waveform thereof) is arranged at a position where the level during the pixel resetting serves as a reference.

In the auto zero processing, the FETs 75 and 76 in the comparator $61_n$ (FIG. 5) are turned on and then are turned off.

When the FETs 75 and 76 are turned on, charges are accumulated in the capacitors 77 and 78 so that the voltage applied to the gate of the FET 71 from the inverting input terminal IN1 via the capacitor 77 (i.e., the gate voltage of the FET 71) and the voltage applied to the gate of the FET 72 from the non-inverting input terminal IN2 via the capacitor 78 (i.e., the gate voltage of the FET 72) match each other.

When the FETs 75 and 76 are turned off, the charges accumulated in the capacitors 77 and 78 when the FETs 75 and 76 were turned on are maintained.

As a result, the comparator $61_n$ is set so as to provide a comparison result indicating that the two input signals supplied to the comparator $61_n$, that is, the reference signal supplied to the inverting input terminal of the comparator $61_n$ and the signal-line voltage supplied to the non-inverting input terminal, when the FETs 75 and 76 are in the on state (more specifically, immediately before they are turned off) match each other.

In the auto zero processing described above, when the FETs 75 and 76 are changed from the on state to the off state, for example, a small amount of charge moves to the capacitors 77 and 78. Owing to such charge movement, there are cases in which the position of the reference signal (the waveform thereof) is displaced to some extent from the position where the voltage that has dropped from the level during the pixel resetting by an amount corresponding to the voltage drop due to the reset feedthrough serves as a reference or the position where the level during the pixel resetting serves as a reference (i.e., the position of the reference signal may be displaced upward or downward). The position displacement of the reference signal has variations, which may also be referred to as "comparator variations".

The voltage drop due to the reset feedthrough that occurs after the pixel resetting also does not have a constant value and has variations. The variations in the voltage drop due to the reset feedthrough may also be referred to as "reset-feedthrough variations".

In both of the normal mode and the black-sunspot avoidance mode, the positional relationship between the signal-line voltage and the reference signal is affected by the comparator variations.

In the normal mode, however, the reference signal is arranged at a position where the voltage that has dropped from the level during the pixel resetting by an amount corresponding to the voltage drop due to the reset feedthrough serves as a reference, as described above. Thus, even when there are reset-feedthrough variations, the position of the reference signal is displaced in conjunction with the position of the signal-line voltage, in accordance with the reset-feedthrough variations. Thus, the positional relationship between the signal-line voltage and the reference signal is not affected by the reset-feedthrough variations.

In the black-sunspot avoidance mode, however, the reference signal is arranged at the position where the level during the pixel resetting that is not affected by the voltage drop due to the reset feedthrough serves as a reference, the positional relationship between the signal-line voltage and the reference signal varies when the position of the signal-line voltage is displaced by the reset-feedthrough variations. Thus, in the black-sunspot avoidance mode, the positional relationship between the signal-line voltage and the reference signal is affected by the reset-feedthrough variations.

As described above, in the normal mode, the positional relationship between the signal-line voltage and the reference signal is affected by the comparator variations but is not affected by the reset-feedthrough variations.

On the other hand, in the black-sunspot avoidance mode, the positional relationship between the signal-line voltage and the reference signal is affected by both of the comparator variations and the reset-feedthrough variations.

Accordingly, in the black-sunspot avoidance mode, the positional relationship between the signal-line voltage and the reference signal varies by a large amount corresponding to the influence of the reset-feedthrough variations, when compared with the amount in the normal mode.

Thus, when an image of a subject with an appropriate luminance is captured in the black-sunspot avoidance mode, it is important that, in order to ensure the P-phase margin that is about the same as that in the normal mode, the length of the P-phase slope (and also the length of the P phase) be set to be larger than the length of the P-phase slope in the normal mode by an amount corresponding to the influence of the reset-feedthrough variations, in particular, when the sensor gain is a high gain (i.e., when the P-phase slope is gentle).

However, when the length of the P phase is increased, the time taken for the AD conversion of the signal-line voltage increases, and furthermore, the power consumption increases.

Accordingly, the image sensor 2 can adaptively select between the normal mode and the black-sunspot avoidance mode.

That is, for example, in accordance with a user operation or the like, the auto-zero control section 32 (FIG. 4) in the image sensor 2 can select the normal mode or the black-sunspot avoidance mode as the auto-zero mode.

For example, when the possibility that a black sunspot occurs is low in the normal mode and the possibility that the P-phase non-crossing occurs is high to some extent in the black-sunspot avoidance mode owing to the influence of the reset-feedthrough variations, the auto-zero control section 32 can select the normal mode as the auto-zero mode.

In addition, for example, when the possibility that a black sunspot occurs is high in the normal mode, the auto-zero control section 32 can select the black-sunspot avoidance mode as the auto-zero mode.

Figure 24:
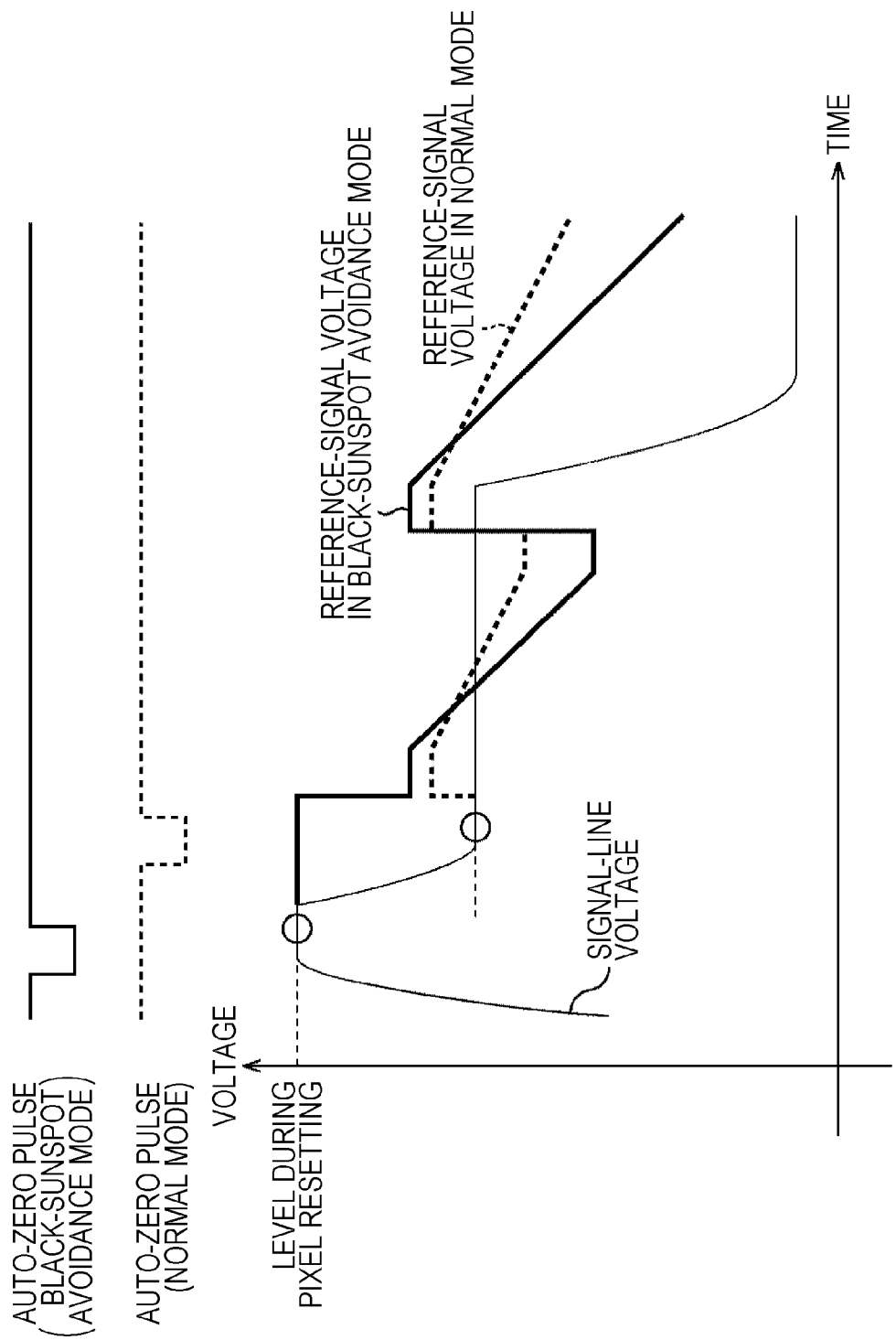
FIG. 24 is a waveform diagram illustrating an example of the reference signal in order to explain an example of a specific method for selecting the auto-zero mode.

FIG. 24 is a waveform diagram illustrating an example of the reference signal in order to explain an example of a specific method for selecting the auto-zero mode.

For example, by comparing the sensor gain (the gradient of the P-phase slope) with a predetermined threshold for the sensor gain (a gain threshold), the auto-zero control section 32 (FIG. 4) can select the normal mode or the black-sunspot avoidance mode on the basis of a result of the comparison.

More specifically, when the sensor gain is larger than the gain threshold and is a high gain, that is, when the gradient of the P-phase slope is gentle and the P-phase non-crossing is relatively likely to occur, the auto-zero control section 32 can select the normal mode as the auto-zero mode.

In this case, the reference-signal output section 33 outputs a reference signal that is arranged at a position where the voltage that has dropped from the level during the pixel resetting by an amount corresponding to the voltage drop due to the reset feedthrough serves as a reference, as indicated by a dotted line in FIG. 24.

On the other hand, when the sensor gain is not larger than the gain threshold and is a low gain, that is, when the gradient of the P-phase slope is steep and the P-phase non-crossing is relatively less likely to occur, the auto-zero control section 32 can select the black-sunspot avoidance mode as the auto-zero mode.

In this case, the reference-signal output section 33 outputs a reference signal that is arranged at a position where the level during the pixel resetting serves as a reference, as indicated by a solid line in FIG. 24.

Figure 25:
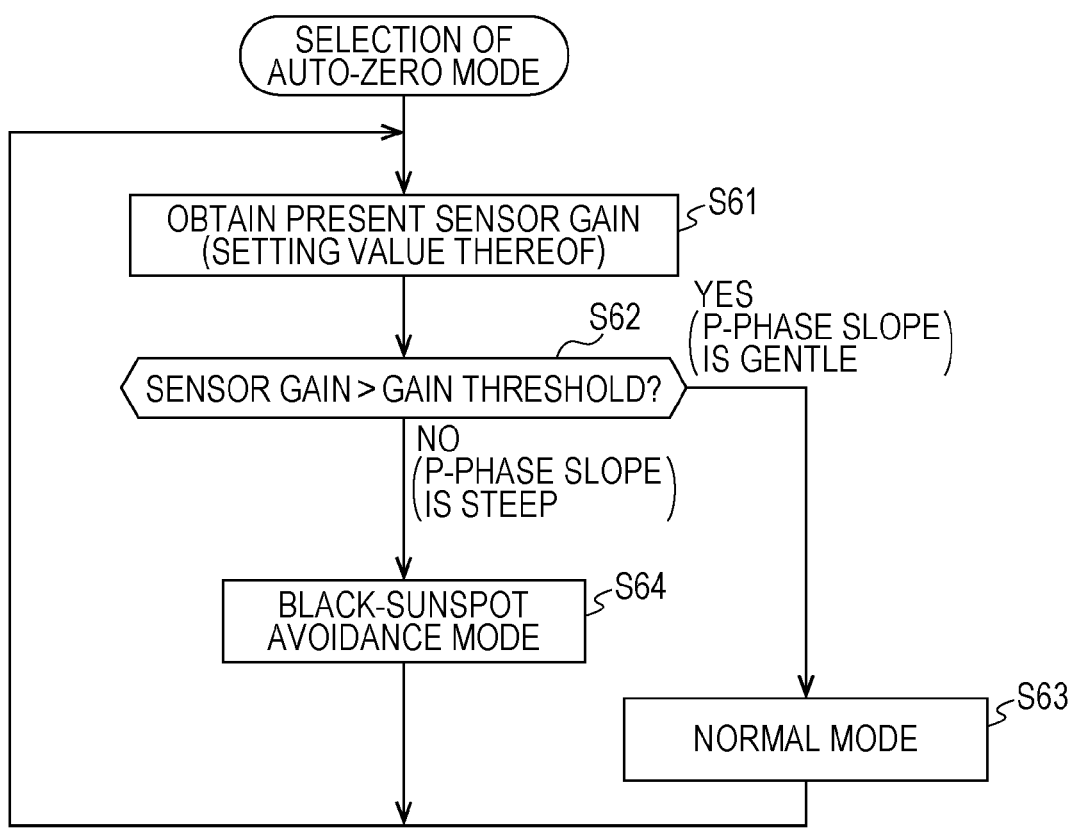
FIG. 25 is a flowchart illustrating processing for selecting the auto-zero mode.

FIG. 25 is a flowchart illustrating the processing, performed by the auto-zero control section 32, for selecting the auto-zero mode.

In step S61, the auto-zero control section 32 obtains the present sensor gain (the gradient of the P-phase slope) from the reference-signal output section 33. The process then proceeds to step S62.

In step S62, the auto-zero control section 32 decides whether or not the sensor gain is larger than a predetermined gain threshold.

When it is decided in step S62 that the sensor gain is larger than the gain threshold, that is, when the gradient of the P-phase slope is gentle, the process proceeds to step S63 in which the auto-zero control section 32 selects the normal mode as the auto-zero mode. The process then returns to step S61.

When it is decided in step S62 that the sensor gain is not larger than the gain threshold, that is, when the gradient of the P-phase slope is steep, the process proceeds to step S64 in which the auto-zero control section 32 selects the black-sunspot avoidance mode as the auto-zero mode. The process then returns to step S61.

Herein, the ease of occurrence of the P-phase non-crossing and the D-phase non-crossing during image capturing of a subject with such a high luminance as to cause a black sunspot (i.e., the ease of occurrence of an event in which the pixel maximum value is output as the pixel value and a black sunspot is corrected by the P-phase and D-phase non-crossing) is referred to as a "black-sunspot correction margin".

When the sensor gain is a low gain (when the gradient of the P-phase slope is steep), the black-sunspot correction margin is relatively small, and the P-phase margin during image capturing of a subject with an appropriate luminance is relatively large.

When the sensor gain is a high gain (the gradient of the P-phase slope is gentle), the black-sunspot correction margin is relatively large, and the P-phase margin during image capturing of a subject with an appropriate luminance is relatively small.

On the other hand, in the normal mode, the black-sunspot correction margin is relatively small, and the P-phase margin during image capturing of a subject with an appropriate luminance is relatively large.

In the black-sunspot avoidance mode, the black-sunspot correction margin may become relatively large, and the P-phase margin during image capturing of a subject with an appropriate luminance may become relatively small.

Accordingly, if the sensor gain is a low gain, the black-sunspot correction margin is relatively small, and the P-phase margin during image capturing of a subject with an appropriate luminance is relatively large, then the auto-zero control section 32 can select the black-sunspot avoidance mode in which the black-sunspot correction margin is relatively large and the P-phase margin during image capturing of a subject with an appropriate luminance may become relatively small.

If the sensor gain is high, the black-sunspot correction margin is relatively large, and the P-phase margin during image capturing of a subject with an appropriate luminance is relatively small, then the auto-zero control section 32 can select the normal mode in which the black-sunspot correction margin is relatively small and the P-phase margin during image capturing of a subject with an appropriate luminance is relatively large.

With the arrangement described above, it is possible to sufficiently ensure both of the black-sunspot correction margin and the P-phase margin during image capturing of a subject with an appropriate luminance.

As described above, in the black-sunspot avoidance mode, the auto zero processing is performed so that it is completed during the period of the pixel resetting. As a result, the reference signal is arranged at an upper position where it is not affected by variations in the signal-line voltage after the pixel resetting and the level during the pixel resetting serves as a reference.

Accordingly, the signal-line voltage decreases after the pixel resetting, so that, in the normal mode, it is possible to inhibit appearance of a black sunspot that occurs when the reference signal is arranged at a lower position.

In addition, in the black-sunspot avoidance mode, the P-phase offset is performed to offset the reference signal to a lower portion by a voltage corresponding to the voltage drop due to the reset feedthrough, so that it is possible to ensure the P-phase margin during image capturing of a subject with an appropriate luminance, without increasing the length of the P phase.

Additionally, the normal mode or the black-sunspot avoidance mode is adaptively selected as the auto-zero mode, so that it is possible to sufficiently ensure both of the black-sunspot correction margin and the P-phase margin during image capturing of a subject with an appropriate luminance.

Although the normal mode and the black-sunspot avoidance mode are provided as the auto-zero mode in the present embodiment, only the black-sunspot avoidance mode can also be provided as the auto-zero mode (i.e., without provision of the normal mode).

[Description of Computer to which Present Technology is Applied]

The above-described series of processes can be performed by hardware or software. When the series of processes is performed by software, a program that implements the software is installed to a computer (a processor, such as a central processing unit (CPU) or digital signal processor (DSP)), such as a microcomputer.

Figure 26:
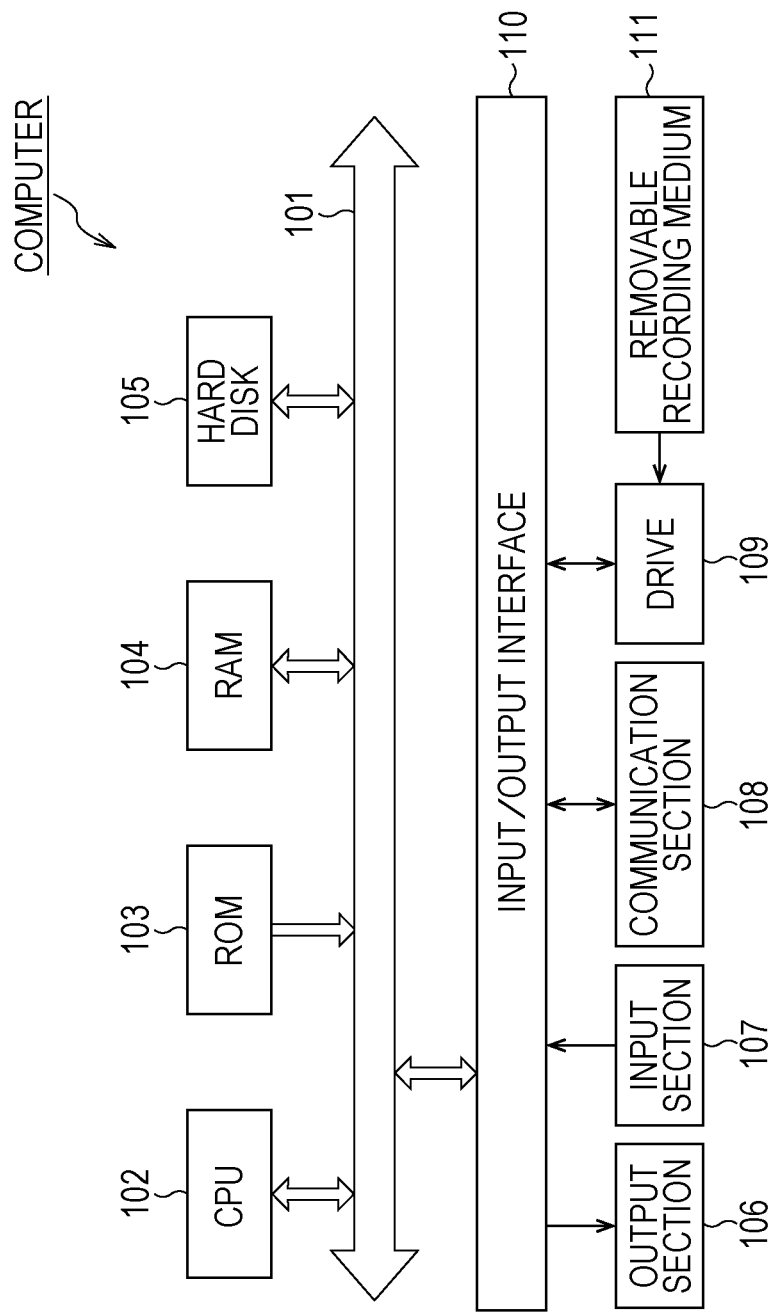
FIG. 26 illustrates an example configuration of one embodiment of a computer to which the present technology is applied.

FIG. 26 illustrates an example configuration of one embodiment of a computer to which the program for executing the above-described series of processes is installed.

The program may be pre-recorded to a hard disk 105 or a read only memory (ROM) 103, which serve as a recording medium built into the computer.

Alternatively, the program may be pre-stored in (pre-recorded to a removable recording medium 111. Such a removable recording medium 111 can be supplied as the so-called package software. Examples of the removable recording medium 111 include a flexible disk, a compact disc read only memory (CD-ROM), a magneto optical (MO) disk, a digital versatile disc (DVD), a magnetic disk, and a semiconductor memory.

In addition to installing the program from the removable recording medium 111 to the computer, the program can also be downloaded to the computer through a communication network or broadcast network and be installed to the built-in hard disk 105. That is, for example, the program can be wirelessly transferred from a download site to the computer through an artificial satellite for digital satellite broadcast or can be transferred to the computer through a network such as a local area network (LAN) or the Internet.

The computer has a CPU 102 therein. An input/output interface 110 is connected to the CPU 102 through a bus 101.

When a user operates an input section 107 or the like to input an instruction via the input/output interface 110, the CPU 102 executes the program stored in the ROM 103 in accordance with the instruction. Alternatively, the CPU 102 loads the program, stored in the hard disk 105, to a random access memory (RAM) 104 and executes the loaded program.

With this arrangement, the CPU 102 performs the processes according to the above-described flowcharts or the processes performed by the above-described configuration illustrated in the block diagrams. For example, the CPU 102 causes a result of the process to be output via an output section 106 via the input/output interface 110, to be transmitted via a communication section 108, or to be recorded to the hard disk 105, as appropriate.

The input section 107 includes a keyboard, a mouse, a microphone, and so on. The output section 106 includes a liquid-crystal display (LCD), a speaker, and so on.

Herein, the processes that the computer performs in accordance with the program may or may not to be time-sequentially performed according to the sequence described in the flowcharts. That is, the processes that the computer performs in accordance with the program also include processes that are executed in parallel or independently (e.g., parallel processes or object-based processes).

Embodiments of the present technology are not limited to the above-described particular embodiments, and various changes and modifications can be made thereto without departing from the spirit and scope of the present technology.

That is, the present technology can be applied to not only digital cameras but also any other types of electronic apparatus, such as portable terminals, having image sensors and functions for capturing images.

The present technology can also have the following configuration.

<1> An electronic apparatus including:
a reference-signal output section configured to output a reference signal whose level changes;
a comparator configured to compare an electrical signal output from a pixel having a photoelectric conversion element that performs photoelectric conversion with the reference signal output by the reference-signal output section;
a counter configured to obtain a count value as an AD conversion result of the electrical signal, the count value being obtained by counting time taken for the reference signal to change until the electrical signal and the reference signal match each other, based on a result of the comparison of the electrical signal with the reference signal; and
an auto-zero control section configured to perform control so that auto zero processing for setting the comparator is completed in a reset period so that a comparison result indicating that two input signals supplied to the comparator match each other, the pixel being reset in the reset period.

<2> The electronic apparatus according to <1>, wherein the reference-signal output section offsets a start level that is the level of the reference signal when the comparison with the electrical signal is started.

<3> The electronic apparatus according to <2>, wherein the reference-signal output section sets an amount of offset of the start level, based on a gradient of the reference signal.

<4> The electronic apparatus according to <3>, wherein the reference-signal output section sets the amount of offset of the start level to a smaller amount as the gradient of the reference signal becomes steeper.

<5> The electronic apparatus according to <2> to <4>, wherein the reference-signal output section adjusts the amount of offset of the start level so that a deviation of an AD-conversion result of a reset level relative to a predetermined value decreases, the reset level being a level of the electrical signal immediately after the pixel is reset.

<6> The electronic apparatus according to <5>, wherein the predetermined value is a value corresponding to a middle point in P phase that is a period in which the level of the reference signal changes and that is used for obtaining the AD-conversion result of reset level.

<7> The electronic apparatus according to <2>, wherein the reference-signal output section sets a length of a P phase that is a period in which the level of the reference signal changes and that is used for obtaining an AD-conversion result of a reset level that is the level of the electrical signal immediately after the pixel is reset.

<8> The electronic apparatus according to <7>, wherein the reference-signal output section sets the length of the P phase, based on a gradient of the reference signal.

<9> The electronic apparatus according to <8>, wherein the reference-signal output section sets the length of the P phase to a smaller length, as the gradient of the reference signal becomes steeper.

<10> The electronic apparatus according to <7> to <9>, wherein
the reference-signal output section
adjusts an amount of offset of the start level so that a deviation of the AD-conversion result of the reset level relative to a predetermined value decreases, and
adjusts the length of the P phase when the deviation of the AD-conversion result of the reset level relative to the predetermined value decreases.

<11> The electronic apparatus according to <2>, wherein the reference-signal output section offsets the start level by a voltage corresponding to a difference between the electrical signal when the pixel is being reset and the electrical signal immediately after the pixel is reset.

<12> The electronic apparatus according to <1> to <9>, wherein the auto-zero control section decides whether the auto zero processing is to be completed during the reset period or is to be completed after the reset period and controls the auto zero processing.

<13> The electronic apparatus according to <12>, wherein the auto-zero control section makes the decision, based on a gradient of the reference signal.

<14> The electronic apparatus according to <13>, wherein
when the gradient of the reference signal is steep, the auto-zero control section decides that the auto zero processing is to be completed during the reset period, and when the gradient of the reference signal is not steep, the auto-zero control section decides that the auto zero processing is to be completed after the reset period.

<15> The electronic apparatus according to <1> to <14>, further including:
an output section configured to output, as a pixel value of the pixel, a difference between an AD-conversion result of a reset level that is a level of the electrical signal immediately after the pixel is reset and an AD-conversion result of a signal level that is a level of the electrical signal corresponding to charge accumulated in the photoelectric conversion element.

<16> A control method for an electronic apparatus including
a reference-signal output section configured to output a reference signal whose level changes;
a comparator configured to compare an electrical signal output from a pixel having a photoelectric conversion element that performs photoelectric conversion with the reference signal output by the reference-signal output section; and
a counter configured to obtain a count value as an AD conversion result of the electrical signal, the count value being obtained by counting time taken for the reference signal to change until the electrical signal and the reference signal match each other, based on a result of the comparison of the electrical signal with the reference signal, the method including:
performing control so that auto zero processing for setting the comparator is completed in a reset period so that a comparison result indicating that two input signals supplied to the comparator in the electronic apparatus match each other, the pixel being reset in the reset period.

<17> An image sensor including:
a reference-signal output section configured to output a reference signal whose level changes;
a pixel configured to output an electrical signal, the pixel having a photoelectric conversion element that performs photoelectric conversion;
a comparator configured to compare the electrical signal output from the pixel with the reference signal output by the reference-signal output section;
a counter configured to obtain a count value as an AD conversion result of the electrical signal, the count value being obtained by counting time taken for the reference signal to change until the electrical signal and the reference signal match each other, based on a result of the comparison of the electrical signal with the reference signal; and
an auto-zero control section configured to perform control so that auto zero processing for setting the comparator is completed in a reset period so that a comparison result indicating that two input signals supplied to the comparator match each other, the pixel being reset in the reset period.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
 a reference-signal output section configured to output a reference signal whose level changes;
 a comparator configured to compare an electrical signal output from a pixel having a photoelectric conversion element that performs photoelectric conversion with the reference signal output by the reference-signal output section;
 a counter configured to obtain a count value as an analog-to-digital (AD) conversion result of the electrical signal, the count value being obtained by counting time taken for the reference signal to change until the electrical signal and the reference signal match each other, based on a result of the comparison of the electrical signal with the reference signal; and
 an auto-zero control section configured to perform control so that auto zero processing for setting the comparator is completed in a reset period so that a comparison result indicating that two input signals supplied to the comparator match each other, the pixel being reset in the reset period.

2. The electronic apparatus according to claim 1, wherein the reference-signal output section offsets a start level that is the level of the reference signal when the comparison with the electrical signal is started.

3. The electronic apparatus according to claim 2, wherein the reference-signal output section sets an amount of offset of the start level, based on a gradient of the reference signal.

4. The electronic apparatus according to claim 3, wherein the reference-signal output section sets the amount of offset of the start level to a smaller amount as the gradient of the reference signal becomes steeper.

5. The electronic apparatus according to claim 2, wherein the reference-signal output section adjusts the amount of offset of the start level so that a deviation of an AD-conversion result of a reset level relative to a predetermined value decreases, the reset level being a level of the electrical signal immediately after the pixel is reset.

6. The electronic apparatus according to claim 5, wherein the predetermined value is a value corresponding to a middle point in a preset (P) phase that is a period in which the level of the reference signal changes and that is used for obtaining the AD-conversion result of reset level.

7. The electronic apparatus according to claim 2, wherein the reference-signal output section sets a length of a preset (P) phase that is a period in which the level of the reference signal changes and that is used for obtaining an AD-conversion result of a reset level that is the level of the electrical signal immediately after the pixel is reset.

8. The electronic apparatus according to claim 7, wherein the reference-signal output section sets the length of the P phase, based on a gradient of the reference signal.

9. The electronic apparatus according to claim 8, wherein the reference-signal output section sets the length of the P phase to a smaller length, as the gradient of the reference signal becomes steeper.

10. The electronic apparatus according to claim 7, wherein the reference-signal output section adjusts an amount of offset of the start level so that a deviation of the AD-conversion result of the reset level relative to a predetermined value decreases, and
 adjusts the length of the P phase when the deviation of the AD-conversion result of the reset level relative to the predetermined value decreases.

11. The electronic apparatus according to claim 2, wherein the reference-signal output section offsets the start level by a voltage corresponding to a difference between the electrical signal when the pixel is being reset and the electrical signal immediately after the pixel is reset.

12. The electronic apparatus according to claim 2, wherein the auto-zero control section decides whether the auto zero processing is to be completed during the reset period or is to be completed after the reset period and controls the auto zero processing.

13. The electronic apparatus according to claim 12, wherein the auto-zero control section makes the decision, based on a gradient of the reference signal.

14. The electronic apparatus according to claim 13, wherein
 when the gradient of the reference signal is steep, the auto-zero control section decides that the auto zero processing is to be completed during the reset period, and when the gradient of the reference signal is not steep, the auto-zero control section decides that the auto zero processing is to be completed after the reset period.

15. The electronic apparatus according to claim 2, further comprising:
 an output section configured to output, as a pixel value of the pixel, a difference between an AD-conversion result of a reset level that is a level of the electrical signal immediately after the pixel is reset and an AD-conversion result of a signal level that is a level of the electrical signal corresponding to charge accumulated in the photoelectric conversion element.

16. An electronic apparatus comprising:
 a reference-signal line configured to provide a reference signal whose level changes;
 a comparator configured to compare an electrical signal output from a pixel having a photoelectric conversion element configured to perform photoelectric conversion with the reference signal received from the reference-signal line, the comparator having a first transistor and a second transistor;
 a counter configured to obtain a count value as an analog-to-digital (AD) conversion result of the electrical signal, the count value being obtained by counting time taken for the reference signal to change until the electrical signal and the reference signal match each other, based on a result of the comparison of the electrical signal with the reference signal; and
 an auto-zero control section configured to perform auto-zero control so that auto zero processing for setting the comparator is completed in a reset period so that a comparison result indicating that two input signals supplied to the comparator match each other, the pixel being reset in the reset period,
 wherein the first transistor and the second transistor of the comparator respectively have gates directly connected to an auto zero control line configured to provide an auto zero control signal to the gates to complete the auto zero processing.

17. The electronic apparatus according to claim 16, wherein the reference-signal line is provided with an offset of a start level that is the level of the reference signal when the comparison with the electrical signal is started.

18. The electronic apparatus according to claim 17, wherein an amount of the offset of the start level is based on a gradient of the reference signal.

19. The electronic apparatus according to claim 18, wherein the amount of the offset of the start level is set to a smaller amount as the gradient of the reference signal becomes steeper.

20. An image sensor comprising:
   a reference-signal line configured to provide a reference signal whose level changes;
   a pixel configured to output an electrical signal, the pixel having a photoelectric conversion element that performs photoelectric conversion;
   a comparator configured to compare the electrical signal output from the pixel with the reference signal received from the reference-signal line, the comparator including a first transistor and a second transistor;
   a counter configured to obtain a count value as an analog-to-digital (AD) conversion result of the electrical signal, the count value being obtained by counting time taken for the reference signal to change until the electrical signal and the reference signal match each other, based on a result of the comparison of the electrical signal with the reference signal; and
   an auto-zero control section configured to perform auto-zero control so that auto zero processing for setting the comparator is completed in a reset period so that a comparison result indicating that two input signals supplied to the comparator match each other, the pixel being reset in the reset period,
   wherein the first transistor and the second transistor of the comparator respectively have gates directly connected to an auto zero control line configured to provide an auto zero control signal to the gates to complete the auto zero processing.

* * * * *